US008619107B2

(12) United States Patent
Imai et al.

(10) Patent No.: US 8,619,107 B2
(45) Date of Patent: Dec. 31, 2013

(54) BEAM-SPOT POSITION COMPENSATION METHOD, OPTICAL SCANNING DEVICE, AND MULTI-COLOR IMAGE FORMING DEVICE

(75) Inventors: Shigeaki Imai, Kanagawa (JP); Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 295 days.

(21) Appl. No.: 12/608,823

(22) Filed: Oct. 29, 2009

(65) Prior Publication Data

US 2010/0045766 A1  Feb. 25, 2010

Related U.S. Application Data

(62) Division of application No. 11/058,673, filed on Feb. 16, 2005, now abandoned.

(30) Foreign Application Priority Data

Feb. 18, 2004 (JP) ................................. 2004-040753
Feb. 25, 2004 (JP) ................................. 2004-050154
Apr. 26, 2004 (JP) ................................. 2004-130114

(51) Int. Cl.
*B41J 2/435* (2006.01)

(52) U.S. Cl.
USPC ........................................ 347/235; 347/250

(58) Field of Classification Search
USPC ................. 347/116, 229, 230, 234, 235, 238, 347/248–250
See application file for complete search history.

(56) References Cited

U.S. PATENT DOCUMENTS

| | | | |
|---|---|---|---|
| 5,822,105 A | 10/1998 | Kodama et al. | |
| 5,933,184 A | 8/1999 | Ishigami et al. | |
| 6,157,400 A | 12/2000 | Genovese | |
| 6,621,512 B2 | 9/2003 | Nakajima et al. | |
| 6,791,596 B2 | 9/2004 | Nihei et al. | |
| 6,856,336 B2 * | 2/2005 | Toyoda | 347/116 |
| 6,933,957 B2 * | 8/2005 | Omori et al. | 347/249 |
| 7,170,544 B2 | 1/2007 | Horiuchi | |
| 7,224,378 B2 * | 5/2007 | Maeda | 347/235 |
| 7,271,824 B2 | 9/2007 | Omori et al. | |
| 7,277,212 B2 | 10/2007 | Miyatake et al. | |
| 7,301,554 B2 * | 11/2007 | Kubo | 347/244 |
| 7,355,770 B2 | 4/2008 | Miyatake et al. | |
| 7,619,796 B2 | 11/2009 | Imai | |
| 7,643,046 B2 | 1/2010 | Imai et al. | |

(Continued)

FOREIGN PATENT DOCUMENTS

JP  2-282763  11/1990
JP  7-19084   3/1995

(Continued)

*Primary Examiner* — Hai C Pham
(74) *Attorney, Agent, or Firm* — Oblon, Spivak, McClelland, Maier & Neustadt, L.L.P.

(57) ABSTRACT

In a beam-spot position compensation method for use in an optical scanning device which scans a surface of a photosensitive medium by a light beam emitted by a light source, a plurality of sections are defined by dividing a scanning region on the scanned surface. An emission timing of the light beam for every section is adjusted so that a spacing between beam-spot positions corresponding to pixels of start and end of each section is changed by a predetermined amount. The sparseness or denseness of beam-spot position spacings of the plurality of sections in the whole scanning region is compensated.

19 Claims, 57 Drawing Sheets

(56) References Cited

U.S. PATENT DOCUMENTS

| | | |
|---|---|---|
| 2001/0017645 A1* | 8/2001 | Toda .................... 347/116 |
| 2002/0122217 A1 | 9/2002 | Nakajima |
| 2007/0058255 A1 | 3/2007 | Imai et al. |
| 2008/0170283 A1 | 7/2008 | Imai |
| 2008/0192323 A1 | 8/2008 | Nakamura et al. |
| 2008/0259426 A1 | 10/2008 | Imai |
| 2009/0058979 A1 | 3/2009 | Saisho et al. |
| 2009/0073529 A1 | 3/2009 | Imai |
| 2009/0225385 A1 | 9/2009 | Imai |

FOREIGN PATENT DOCUMENTS

| | | |
|---|---|---|
| JP | 7-181410 | 7/1995 |
| JP | 9-58053 | 3/1997 |
| JP | 2655603 | 5/1997 |
| JP | 9-174917 | 7/1997 |
| JP | 10-133130 | 5/1998 |
| JP | 11-153765 | 6/1999 |
| JP | 11-167081 | 6/1999 |
| JP | 2001-194613 | 7/2001 |
| JP | 2001-228415 | 8/2001 |
| JP | 2001-305451 | 10/2001 |
| JP | 2002-148541 | 5/2002 |
| JP | 2002-148551 | 5/2002 |
| JP | 2002-166598 | 6/2002 |
| JP | 2002-182145 | 6/2002 |
| JP | 2002-341285 | 11/2002 |
| JP | 2003-103830 | 4/2003 |
| JP | 2003-185959 | 7/2003 |
| JP | 3512397 | 1/2004 |

* cited by examiner

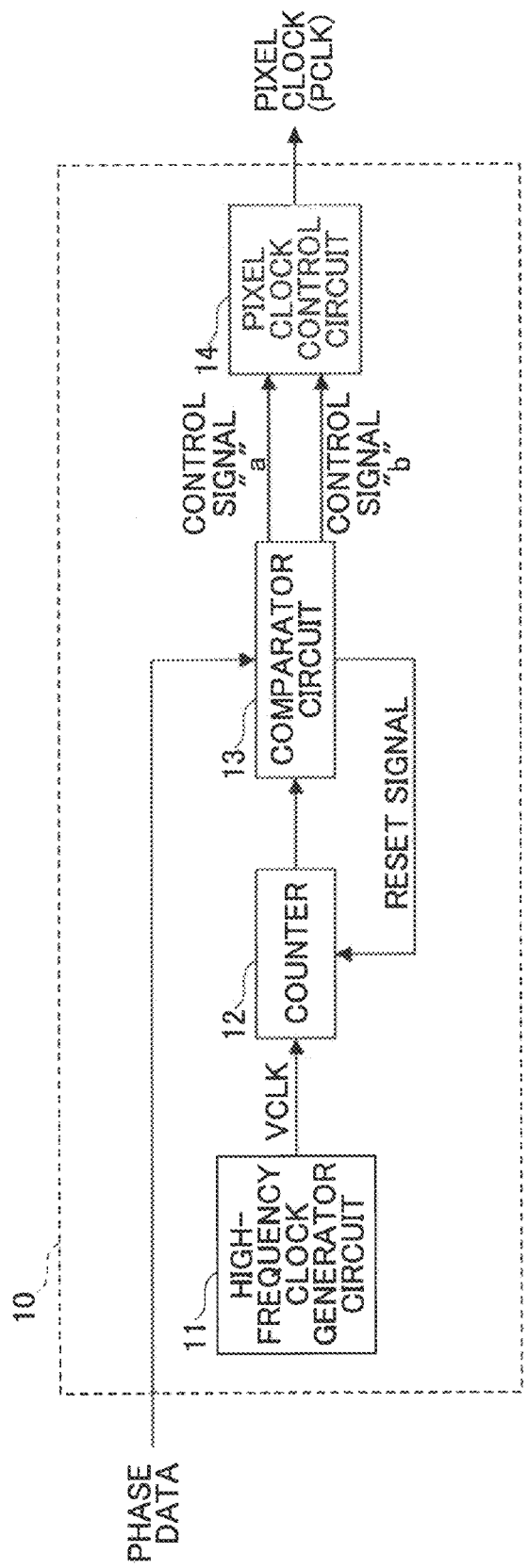

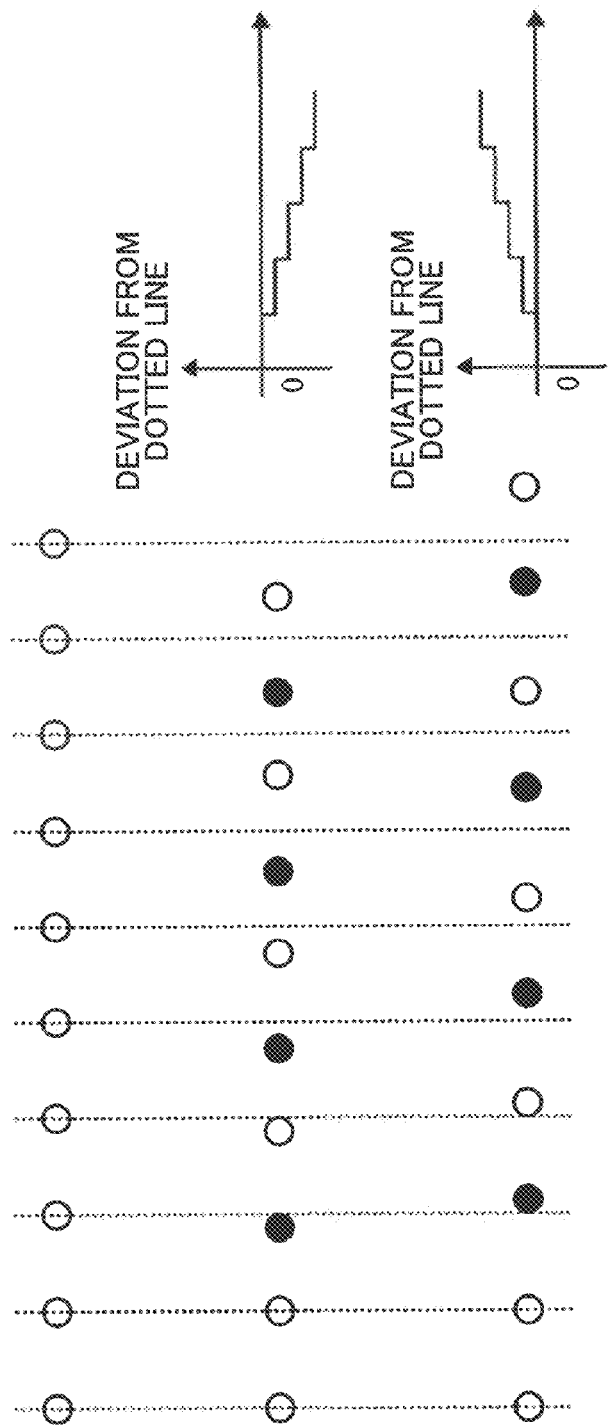

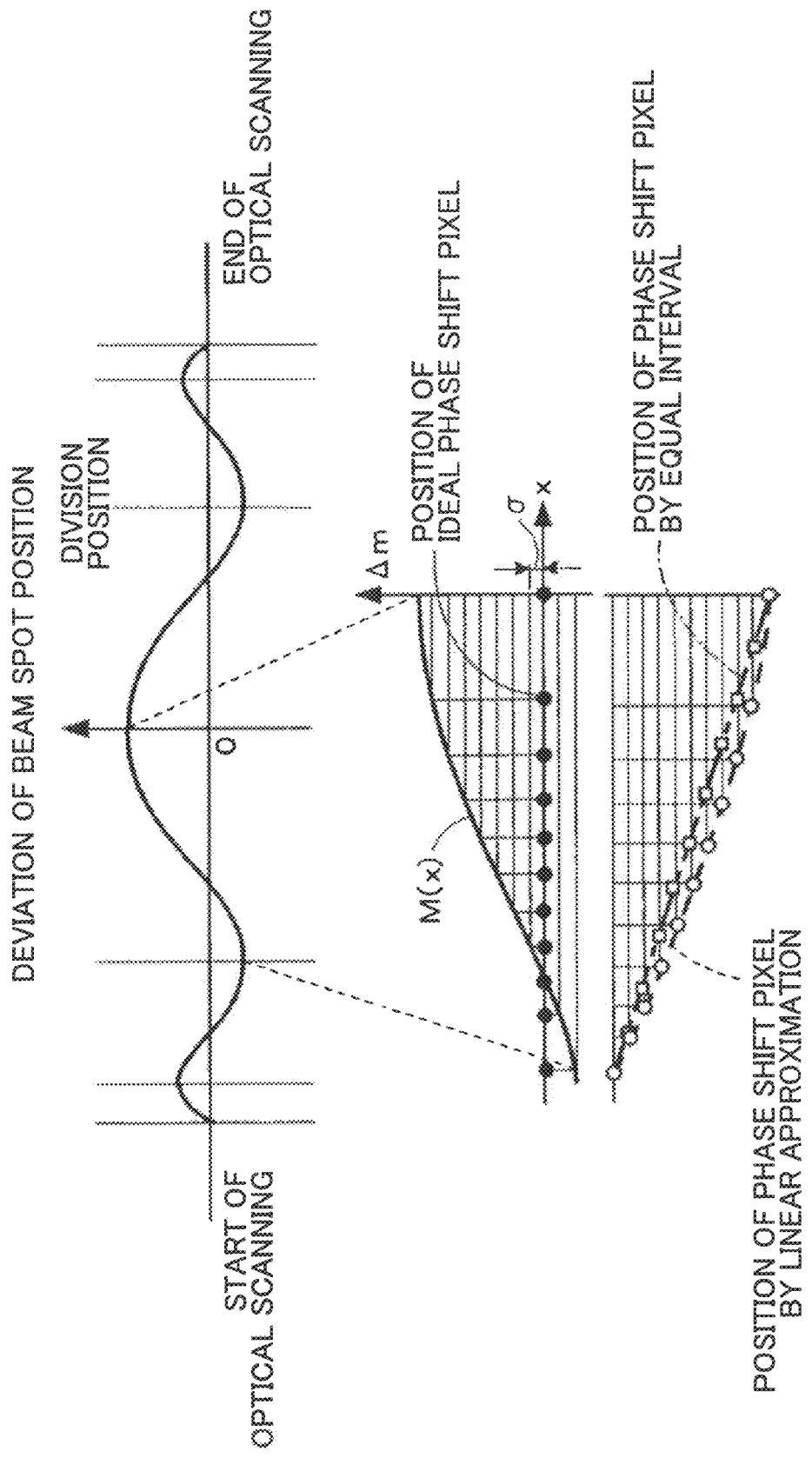

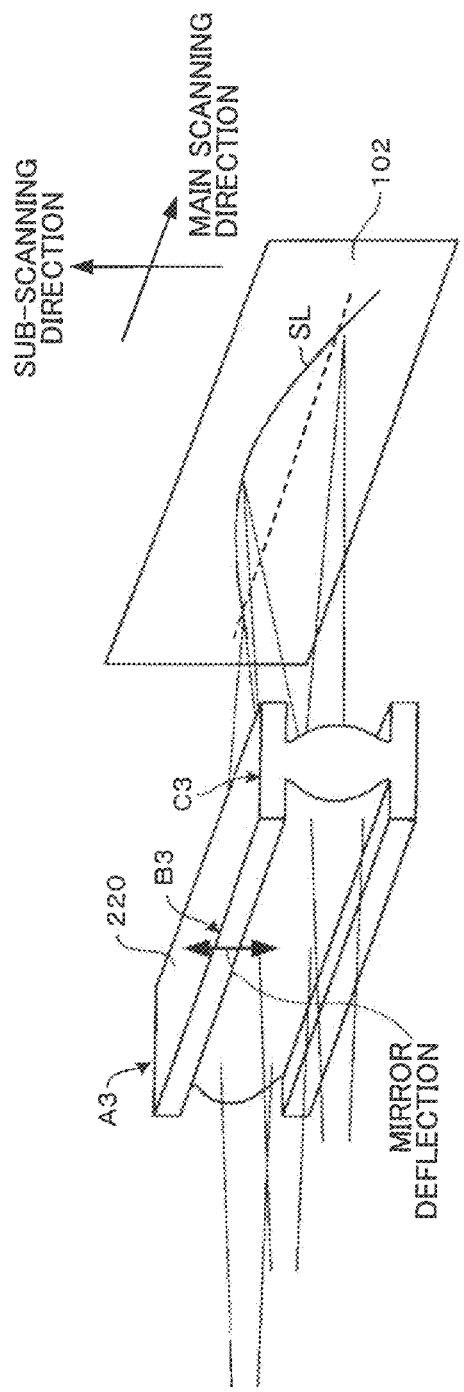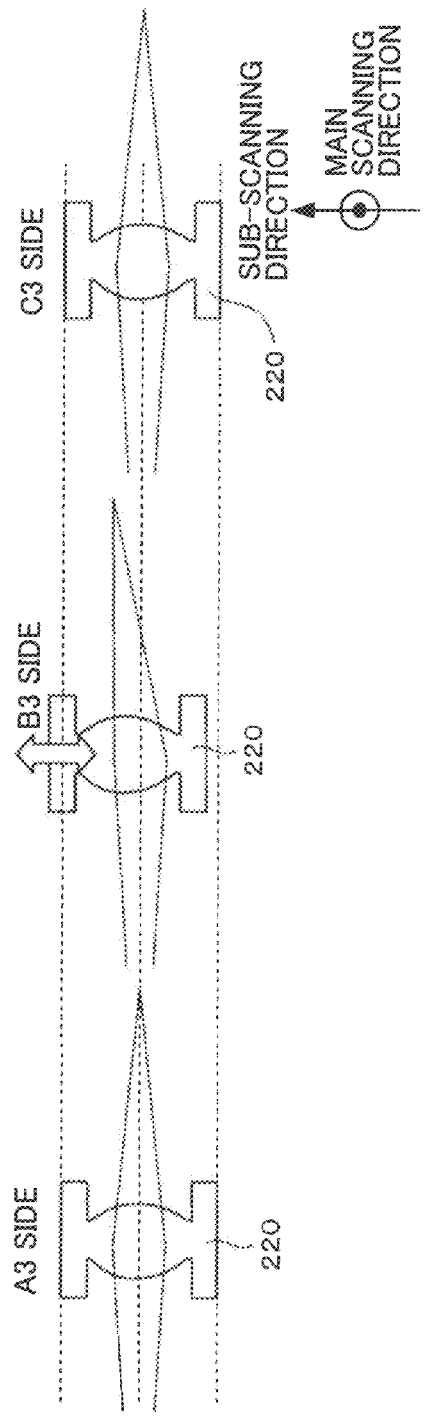
FIG.47A
FIG.47B

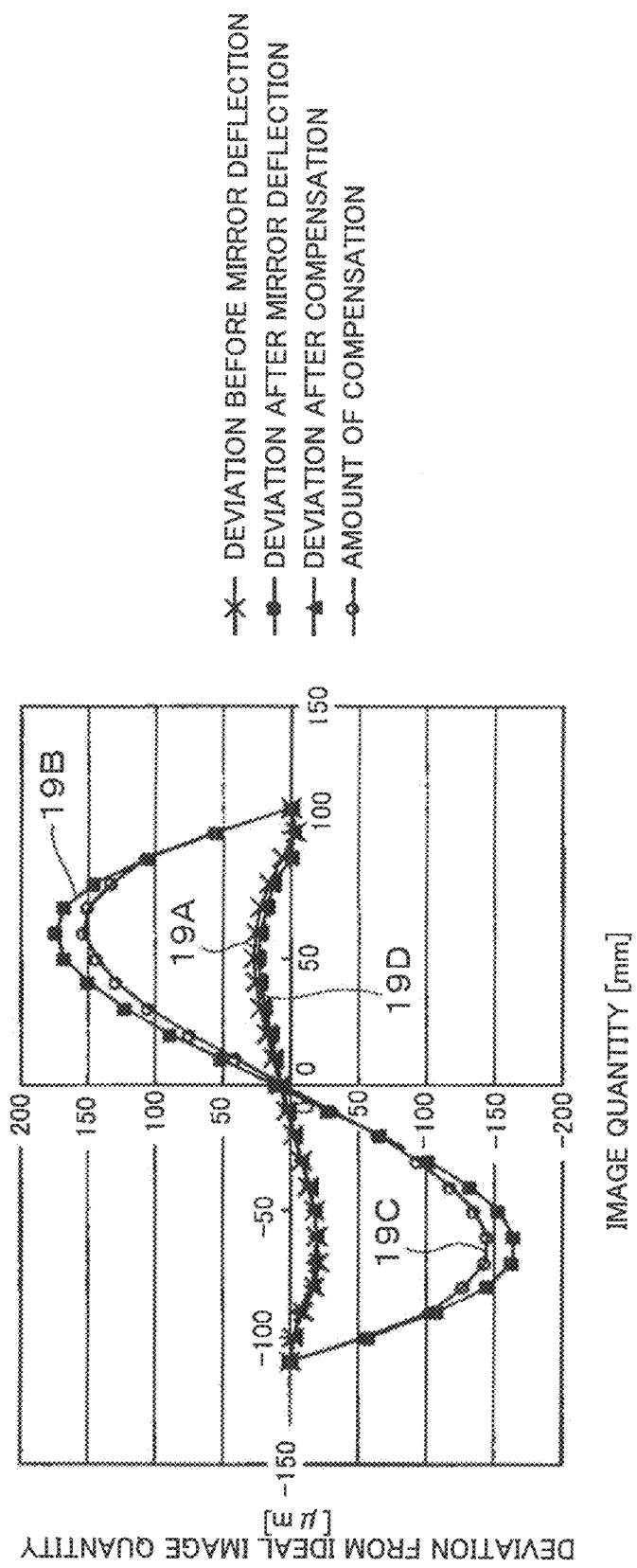

FIG.64

| IMAGE QUANTITY [mm] | DEVIATION BEFORE MIRROR ROTATION [μm] | DEVIATION AFTER MIRROR ROTATION [μm] | DEVIATION AFTER COMPENSATION [μm] | AMOUNT OF COMPENSATION [μm] |
|---|---|---|---|---|
| 150 | 0.0 | 0.0 | 0.0 | 0.0 |
| 140 | 4.4 | 14.1 | 5.2 | 8.8 |
| 130 | 10.2 | 29.2 | 11.6 | 17.7 |
| 120 | 12.5 | 40.3 | 14.2 | 26.1 |
| 110 | 8.5 | 44.4 | 10.2 | 34.2 |
| 100 | -0.7 | 42.8 | 0.4 | 42.4 |
| 90 | -11.8 | 38.4 | -9.5 | 47.9 |
| 80 | -21.5 | 34.9 | -18.6 | 53.4 |
| 70 | -27.5 | 34.2 | -24.5 | 58.7 |
| 60 | -29.3 | 36.9 | -26.9 | 63.8 |
| 50 | -28.1 | 41.9 | -27.0 | 68.9 |
| 40 | -25.5 | 47.5 | -23.6 | 71.1 |
| 30 | -23.5 | 51.7 | -21.6 | 73.3 |
| 20 | -23.4 | 53.3 | -21.5 | 74.8 |
| 10 | -25.1 | 52.3 | -23.6 | 75.8 |
| 0 | -27.7 | 49.6 | -27.3 | 76.9 |
| -10 | -29.4 | 46.9 | -28.9 | 75.8 |
| -20 | -28.8 | 45.8 | -29.0 | 74.8 |
| -30 | -25.2 | 46.9 | -26.4 | 73.3 |
| -40 | -19.1 | 49.9 | -21.2 | 71.1 |
| -50 | -12.2 | 53.0 | -15.9 | 68.9 |
| -60 | -6.4 | 54.4 | -9.4 | 63.8 |
| -70 | -3.8 | 52.1 | -6.6 | 58.7 |
| -80 | -5.0 | 45.3 | -8.1 | 53.4 |
| -90 | -9.5 | 34.8 | -13.1 | 47.9 |
| -100 | -14.8 | 22.9 | -19.5 | 42.4 |
| -110 | -17.9 | 12.8 | -21.4 | 34.2 |
| -120 | -16.3 | 7.0 | -19.1 | 26.1 |
| -130 | -10.3 | 5.4 | -12.3 | 17.7 |
| -140 | -3.4 | 4.5 | -4.3 | 8.8 |
| -150 | 0.0 | 0.0 | 0.0 | 0.0 |

FIG.65

| DIVISION POSITION | 150 | 126 | 100 | 76 | 50 | 26 |
|---|---|---|---|---|---|---|
| SECTION NO. | | 1 | 2 | 3 | 4 | 5 |
| SECTION WIDTH | | 24 | 26 | 24 | 26 | 24 |
| NUMBER OF PHASE SHIFT PIXELS | | −8 | −8 | −5 | −5 | −2 |
| DIVISION POSITION | 0 | −26 | −50 | −76 | −100 | −126 | −150 |
| SECTION NO. | 6 | 7 | 8 | 9 | 10 | 11 | 12 |
| SECTION WIDTH | 26 | 26 | 24 | 26 | 24 | 26 | 24 |
| NUMBER OF PHASE SHIFT PIXELS | −1 | 1 | 2 | 5 | 5 | 8 | 8 |

FIG.66

| IMAGE QUANTITY [mm] | DEVIATION BEFORE MIRROR DEFLECTION [μm] | DEVIATION AFTER MIRROR DEFLECTION [μm] | DEVIATION AFTER COMPENSATION [μm] | AMOUNT OF COMPENSATION [μm] |
|---:|---:|---:|---:|---:|
| 110 | 0.0 | 0.0 | 0.0 | 0.0 |
| 100 | -2.8 | 54.6 | -1.4 | 55.9 |
| 90 | 5.7 | 105.5 | -0.5 | 106.0 |
| 80 | 15.8 | 144.8 | 12.3 | 132.5 |
| 70 | 22.5 | 167.3 | 17.7 | 149.6 |
| 60 | 26.1 | 174.4 | 21.9 | 152.5 |
| 50 | 27.0 | 168.2 | 24.1 | 144.2 |
| 40 | 25.4 | 150.5 | 22.2 | 128.3 |
| 30 | 21.9 | 123.3 | 19.0 | 104.2 |
| 20 | 17.3 | 89.4 | 14.6 | 74.8 |
| 10 | 12.6 | 51.6 | 10.9 | 40.6 |
| 0 | 8.0 | 12.0 | 6.7 | 5.3 |
| -10 | 3.2 | -28.0 | 2.0 | -30.0 |
| -20 | -2.2 | -66.8 | -2.6 | -64.2 |
| -30 | -7.9 | -102.4 | -8.7 | -93.6 |
| -40 | -13.2 | -132.1 | -13.9 | -118.2 |
| -50 | -17.4 | -153.3 | -17.9 | -135.4 |
| -60 | -19.9 | -164.1 | -18.9 | -145.2 |
| -70 | -20.4 | -162.1 | -18.4 | -143.7 |
| -80 | -17.5 | -144.5 | -16.4 | -128.1 |
| -90 | -9.9 | -108.8 | -5.7 | -103.1 |
| -100 | -0.8 | -57.6 | -3.1 | -54.5 |
| -110 | 0.0 | 0.0 | 0.0 | 0.0 |

FIG.67

| DIVISION POSITION | 110 | 92 | 74 | 56 | 36 | 18 | |
|---|---|---|---|---|---|---|---|
| SECTION NO. | | 1 | 2 | 3 | 4 | 5 | |
| SECTION WIDTH | | 18 | 18 | 18 | 20 | 18 | |
| NUMBER OF PHASE SHIFT PIXELS | | −38 | −18 | −2 | 12 | 20 | |
| DIVISION POSITION | 0 | −18 | −36 | −56 | −74 | −92 | −110 |
| SECTION NO. | 6 | 7 | 8 | 9 | 10 | 11 | 12 |
| SECTION WIDTH | 18 | 18 | 18 | 20 | 18 | 18 | 18 |
| NUMBER OF PHASE SHIFT PIXELS | 24 | 24 | 20 | 13 | −1 | −17 | −37 |

FIG.68

| IMAGE QUANTITY [mm] | RELATIVE DEVIATION BEFORE MIRROR ROTATION [μm] | RELATIVE DEVIATION BEFORE MIRROR ROTATION(AFTER COMPENSATION) [μm] | RELATIVE DEVIATION AFTER MIRROR ROTATION [μm] | RELATIVE DEVIATION AFTER MIRROR ROTATION(AFTER COMPENSATION) [μm] | TOTAL AMOUNT OF COMPENSATION [μm] |
|---|---|---|---|---|---|
| 150 | 0.0 | 0.0 | 0.0 | 0.0 | 0.0 |
| 140 | -5.0 | 0.6 | 11.7 | 0.7 | 16.6 |
| 130 | -10.0 | 1.0 | 22.8 | 0.7 | 33.1 |
| 120 | -15.0 | 0.7 | 32.4 | 1.0 | 47.1 |
| 110 | -19.9 | -0.1 | 40.9 | 1.3 | 59.3 |
| 100 | -24.5 | -0.7 | 48.8 | 1.1 | 71.5 |
| 90 | -28.8 | -0.5 | 56.8 | 2.4 | 82.6 |
| 80 | -32.2 | 0.5 | 64.8 | 3.8 | 93.6 |
| 70 | -34.2 | -0.4 | 69.9 | 3.3 | 100.5 |
| 60 | -34.5 | -1.7 | 73.9 | 2.1 | 104.6 |
| 50 | -32.5 | -0.7 | 79.2 | 2.4 | 108.6 |
| 40 | -28.0 | -1.7 | 81.7 | 1.5 | 106.4 |
| 30 | -20.8 | 0.0 | 85.9 | 2.5 | 104.2 |
| 20 | -11.3 | 0.0 | 87.6 | 2.2 | 96.6 |
| 10 | 0.0 | -1.0 | 87.3 | 0.9 | 85.4 |
| 0 | 12.1 | -1.2 | 87.0 | -0.5 | 74.2 |
| -10 | 23.9 | 0.5 | 87.6 | 1.1 | 63.0 |
| -20 | 34.5 | 0.9 | 86.0 | 0.6 | 51.8 |
| -30 | 43.1 | 1.2 | 83.6 | 0.1 | 41.5 |
| -40 | 49.4 | 1.9 | 80.8 | 0.6 | 32.7 |
| -50 | 53.2 | 0.2 | 74.8 | -2.1 | 23.9 |
| -60 | 54.7 | 1.7 | 71.2 | -0.5 | 18.8 |
| -70 | 54.2 | 1.2 | 64.9 | -1.7 | 13.7 |
| -80 | 51.9 | 0.6 | 58.0 | -2.9 | 9.7 |
| -90 | 48.1 | 1.2 | 51.6 | -2.7 | 7.5 |
| -100 | 42.9 | 0.5 | 43.4 | -4.3 | 5.3 |
| -110 | 36.6 | 1.3 | 36.3 | -3.2 | 4.3 |
| -120 | 29.1 | 1.0 | 27.7 | -3.7 | 3.3 |
| -130 | 20.6 | 0.7 | 18.7 | -3.4 | 2.2 |
| -140 | 10.9 | 0.9 | 10.0 | -1.0 | 1.1 |
| -150 | 0.0 | 0.0 | 0.0 | 0.0 | 0.0 |

FIG.69

| DIVISION POSITION | 150 | 126 | 100 | 76 | 50 | 26 |
|---|---|---|---|---|---|---|
| SECTION NO. | | 1 | 2 | 3 | 4 | 5 |
| SECTION WIDTH | | 24 | 26 | 24 | 26 | 24 |
| NUMBER OF PHASE SHIFT PIXELS FOR COMPENSATION OF INITIAL DEVIATION | | 5 | 4 | 4 | -1 | -5 |
| NUMBER OF PHASE SHIT PIXELS FOR COMPENSATION OF MIRROR ROTATION | | -10 | -8 | -6 | -5 | -3 |
| NUMBER OF FINAL PHASE SHIT PIXELS | | -5 | -4 | -2 | -6 | -8 |
| DIVISION POSITION | 0 | -26 | -50 | -76 | -100 | -126 | -150 |
| SECTION NO. | 6 | 7 | 8 | 9 | 10 | 11 | 12 |
| SECTION WIDTH | 26 | 26 | 24 | 26 | 24 | 26 | 24 |
| NUMBER OF PHASE SHIT PIXELS FOR COMPENSATION OF INITIAL DEVIATION | -12 | -10 | -5 | 0 | 4 | 7 | 9 |
| NUMBER OF PHASE SHIT PIXELS FOR COMPENSATION OF MIRROR ROTATION | -1 | 1 | 3 | 5 | 6 | 8 | 10 |
| NUMBER OF FINAL PHASE SHIT PIXELS | -13 | -9 | -2 | 5 | 10 | 15 | 19 |

BEAM-SPOT POSITION COMPENSATION METHOD, OPTICAL SCANNING DEVICE, AND MULTI-COLOR IMAGE FORMING DEVICE

CROSS REFERENCE

This application is a Divisional of and claims the benefit of priority under 35 U.S.C. §120 from U.S. Ser. No. 11/058,673, filed Feb. 16, 2005 now abandoned, the entire contents of which are incorporated herein by reference. U.S. Ser. No. 11/058,673 claims the benefit of priority under 35 U.S.C. §119 from Japanese Patent Application No. JP 2004-040753 filed Feb. 18, 2004, Japanese Patent Application No. JP 2004-050154 filed Feb. 25, 2004 and Japanese Patent Application No. JP 2004-130114 filed Apr. 26, 2004.

BACKGROUND OF THE INVENTION

1. Field of the Invention

The present invention relates to a beam-spot position compensation method for image forming device, such as digital copier, laser printer or laser facsimile, and relates to an optical scanning device and a multi-color image forming device using the beam-spot position compensation method.

2. Description of the Related Art

Generally, the optical scanning device is widely known in connection with the laser printer or the like. The optical scanning device is provided in which the light beam from the light source is deflected by the optical deflector, it is focused on the scanned surface by the scanning/focusing optical system including the fθ lens, so that the optical spot is formed on the scanned surface, and the optical scanning of the scanned surface is carried out using this optical spot. The scanned surface is, for example, the photoconductive surface of the photoconductor or the like.

The optical deflector is, for example, the commonly used polygon scanner in which the deflection surface is rotated at equal angular velocity. The light source is, for example, the semiconductor laser which is modulated by a fixed frequency.

When the optical scanning device is constituted using such light source and such optical deflector and the optical scanning of the scanned surface, such as the photoconductor, is carried out, the beam-spot position is not arranged at equal intervals, and the scanning speed is not constant.

For this reason, in order to arrange the beam-spot position at equal intervals and set the scanning speed at the fixed level when performing the optical scanning, the uniform optical scanning of the scanned surface is attained by performing the compensation using the scanning/focusing optical system, such as the fθ lens.

However, there is the limitation in the compensation of the scanning speed using the fθ lens. The scanning speed cannot be completely set at the fixed level, and the scanning speed variance may arise. Thus, the sparseness or denseness of the beam-spot position spacing takes place, and it is desirable that the beam-spot position spacing be set to the fixed interval.

Furthermore, the sparseness or denseness of the beam-spot position spacing is increased according to the manufacture error of the fθ lens.

If the sparseness or denseness of the beam-spot position spacing occurs, the distortion of the image arises, which causes the degradation of image quality.

Moreover, the color image forming device uses two or more fθ lenses, and, due to the manufacture error of the fθ lens and others, the sparseness or denseness of the beam-spot position spacing which is varied for each of the colors arises, and consequently the color deviation arises.

There is the known technique which compensates the sparseness or denseness of the beam-spot position spacing. According to the known technique, the frequency of the pixel clock is varied and the beam-spot position along the scanning line is compensated. Such technique is known from Japanese Laid-Open Patent Applications No. 11-167081 and No. 2001-228415, and Japanese Patent No. 3512397 (which corresponds to Japanese Laid-Open Patent Application No. 2003-098465).

However, the conventional technique is directed to the frequency modulation method in which the frequency of the pixel clock is varied. Generally, the pixel clock control unit for the frequency modulation method is complicated in the structure, and there is the problem that when the width of the frequency modulation becomes very small, it is difficult to perform the pixel clock control suitably, and the compensation of the beam-spot position with high accuracy cannot be performed. Moreover, there is the problem that the algorithm for obtaining the compensation data needed for performing the compensation is very complicated.

SUMMARY OF THE INVENTION

An object of the present invention is to provide a beam-spot position compensation method which enables the compensation of the sparseness or denseness of the beam-spot position spacing with good accuracy and simple algorithm.

Another object of the present invention is to provide an optical scanning device which is capable of performing the optical scanning with good accuracy.

Another object of the present invention is to provide a multi-color image forming device which is capable of providing a color image with good image quality and few color deviations.

In order to achieve the above-mentioned object, the present invention provides a beam-spot position compensation method for use in an optical scanning device which scans a surface of a photosensitive medium by a light beam emitted by a light source, the beam-spot position compensation method comprising the steps of: defining a plurality of sections by dividing a scanning region on the scanned surface; adjusting an emission timing of the light beam for every section so that a spacing between beam-spot positions corresponding to pixels of start and end of each section is changed by a predetermined amount; and compensating the sparseness or denseness of beam-spot position spacings of the plurality of sections in the whole scanning region.

According to the beam-spot position compensation method of the present invention, the compensation of the sparseness or denseness of the beam-spot position spacing on the scanned surface can be realized with good accuracy and simple algorithm, and the complication of the circuit can be avoided.

According to the present invention, while preventing the complication of the circuit, simplification of compensation algorithm and coexistence of compensation accuracy can be aimed at.

According to the present invention, the good-accuracy beam-spot position deviation compensation not only at the ends of the sections but also in the center of the section is realizable also.

According to the present invention, improvement in beam-spot position deviation compensation accuracy can be aimed at.

According to the present invention, the good-accuracy and easy algorithm can be realized for the compensation of the sparseness or denseness of the beam-spot position spacing on the scanned surface, and the complication of the circuit can be prevented.

According to the present invention, the amount of memories can be reduced and the cost reduction is attained.

According to the present invention, the cost reduction is attained and the deterioration of compensation accuracy is prevented.

In order to achieve the above-mentioned object, the present invention provides an optical scanning device which uses a beam-spot position compensation method, the optical scanning device comprising: a light source which emits a light beam; an optical deflector which scans the light beam emitted by the light source, a scanned surface of a photoconductor; a scanning/focusing optical system which focuses the light beam; and a beam-spot position compensation unit which compensates the sparseness or denseness of beam-spot position spacing on the scanned surface, the beam-spot position compensation unit being configured to define a plurality of sections by dividing a scanning region on the scanned surface; adjust an emission timing of the light beam for every section so that a spacing between beam-spot positions corresponding to pixels of start and end of each section is changed by a predetermined amount; and compensate the sparseness or denseness of beam-spot position spacings of the plurality of sections in the whole scanning region.

According to the optical scanning device of the present invention, it is possible to perform the optical scanning with good accuracy.

In order to achieve the above-mentioned object, the present invention provides a multi-color image forming device comprising: a plurality of the above-mentioned optical scanning devices; a plurality of developing units each of which develops a toner image from an electrostatic image using one of a plurality of color toners; and a plurality of transferring units which transfer respective toner images from the plurality of developing units to a recording medium in an integrated manner to form a color image on the recording medium.

According to the multi-color image forming device of the present invention, it is possible to provide the color image with good image quality with few color deviations.

BRIEF DESCRIPTION OF THE DRAWINGS

Other objects, features and advantages of the present invention will be apparent from the following detailed description when reading in conjunction with the accompanying drawings.

FIG. 4 is a block diagram showing the composition of the pixel clock generator circuit.

FIG. 6 is a timing chart for explaining operation of the pixel clock generator circuit of FIG. 4.

FIG. 7 is a diagram for explaining the manner how the beam-spot position spacing is changed to the fixed spacing according to the invention.

FIG. 30 is a diagram for explaining the magnification compensation for every section to the scanning position.

FIG. 47A and FIG. 47B are diagrams for explaining the compensation of the deflection of the scanning line.

FIG. 61 is a diagram for explaining the compensation situation in the Example 2.

FIG. 64 is a diagram showing the concrete numeric values of the Example 1.

FIG. 65 is a diagram showing the details of the compensation of the Example 1.

FIG. 66 is a diagram showing the concrete numeric values of the Example 2 in the manner similar to FIG. 64.

FIG. 67 is a diagram showing the details of the compensation of the Example 2 in the manner similar to FIG. 65.

FIG. 68 is a diagram showing the concrete numeric values of the Example 3 in the manner similar to FIG. 64.

FIG. 69 is a diagram showing the details of the compensation of the Example 3 in the manner similar to FIG. 65.

DETAILED DESCRIPTION OF PREFERRED EMBODIMENTS

A description will now be given of the preferred embodiments of the invention with reference to the accompanying drawings.

With reference to FIG. 1 through FIG. 14, the preferred embodiments of the invention will be explained.

First, the beam-spot position compensation of one section will be considered.

FIG. 1(a) shows the beam-spot position before the compensation is made. Spacings of the dotted lines are equal intervals and it is desirable that the beam-spot positions are located on the dotted lines. However, the beam-spot positions usually do not located on the dotted lines due to some causes.

The illustration of FIG. 1(a) shows that the beam-spot positions are located on the dotted lines, for the sake of simplification of description.

In the actual cases, the beam-spot positions before the compensation are not located on the dotted lines, and it is necessary to compensate the deviation of each beam-spot position from the dotted line.

FIG. 1(b) shows the case in which the spacings of the beam-spot positions are reduced at equal intervals. It is turned out that the width of the section defined by the spacing of the beam-spot positions at the ends of the section is reduced (in this case, the denseness of the spacings arises in the whole section).

FIG. 1(c) shows the case in which the spacings of the beam-spot positions are expanded at equal intervals. It is turned out that the width of the section is expanded at equal intervals (in this case, the sparseness of the spacings arise in the whole section).

FIGS. 1(d) and (e) show the typical position deviations of FIGS. 1(b) and (c) from the dotted lines, respectively. In this case, suppose that the position deviation which is shifted to the right-hand side is positive, and the position deviation which is shifted to the left-hand side is negative.

The slope of each line in FIGS. 1(d) and (e) is determined by the amount of reduction (or expansion) of the beam-spot position spacings (expansion). If the beam-spot position spacing is reduced greatly (or expanded greatly), the slope of the line will become steep.

Next, a description will be given of the beam-spot position compensation of two or more sections in combination.

Figure 1:
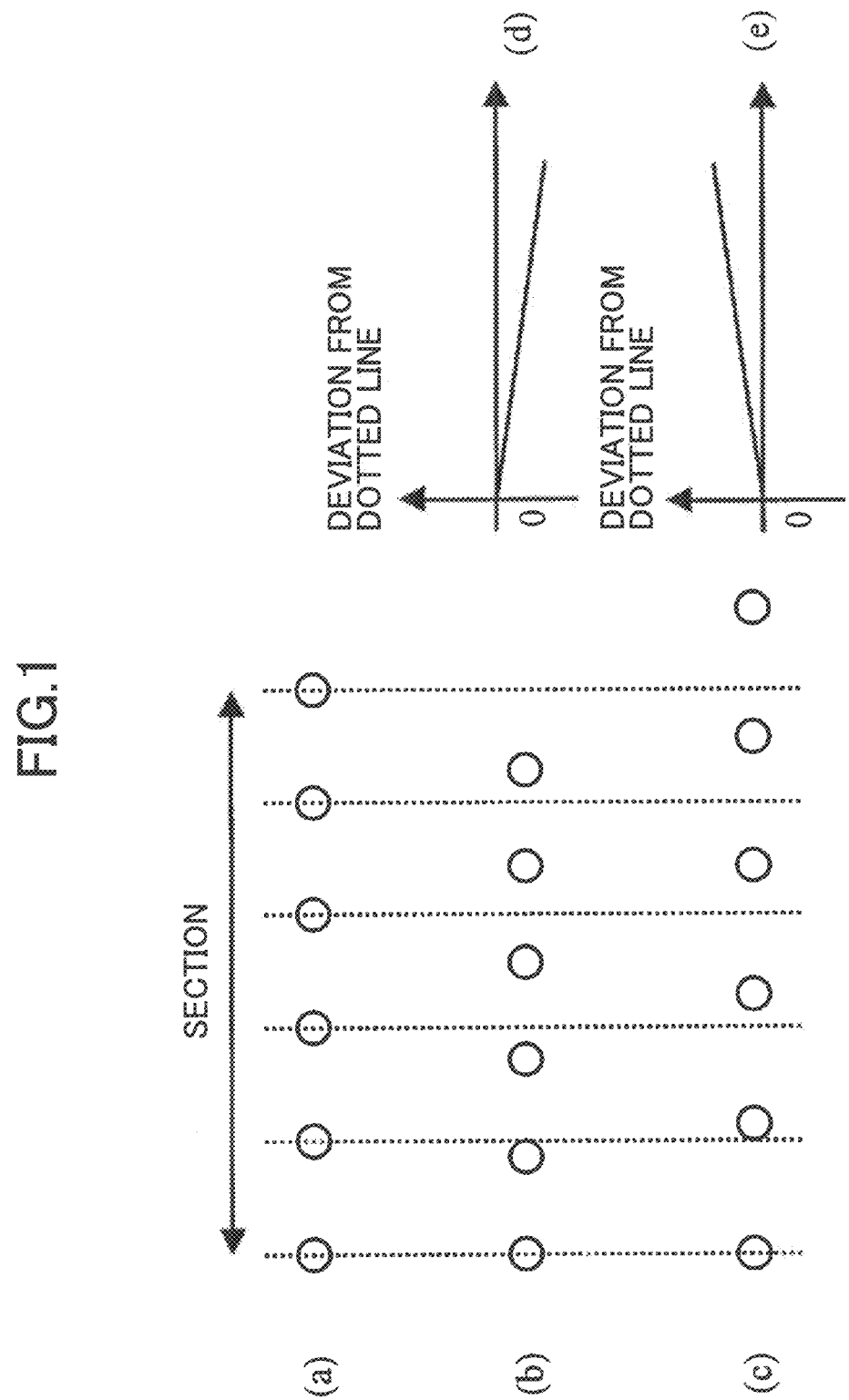
FIG. 1 is a diagram for explaining the principle of the compensation method of the beam-spot position (one section) according to the invention.
Figure 2:
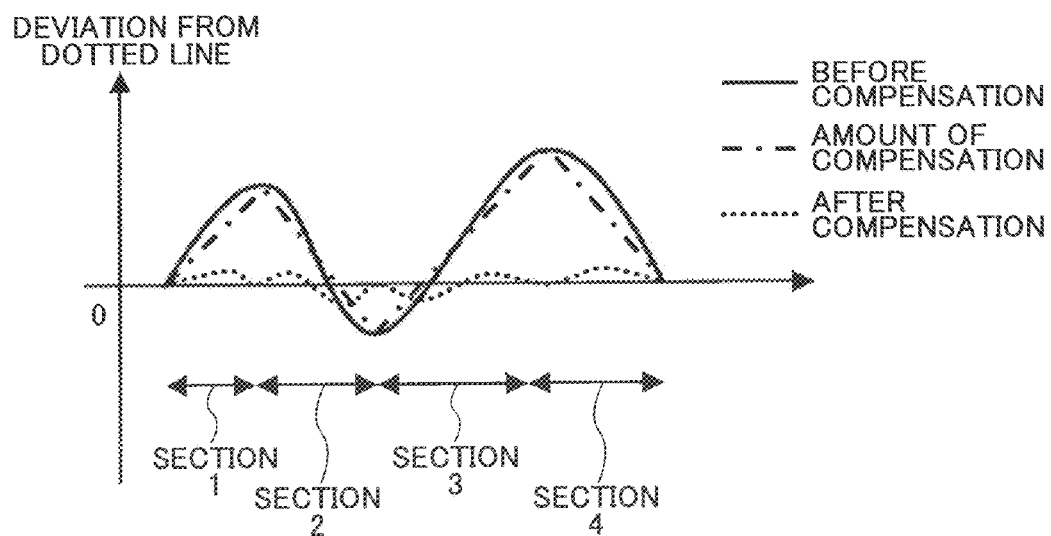
FIG. 2 is a diagram for explaining of the principle of the compensation method of the beam-spot position (two or more sections) according to the invention.
Figure 3:
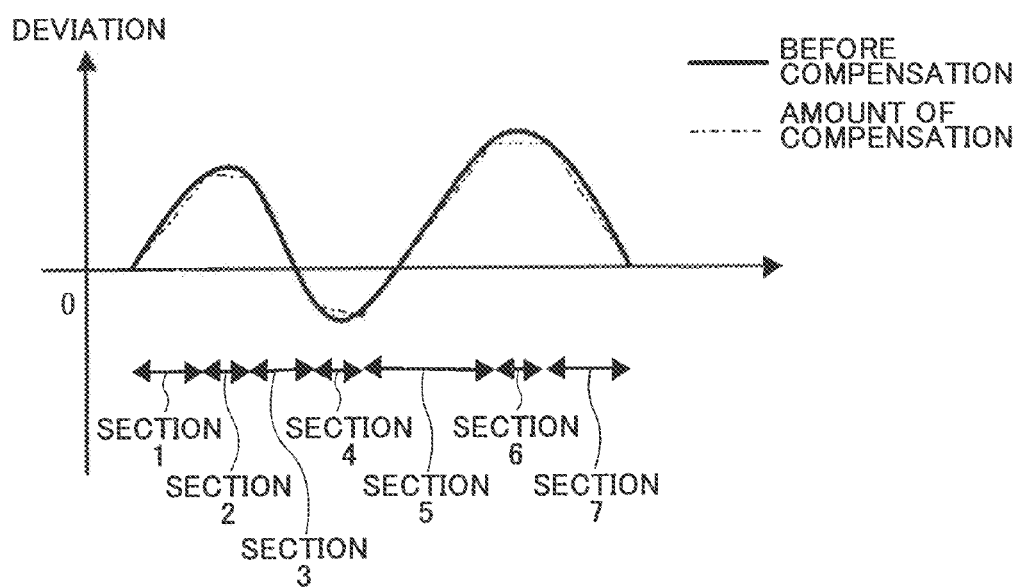
FIG. 3 is a diagram for explaining the modification of the compensation method of the beam-spot position (two or more sections) according to the invention.

The solid line of FIG. 2 shows the beam-spot position deviation before the compensation is made. The sections 1 and 3 are similar to the state of FIG. 1(c), and the sparseness of the spacings arises in these sections. The sections 2 and 4 are similar to the state of FIG. 1(b), and the denseness of the spacings arise in these sections. The compensation to change the before-compensation state indicated by the solid line into the after-compensation state indicated by the dotted line in FIG. 2 is performed by combining the states of FIG. 1(b) and FIG. 1(c) and suitably adjusting the amount of reduction (or expansion) of the beam-spot position spacings as indicated by the one-dot chain line in FIG. 2.

According to the present invention, the sparseness or denseness of beam-spot position spacing can be compensated with good accuracy.

Furthermore, according to the present invention, the compensation is performed individually for each of the plurality of sections, and there are the merits that the compensation data can be easily created and the algorithm of the compensation is simple.

Since it is easy to create the compensation data and it is hard to create the error in the preparation of the compensation data, the compensation of the sparseness or denseness of the beam-spot position spacings is possible with good accuracy.

Alternatively, in FIGS. 1(b) and (c), the reduction or expansion of the spacings is not made at equal intervals, and if the beam-spot position spacing is varied so that it is expressed by the 2nd or 3rd order function on the diagrammatic chart functional, then it is possible to attain the compensation with better accuracy.

However, the compensation algorithm in such a case becomes complicated, the circuit is complicated, or the creation of the compensation data takes much time at the time of factory shipment, and there is the demerit that the cost increase arises.

For improvement in compensation accuracy, since it is realizable also by the approach of taking the section finely, in the section, it is good to reconcile good accuracy, low cost, and simplified compensation algorithm, as it reduces or expands at spacing which can consider that beam-spot position spacing is equal intervals.

Alternatively, as shown in FIG. 7, it is possible to make it the manner of changing the beam-spot position spacing at every fixed interval. FIG. 7 shows the manner how the beam-spot position spacing is changed at fixed intervals of one pixel.

In FIG. 7, the black dot indicates the pixel with which the spacing with the left-hand pixel is changed. When it is expressed with the diagrammatic chart, the linear change in FIG. 2 is turned into the stairway change in FIG. 3.

However, it can be regarded as the straight line, and it can be considered that it is expanded or reduced at the intervals which can be considered as being equal intervals. For this reason, it is contained in the scope of the present invention when changing the beam-spot position spacing at the fixed intervals as shown in FIG. 7.

Alternatively, the positions where the beam-spot position spacing is varied may be arranged at random, instead of changing the beam-spot position spacing at the fixed intervals.

In the ends of each section, also in the middle of the section, it can bring close for the purpose of the beam-spot position, and the good-accuracy compensation is attained by making it the beam-spot position deviation from the target become approximately 0.

When the scanning region is divided into two or more sections as mentioned above, it is preferred that the respective sections have different widths. For example, when the beam-spot position deviation indicated by the solid line in FIG. 3 occurs, the width of the section where the deviation changes like the straight line is made large, and the width of the section where the deviation changes like the curved line is made small.

Thus, since the width of the divided sections is made adjustable according to the occurrence state of the sparseness or denseness of beam-spot position spacing, the sparseness or denseness of beam-spot position spacing can be compensated effectively, and with the same number of sections the improvement in compensation accuracy can be aimed at.

FIG. 4, FIG. 5 and FIG. 6 show the method of shifting the phase of the pixel clock signal based on the phase data which specifies the transition timing of the pixel clock signal, in order to adjust the emission timing of the light beam.

As shown in FIG. 4, the pixel clock generator circuit 10 comprises the high-frequency-clock generator circuit 11, the counter 12, the comparator circuit 13, and the pixel clock control circuit 14.

The high-frequency-clock generator circuit 11 generates the high-frequency-clock VCLK used as the reference of the pixel clock PCLK. The counter 12 is the counter which operates at the rising edge of the high-frequency-clock VCLK to count the VCLK.

The comparator circuit 12 compares the counter value with the phase data which specifies the amount of phase shift as the externally given transition timing of the pixel clock, and the predetermined value, and outputs the control signal a and the control signal b based on the comparison result.

The pixel clock control circuit 13 controls the transition timing of the pixel clock PCLK based on the control signal a and the control signal b.

The phase data is the data which specifies the phase shift amount of the pixel clock, in order to compensate scanning variance which arises with the characteristics of the scanning lens, or to compensate rotation variance of the polygon mirror, or to compensate the dot position deviation or to compensate the dot position deviation produced with the chromatic aberration of the laser beam. Generally the phase data is given by the digital value of several bits.

Operation of the pixel clock generator circuit of FIG. 4 will be explained using the timing charts of FIG. 5A to FIG. 5C.

Suppose that the pixel clock PCLK is made into 8 times the period of high-frequency-clock VCLK, and makes the criterion the 50% duty ratio.

Figure 5A:
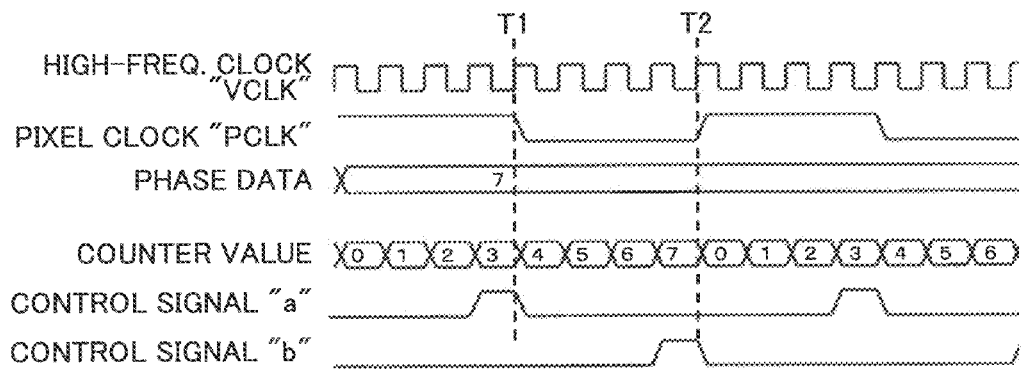
FIG. 5A, FIG. 5B and FIG. 5C are timing charts for explaining operation of the pixel clock generator circuit of FIG. 4.
Figure 5B:
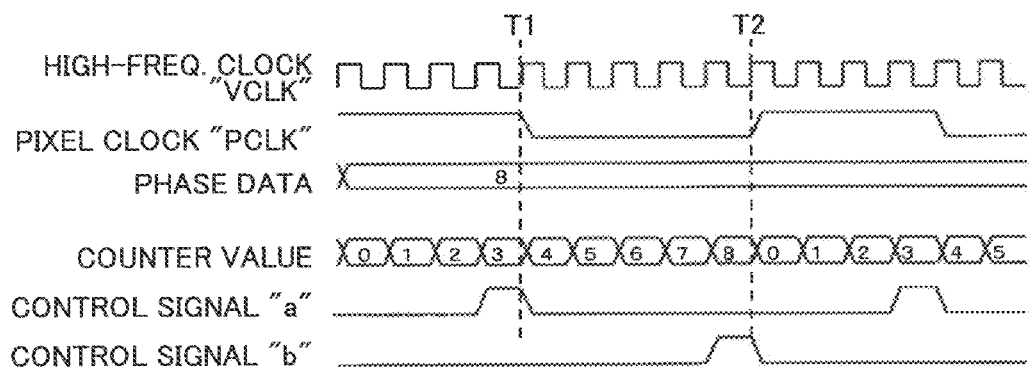
Figure 5C:
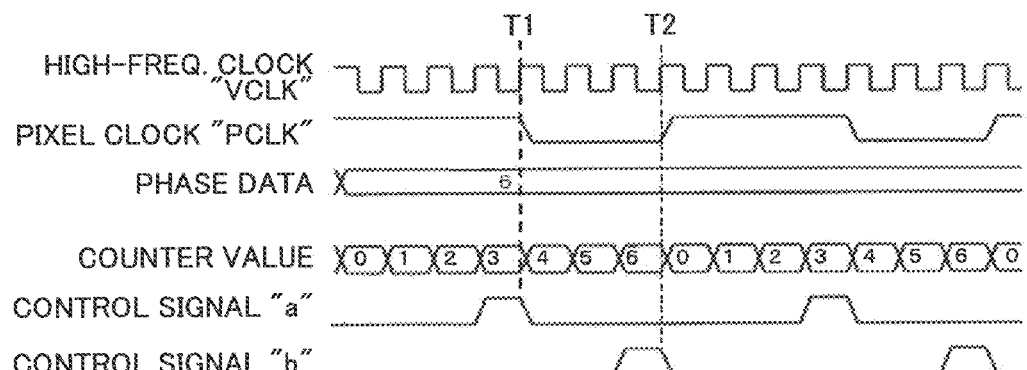

FIG. 5A shows the state that the pixel clock PCLK of the criterion of the 50% duty ratio equivalent to 8 times the period of VCLK is generated. FIG. 5B shows the state that the pixel clock PCLK in which the phase is advanced by the ⅛ clock to the 8-fold-period clock of VCLK is generated. FIG. 5C shows the state that the pixel clock PCLK in which the phase is delayed by the ⅛ clock to the 8-fold-period clock of VCLK is generated.

First, FIG. 5A will be explained. Suppose that the value "7" is given as the phase data. "3" is beforehand set to the comparator circuit 13. The counter 12 starts counting by operating at the rising edge of high-frequency-clock VCLK. The comparator circuit 13 outputs the control signal a when the value of the counter 12 becomes "3". Since the control signal a is "H", the pixel clock control circuit 13 makes the pixel clock PCLK change from "H" to "L" at the timing of the clock of T1.

Next, the comparator circuit 13 compares the given phase data and the counter value, and if the match occurs, it will output the control signal b.

In FIG. 5A, the comparator circuit 13 outputs the control signal b when the value of the counter 12 becomes "7." Since the control signal b is "H", the pixel clock control circuit 14 makes the pixel clock PCLK change from "L" to "H" at the timing of the clock of T2.

At this time, the comparator circuit 13 makes the counter 12 reset simultaneously, and makes the counter 12 start counting from 0 again. Thereby, as shown in FIG. 5A, the pixel clock PCLK of the 50% duty ratio equivalent to 8 times the period of high-frequency-clock VCLK can be generated.

In addition, if the set point of the comparator circuit 13 is changed, the duty ratio will change.

Next, FIG. 5B will be explained. Suppose that "8" is given as the phase data. The counter 12 counts the high-frequency-clock VCLK. The comparator circuit 13 outputs the control signal a when the value of the counter 12 becomes "3". Since the control signal a is "H", the pixel clock control circuit 14 makes the pixel clock PCLK change from "H" to "L" at the timing of the clock of T1.

Next, if the comparator circuit 13 detects that the value of the counter 12 is in agreement with the given phase data (8), it will output the control signal b. Since the control signal b is "H", the pixel clock control circuit 14 makes the pixel clock PCLK change from "L" to "H" at the timing of the clock of T2.

At this time, the comparator circuit 13 makes the counter 12 reset simultaneously, and makes the counter 12 start counting from 0 again. Thereby, as shown in FIG. 5B, the pixel clock PCLK in which the phase is advanced by the ⅛ clock to the 8-fold-period clock of high-frequency-clock VCLK can be generated.

Next, FIG. 5C will be explained. Suppose that "6" is given as the phase data. The counter 12 counts the pixel clock VCLK. The comparator circuit 13 outputs the control signal a when the value of the counter 12 becomes "3". Since the control signal a is "H", the pixel clock control circuit 14 makes the pixel clock PCLK change from "H" to "L" at the timing of the clock of T1.

Next, if the comparator circuit 13 detects that the value of the counter 12 is in agreement with the given phase data (6), it will output the control signal b. Since the control signal b is "H", the pixel clock control circuit 14 makes the pixel clock PCLK change from "L" to "H" at the timing of the clock of T2.

At this time, the counter 12 is made to reset simultaneously, and starts counting from 0. Thereby, as shown in FIG. 5C, the pixel clock PCLK in which the phase is delayed by the ⅛ clock to the 8-fold-period clock of high-frequency-clock VCLK can be generated.

In addition, if the phase data is given in synchronism with the rising edge of the pixel clock PCLK, it is possible to change the phase of the pixel clock PCLK for every clock. FIG. 6 is the timing chart for explaining such modification of the operation of the pixel clock generator circuit of FIG. 4.

As mentioned above, with simple composition, it is possible to control the phase of the pixel clock PCLK in the ± direction in clock width of high-frequency-clock VCLK, that is, the compensation of the beam-spot position spacing is attained.

Furthermore, the scanning/focusing lens in the optical scanning device usually is compensated so that the main scanning beam-spot position is varied linearly to the rotation of the optical deviation device (linearity compensation). By using the above-mentioned method, it becomes possible to loosen the compensation, and improvement in the engine performance of other optical properties, and the formation of the scanning lens with small and uniform thickness (main wall thickness and the circumference there are few thick differences) can be attained.

The formation of a small and uniform thickness scanning lens is advantageous to the machining, and since the high scanning lens of profile irregularity can be manufactured by the low cost, the merit which can weaken linearity compensation is very large.

As mentioned above, since it is possible to make it change for every clock as for the phase of the pixel clock PCLK, although the high-quality compensation is possible, if the phase is changed for every clock, since it is necessary to have phase data in the memory for every clock, the memory of the considerable amount is needed and the cost rise is caused.

To obviate the problem, it is suitable that it is made to carry out the phase shifting at intervals of a fixed period. Thereby, the amount of the memory can be reduced remarkably.

In addition, the "phase data" according to the invention includes not only the data that specifies the amount of phase shifting as mentioned above but also the information that specifies the intervals of a specific number of the pixels at which the phase shifting should be performed.

The larger the number of the divided sections, the more the compensation accuracy improves. However, if the number of sections is increased, the amount of the memories needed will be increased and, the cost increase will be caused.

By taking into consideration the amount of memories and the cost as well as the compensation accuracy, it is preferred that the number of sections is 15 or less. If the number of sections is 15 or less, the compensation with the permissible level of accuracy is attained.

Therefore, it is good to aim at the cost reduction by the reduced amount of memories, setting the number of sections as the 15 or less divisions, and preventing the deterioration of compensation accuracy.

Figure 8:
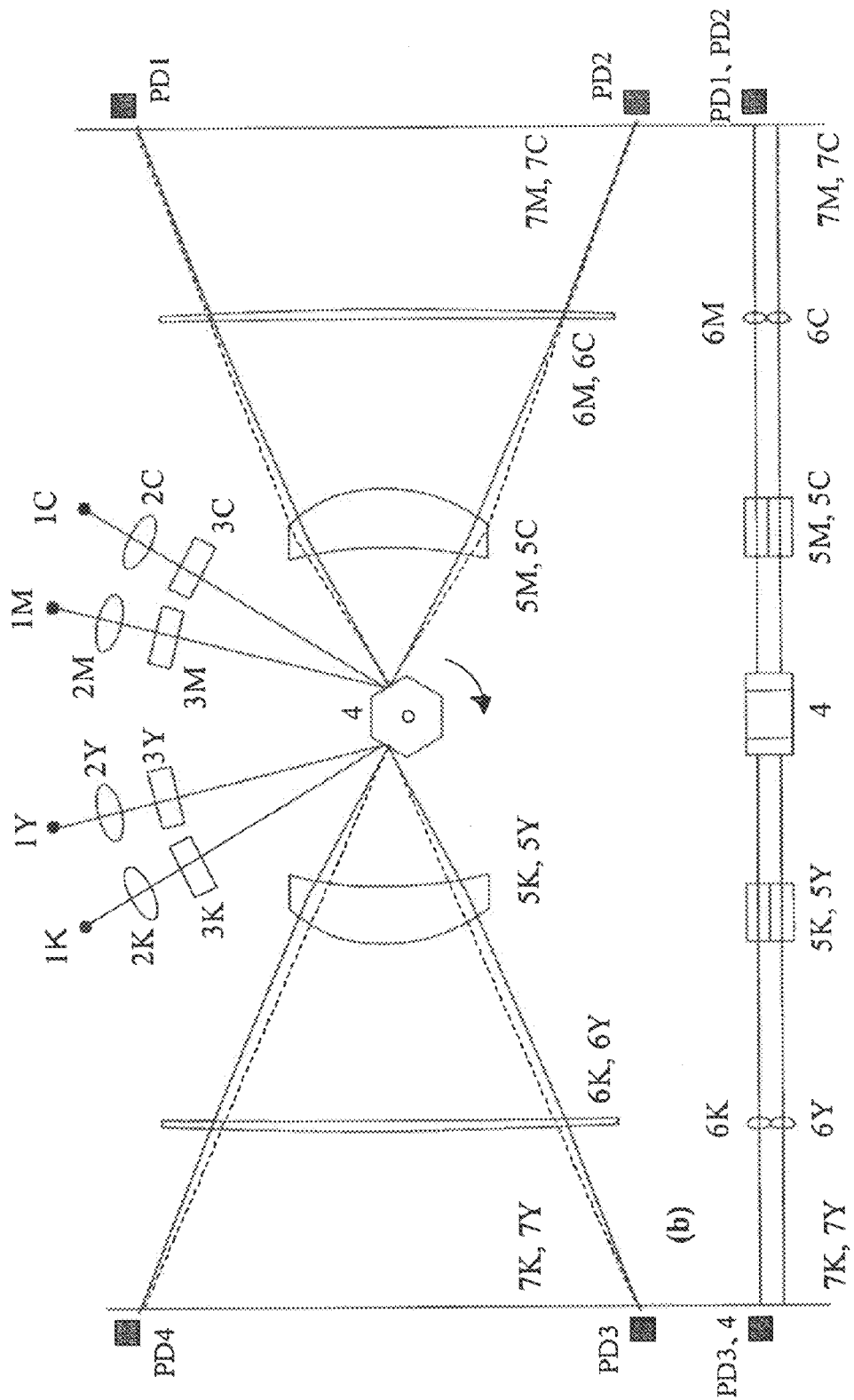
FIG. 8 is a diagram showing one embodiment of the optical scanning device of the invention which is applied to the 4-drum tandem-type color image forming device.

FIG. 8 shows the embodiment of the optical scanning device of the invention which is applied to the 4-drum tandem-type color image forming device.

FIG. 8(*a*) shows the state of the optical arrangement of the optical scanning device when viewed from the sub-scanning direction, and FIG. 8(*b*) shows the state of the optical arrangement of the optical scanning device when viewed from the main scanning direction.

For simplification of illustration, the optical path from the deflector unit to the scanned surface is developed in a linear manner.

In the following, Y, M, C, and K show each color of the yellow, the magenta, the cyan, and the black.

In FIG. 8(*a*), the laser light sources 1Y-1K are the semiconductor lasers, and emit the light beams for writing in the yellow (Y), the magenta (M), the cyan (C), and the black (K) the electrostatic latent images which are visualized with each color toner, respectively. 2Y-2K denote the coupling lenses, and 3Y-3K denote the cylindrical lenses.

The light beam emitted from the laser light source 1K (1Y) is converted to the parallel light beam by the coupling lens 2K (2Y). The light beam after the beam shaping is carried out by the aperture (not shown) is converged only in the sub-scanning direction (the direction which intersects perpendicularly with the drawing) by the cylindrical lens 3K (3Y). The slender line image of the light beam elongated in the main scanning direction is formed in the deflection/reflection surface position of the polygon mirror 4.

Similarly, the light beam emitted from the laser light source 1M (1C) is converted to the parallel light beam by the coupling lens 2M (2C). The light beam after the beam shaping is carried out by the aperture (not shown) is converged only in the sub-scanning direction by the cylindrical-lens 3M (3C). The slender line image of the light beam elongated in the main scanning direction is formed in the deflection/reflection surface position of the polygon mirror 4.

The incidence position to the polygon mirror of the light beam emitted from the laser light source 1K (1Y) and the incidence position to the polygon mirror of the light beam emitted from the laser light source 1M (1C) are almost symmetrical positions with respect to the flat surface of the polygon mirror containing the revolving shaft of the polygon mirror.

In the arrangement of FIG. 8, the light beams for scanning of the yellow (Y) and black (K) are arranged on the same side, and the light beams for scanning of the cyan (C) and magenta (M) are arranged on the same side. However, the present invention is not limited to this embodiment, and the combination may be changed.

The polygon mirror 4 has the six deflection/reflection surfaces, and in the arrangement of FIG. 8 each deflection/reflection surface is the single reflection surface in the direction of the revolving shaft. It is possible to form the circular groove which has the diameter slightly smaller than that of the inscribed circle of the polygon mirror 4 in the portion between the light beams which is not used as the deflection/reflection surface.

The four light beams from the laser light sources are simultaneously deflected with the equal angular velocity with the uniform rotation of the polygon mirror 4. The four light beams deflected are respectively sent to the scanned surfaces 7Y-7K through the scanning/focusing lenses 5Y-5K and the scanning/focusing lenses 6Y-6K, so that they are focused on the scanned surfaces 7Y-7K as the optical spots and perform the optical scanning of the scanned surfaces.

As shown in FIGS. 8(*a*) and (*b*), the scanning/focusing lenses 5Y-5K and 6Y-6K constitute the focusing unit.

The scanning/focusing lens 5Y and scanning/focusing lens 6Y constitute the scanning/focusing optical system which forms the optical spot to perform the optical scanning of the scanned surface 7Y. The scanning/focusing lens 5K and scanning/focusing lens 6K constitute the scanning/focusing optical system which forms the optical spot to perform the optical scanning of the scanned surface 7K. The scanning/focusing lens 5C and scanning/focusing lens 6C constitute the scanning/focusing optical system which forms the optical spot to perform the optical scanning of the scanned surface 7C. The scanning/focusing lens 5M and scanning/focusing lens 6M constitute the scanning/focusing optical system which forms the optical spot to perform the optical scanning of the scanned surface 7M.

Namely, the "focusing unit" comprises the 4 sets of scanning/focusing optical systems, and specifically it is constituted by the eight scanning/focusing lenses 5Y-5K and 6Y-6K.

The scanned surfaces 7Y-7K are specifically the image supporting mediums. In the optical scanning device shown in FIG. 8, the light beams emitted by the laser light sources 1Y-1K are delivered through the deflector unit 4 and the focusing units 5Y-5K and 6Y-6K to the image-supporting mediums 7Y-7K, respectively. The optical scanning device performs the optical scanning, and it is configured so that the optical scanning of the light beams emitted by the laser light sources 1Y-1K is carried out using the common deflector unit 4. The focusing unit comprises the plural scanning/focusing lenses 5Y-5K and 6Y-6K.

The light beams which correspond to the image supporting mediums 7Y-7K, respectively are focused as the optical spots, the optical scanning is made by the light spots. The electrostatic latent image which should be visualized by the yellow toner is formed on the image-supporting-medium 7Y. The electrostatic latent images which should be visualized by the magenta toner, the cyan toner, and the black toner are formed on the image supporting mediums 7M, 7C, and 7K, respectively.

These electrostatic latent images are visualized by the toners of the respective colors, and transferred on the same sheet-like recording medium in an integrated manner, so that the color image is formed on the recording medium.

And this color image is fixed to the sheet-like recording medium. In the above-described embodiment, the light beam from each laser light source is formed into the parallel light beam with the coupling lens, and the scanning optical system can also be constituted so that the light beam after the coupling lens transparency may be made into the weak convergence light beam or the weak emission light beam.

Furthermore, the present invention can provide the beam-spot position compensation unit which can compensate the sparseness or denseness of beam-spot position spacing, and can compensate the sparseness or denseness of the beam-spot position spacing with good accuracy and simple algorithm by the beam-spot position compensation method.

Next, the color image forming device equipped with the plurality of optical scanning devices will be explained.

Figure 9:
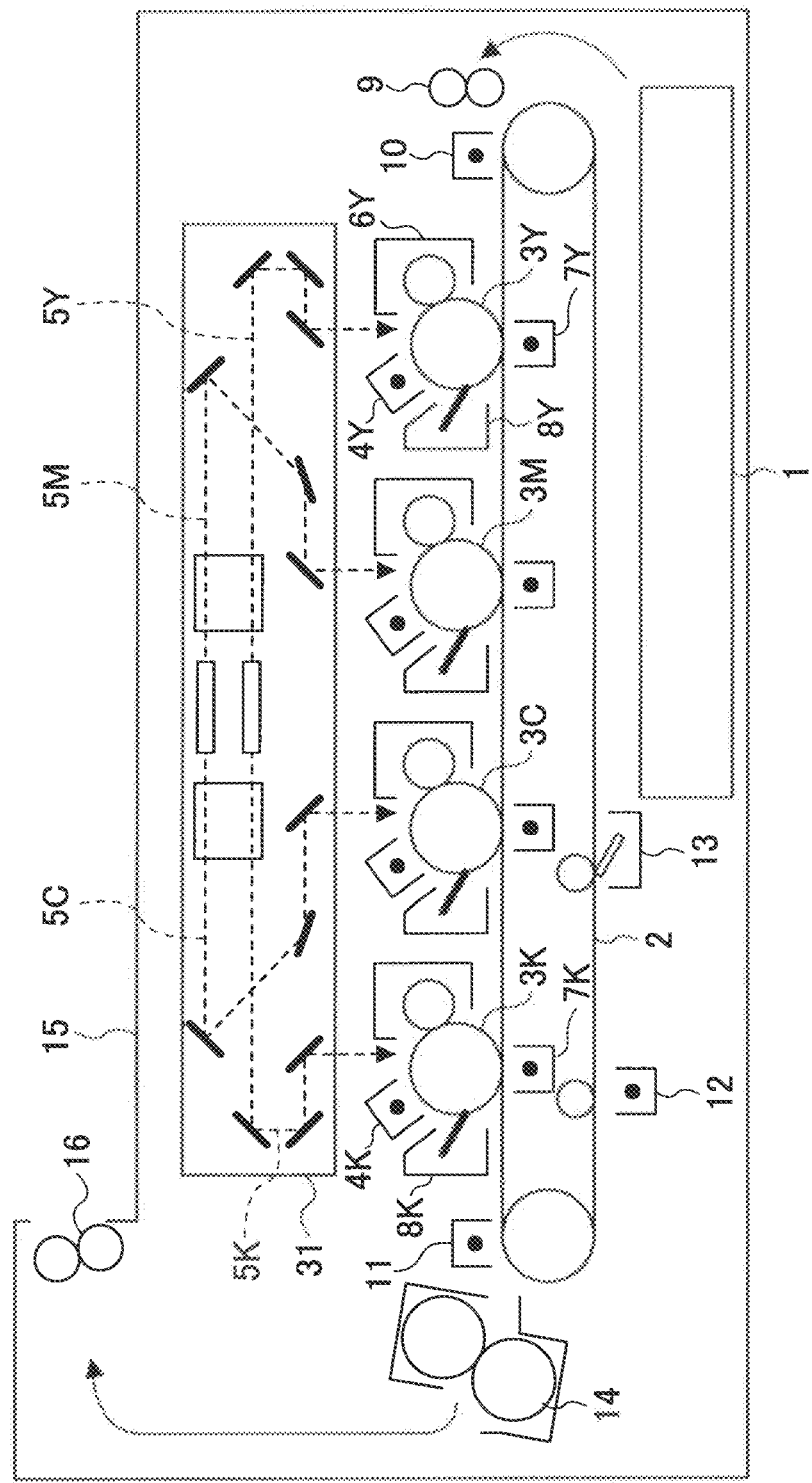
FIG. 9 is a diagram showing the composition of the tandem type full color laser printer to which the beam-spot position compensation method of the invention is applied.

FIG. 9 shows the tandem type full color laser printer to which the present invention is applied.

The conveyance belt 2 which conveys the copy sheet (not shown) to which is horizontally arranged in the lower part side in the device, and the paper is fed from the feed cassette 1 is formed.

On the conveyance belt 2, the photoconductor 3K for black K, the photoconductor 3C for cyan C, the photoconductor 3M for magenta M, and the photoconductor 3Y for yellow Y are arranged at equal intervals sequentially from the upstream side.

In the following, the subscripts Y, M, C, and K are attached suitably for the indication of each color.

These photoconductors 3Y, 3M, 3C, and 3K are formed to have the same diameter, and the process components are arranged in order on the periphery of each photoconductor according to the electrophotographic printing process.

The electrification charger 4Y, the scanning optical system 5Y, the developing unit 6Y, the transferring charger 7Y, the cleaning device 8Y, etc. are arranged on the periphery of the photoconductor 3Y in order. This is the same also to the other photoconductors 3M, 3C, and 3K.

That is, in the present embodiment, the photoconductors 3Y, 3M, 3C, and 3K are made to the irradiated surfaces set up for the respective colors, and the scanning optical systems 5Y, 5M, 5C, and 5K are formed in the one-to-one correspondence with these photoconductors.

Alternatively, it is possible to make it located in the upstream side rather than photoconductor 5Y, and the resist roller 9 and the belt electrification charger 10 are formed, rather than photoconductor 5K, the perimeter of the conveyance belt 2 is located in the downstream side, and the belt separation charger 11, the electric discharge charger 12, and the cleaning device 13 are prepared in it in order.

Moreover, the fixing device 14 is formed in the conveyance direction at the downstream side from the belt separation charger 11, and it is connected with the ejection roller 16 towards the ejection tray 15.

In such composition, if it is at the time of the full color mode (or the multi-color mode), based on the image signal of each color for Y, M, C, and K, the electrostatic latent image will be formed to each of the photoconductors 3Y, 3M, 3C, and 3K by the optical scanning of the light beam by each of the optical scanning devices 5Y, 5M, 5C, and 5K.

After negatives are developed with each corresponding color toner, becoming the toner image, piling up by transferring one by one on the copy sheet adsorbed and conveyed by the electrostatic target on the conveyance belt 2 and being established as a full color image, the paper is delivered to these electrostatic latent images.

By making into the optical scanning device of the present invention the optical scanning device which arranged the optical scanning optical systems 5Y, 5M, 5C, and 5K of the image forming device, there is no color deviation and the image forming device which provides high-quality image repeatability can be realized.

The optical scanning device in this image forming device can be equipped with the beam-spot position compensation unit of the invention which can compensate the sparseness or denseness of the beam-spot position spacing with good accuracy and simple algorithm by the beam-spot position compensation method.

Therefore, it becomes possible to compensate the color deviation with good accuracy, and the high-quality image can be acquired.

Furthermore, if the color deviation is small stopped in early stages (at the time of factory shipment) by the beam-spot position compensation unit which can compensate the sparseness or denseness of the beam-spot position spacing, since the color deviation generated under the influence of change with the passage of time, such as temperature change, can also be stopped small, the number of times, such as beam-spot position compensation which detects the toner patch, is reducible. Therefore, the toner consumption can be reduced.

In recent years, the request quality to the color image has been increasing. In the color image, the absolute position (which corresponds to the image strain) of the beam spot and the relative position between each color of the beam-spot position (which corresponds to the color deviation) are raised as an important factor which influences quality.

The absolute position accuracy of the beam spot which is required for various applications, excluding the applications, such as the output of the CAD drawing, is low. However, the required accuracy of the relative beam-spot positions between the colors, i.e., the color deviation, is very high, and even if it is a slight color deviation, that is recognized.

Therefore, it is very important for upgrading of the color image to compensate by specializing in the relative beam-spot positions between the colors (which corresponds to the color deviation).

It is hard to say that color deviation reduction effective from the viewpoint of color deviation reduction is made since it becomes complicated that the amount which will usually be compensated if it compensates so that it may stand in a line at equal intervals altogether, although it is possible to compensate both relative positions between the absolute position of the beam spot and each color if it compensates so that all the beam-spot positions corresponding to each color may be stood in a line at equal intervals becomes large the occurrence situation of the sparseness or denseness of beam-spot position spacing.

In order to perform effective color deviation compensation, it is good to compensate the scanning beam-spot position corresponding to other color on the basis of the scanning beam-spot position corresponding to one certain color rather than to compensate all scanning beam-spot position spacing of each color at equal intervals.

The scanning beam-spot position interval for each color is not made at intervals, but it is carrying out the criteria of the scanning beam-spot position corresponding to one certain color, and the quantity of compensation is reduced. Thus, the effective compensation is attained, and the color deviation can be reduced effectively.

As for the scanning beam-spot position deviation corresponding to the color made into the criteria of the compensation, not compensating is desirable. Thus, simplification of the adjustment process is attained and the cost cut becomes possible.

However, as mentioned above, the scanning beam-spot position deviation corresponding to the color made into the criteria of the compensation may be unable to reduce the color deviation effectively, when the manufacture error occurs greatly in the optical scanning device or image forming device corresponding to the color made to the reference position, supposing it did not compensate.

When such, it is good to compensate the scanning beam-spot position corresponding to the color to the reference position.

If it compensates so that beam-spot position spacing may become at equal intervals in case the scanning beam-spot position corresponding to the color to the reference position is compensated, when compensating on the basis of the scanning beam-spot position corresponding to color to the reference position, the situation of the sparseness or denseness which the amount of compensation becomes large and are compensated can become complicated, the effective compensation cannot be performed, and the color deviation cannot decrease effectively.

Therefore, in case the scanning beam-spot position corresponding to the color to the reference position is compensated, it is good not to compensate so that beam-spot position spacing may become at equal intervals, and to compensate so that the sparseness or denseness of a certain constant rate may remain.

By making it such, in case it compensates on the basis of the beam-spot position corresponding to color other than criteria, the amount of compensation can be made small, and the occurrence situation of the sparseness or denseness of the beam-spot position can be simplified comparatively, the more effective compensation is attained, and the color deviation can be reduced effectively.

About whether it compensates so that what sparseness or denseness may remain, it is good to, set up the sparseness or denseness of beam-spot position spacing which it already has on the design, the sparseness or denseness of beam-spot position spacing which is on manufacture and is easy to generate, etc. for example.

As order which compensates the beam-spot position deviation, the color deviation can be effectively compensated by performing the following steps: (1) it compensates so that the beam-spot position corresponding to each pixel of the color used as criteria may serve as desired value set up beforehand; and (2) the beam-spot position of the color which serves as criteria after the compensation is carried out in the beam-spot position corresponding to each pixel of other color is made into desired value, and difference is compensated.

Figure 10:
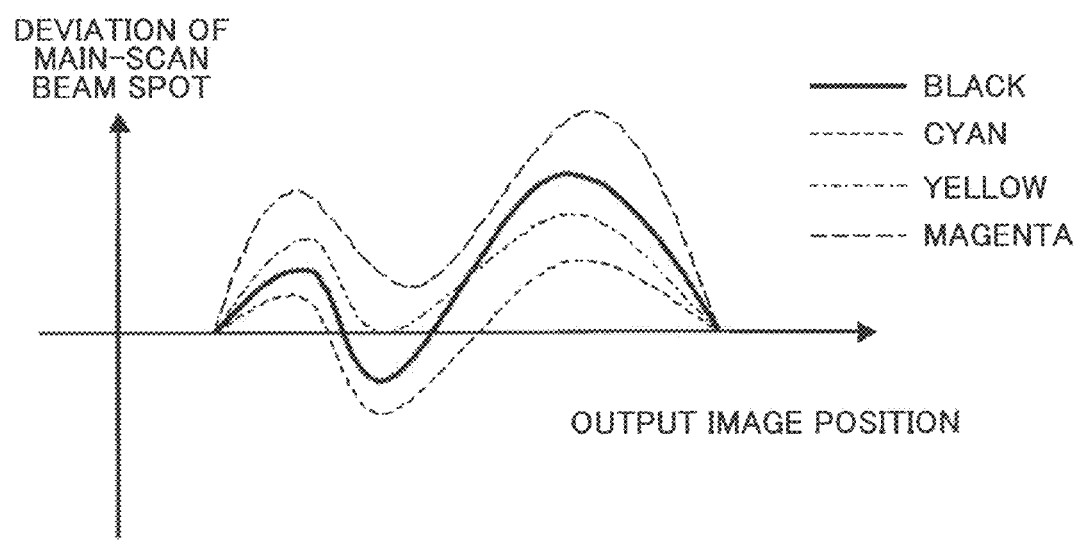
FIG. 10 is a diagram for explaining the position deviation of the scanning beam spot between the respective colors.
Figure 11:
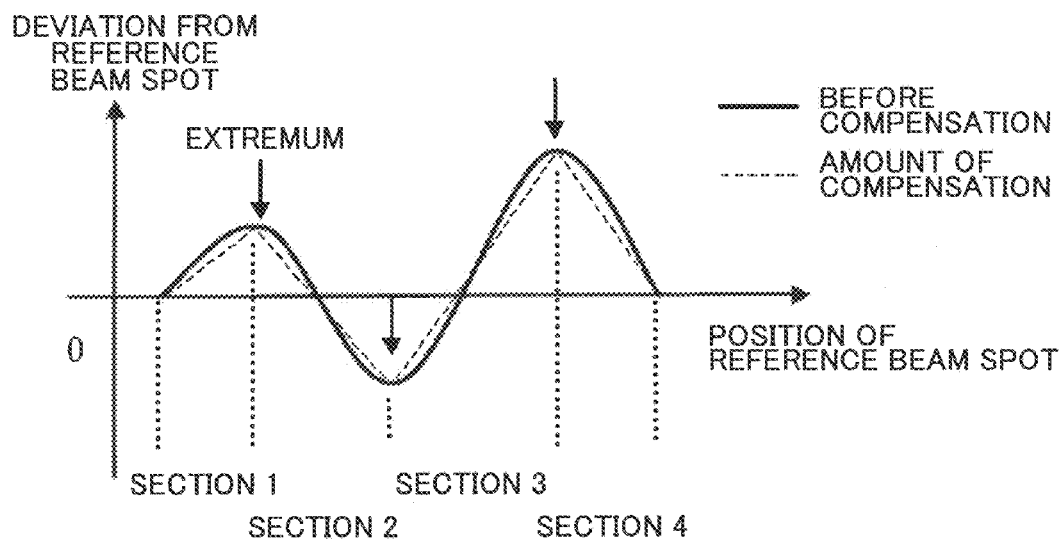
FIG. 11 is a diagram for explaining an example of the compensation which compensates the beam-spot position deviation to the reference position.

In molding of the scanning/focusing lens, the same manufacture error occurs in many cases. When the manufacture error of the scanning/focusing lens contributes to the beam-spot position deviation greatly, it has the inclination which resembled the scanning beam-spot position deviation between each color (FIG. 10).

When such, even if it set up the division position identically in all color, when the division position is optimized and set up for every color, even if it compares, almost equivalent compensation accuracy is acquired, and simplification of the adjustment process can plan, and the cost cut becomes possible.

In case the beam-spot position corresponding to each pixel is compensated to the beam-spot position used as the target or criteria, when defining the difference with the beam-spot position used as the target or criteria after performing beam-spot position compensation as mentioned above as the beam-spot position compensation remainder, in each section, it is good to make the compensation remainder remain in the equivalent grade.

As mentioned above, in case the beam-spot position corresponding to each pixel is compensated to the beam-spot position used as the target or criteria, it is desirable to compensate by setting up the division position to meet the conditions:

$$a1, a2, \ldots, an < \text{average}(a1, a2, \ldots, an) \times 2$$

where a1, a2, . . . , an denote the maximum (the absolute value) of the compensation remainder in each section, and average (a1, a2, . . . , an) denotes the average of a1, a2, . . . , an.

When the above conditions are met, the compensation remainder in each section can be made into the equivalent grade in all the sections, consequently the number of sections can be stopped to the minimum, and good beam-spot position deviation compensation is attained by the low cost.

Figure 13:
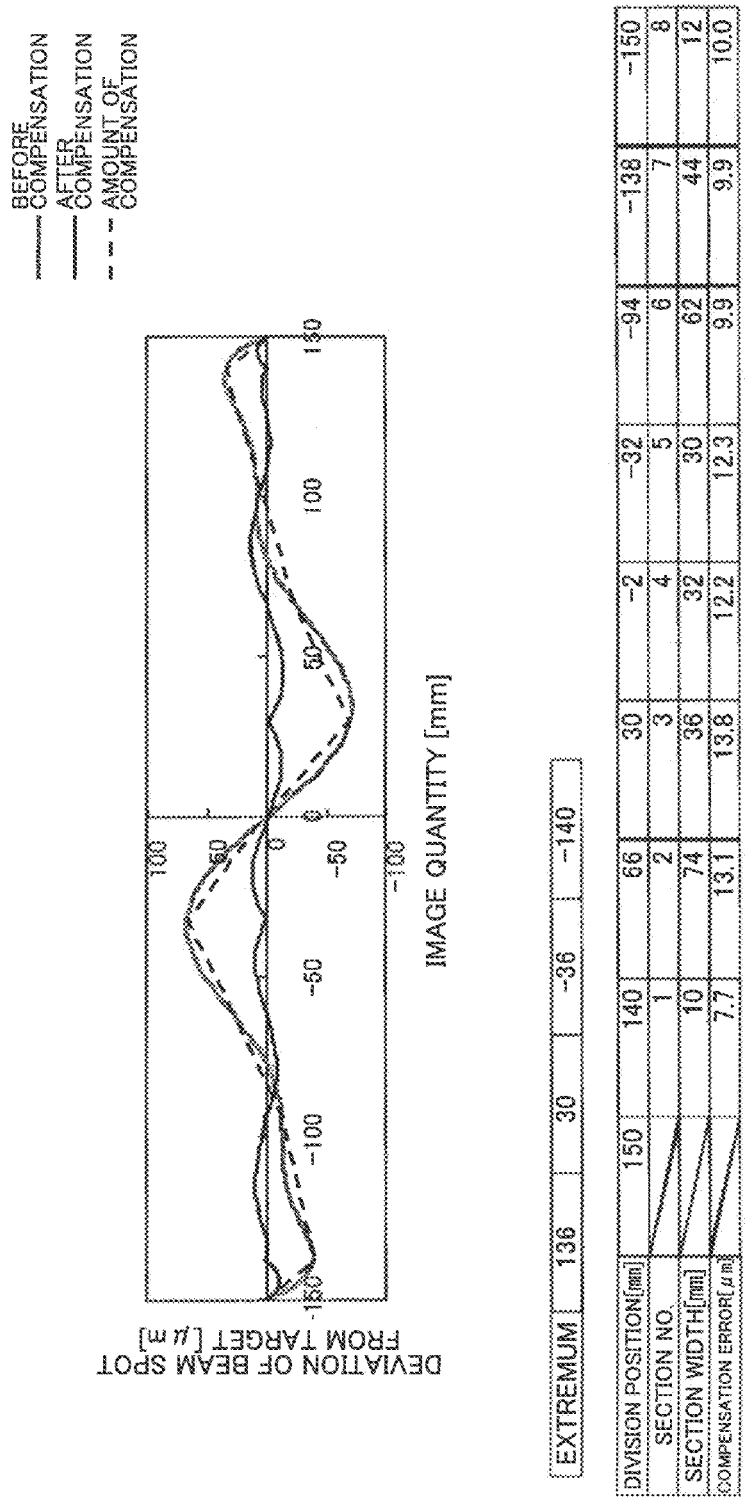
FIG. 13 is a diagram showing an example of the beam-spot position deviation before and after the compensation is made.
Figure 14:
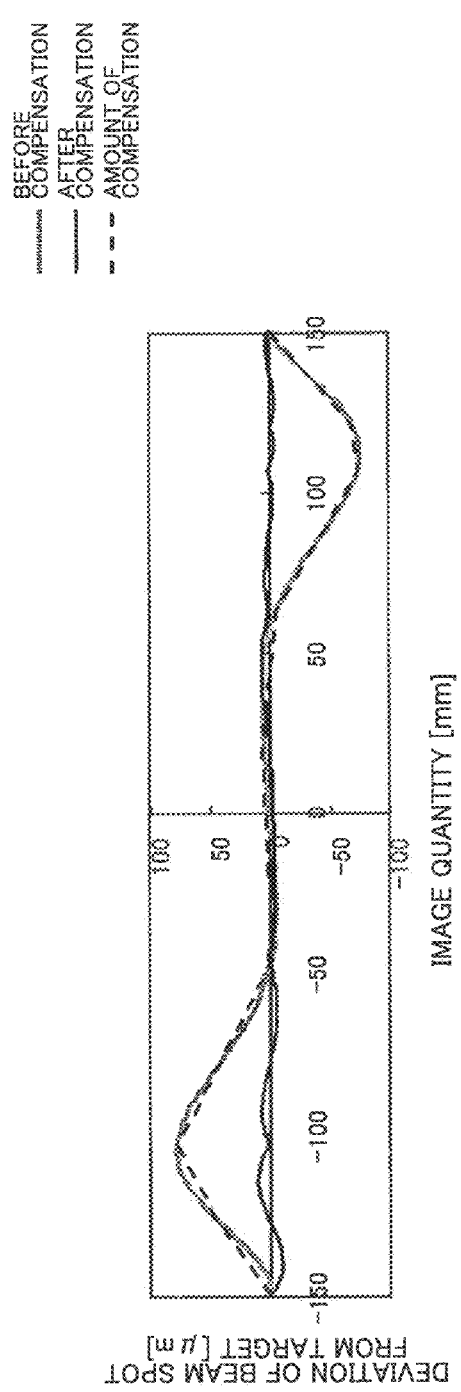
FIG. 14 is a diagram showing an example of the beam-spot position deviation before and after the compensation is made.

FIG. 13 and FIG. 14 show the embodiment in which the beam-spot position deviation is compensated according to the present invention.

In the characteristics over the image quantity of the beam-spot position deviation defined by the difference of the beam-spot position corresponding to each pixel, and the beam-spot position used as desired value or criteria, the number of the local extremum (beam-spot position spacing negligence the place which changes densely correspondence) is greatly related to compensation accuracy.

When the number and the number of sections of the local extremum are the same number grade, by setting up the division position near the image quantity used as the local extremum, the at least one place can compensate the beam-spot position deviation to the reference position most effectively (FIG. 11), and can offer the high-quality color image with few color deviations.

It is desirable to set the division position set up near the image quantity used as the local extremum as about less than ±8 mm from the image quantity used as the local extremum, it becomes possible to hold down to the color deviation of the grade permissible by setting up such, and the high-quality color image can be offered.

FIG. 13 shows the 1st example in which the beam-spot position deviation is compensated by the present invention.

The beam-spot position deviation to the target can be reduces to 14 micrometers after the compensation, which has been 71 micrometers before the compensation, and, the high-quality image can be offered.

Figure 12:
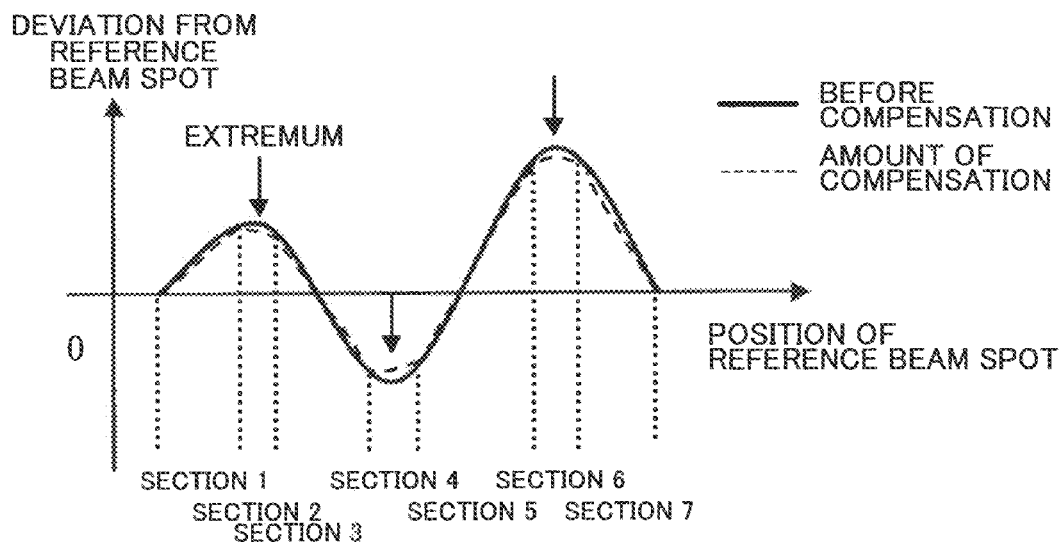
FIG. 12 a diagram for explaining an example of the compensation which compensate the beam-spot position deviation to the reference position.

Moreover, when setting up the large number of sections to the number of the local extremum, the image quantity slightly shifted establishes the at least one section corresponding to the ends of the section in both sides from the image quantity used as the local extremum, including the image quantity used as the local extremum (FIG. 12).

By setting up the section such, the beam-spot position deviation can be compensated effectively. From the image quantity which serves as the local extremum when setting the image quantity on both sides shifted more slightly than the image quantity used as the local extremum as the ends of the section, it is good to set the ends of the section as about less than ±15 mm, it is setting up such, it becomes possible to hold down to the color deviation of the permissible grade, and the high-quality color image can be offered.

FIG. 14 shows the 2nd example in which the beam-spot position deviation is compensated by the present invention.

The beam-spot position deviation to the target can be reduced to 10 micrometers after the compensation, which has been 78 micrometers before the compensation, and the high-quality image can be offered.

With reference to FIG. 15 through FIG. 42, the other preferred embodiments of the present invention will be explained.

Figure 15:
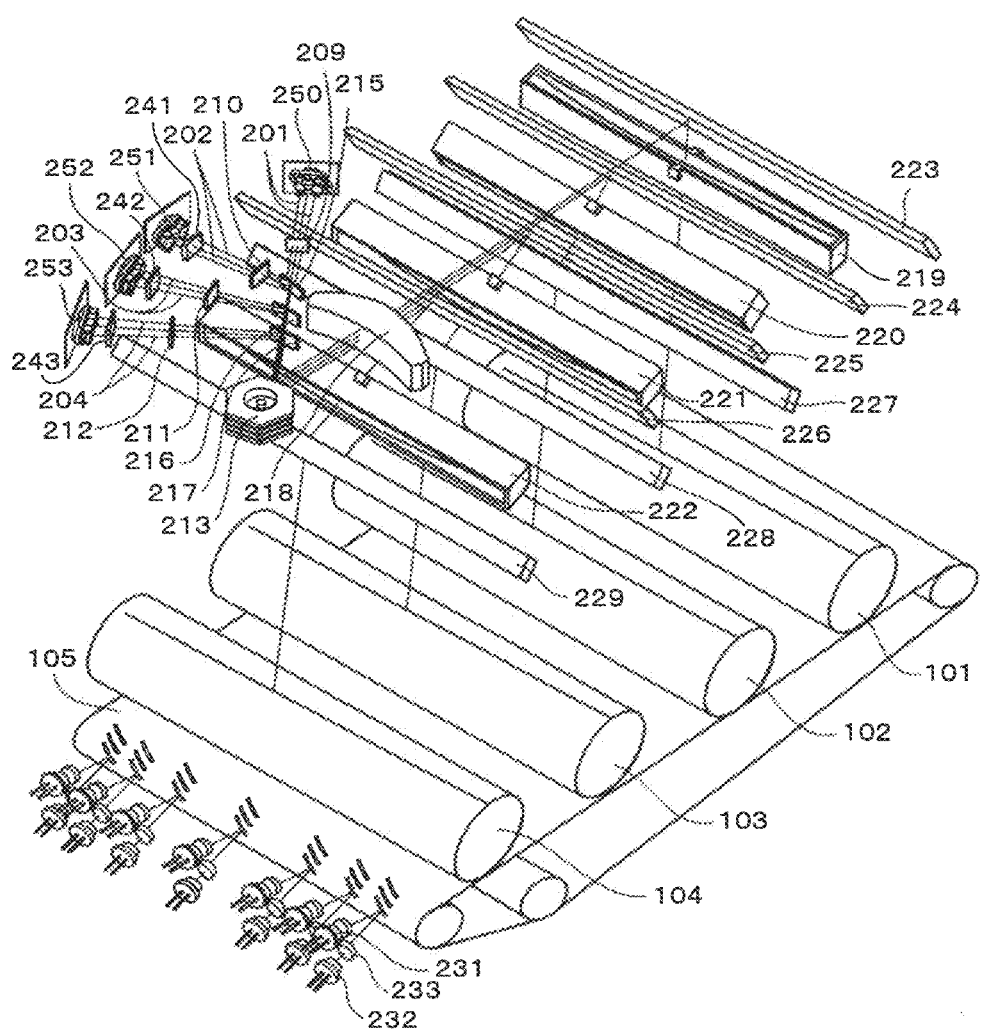
FIG. 15 is a diagram showing the composition of the optical scanning device in one preferred embodiment of the invention.
Figure 16:
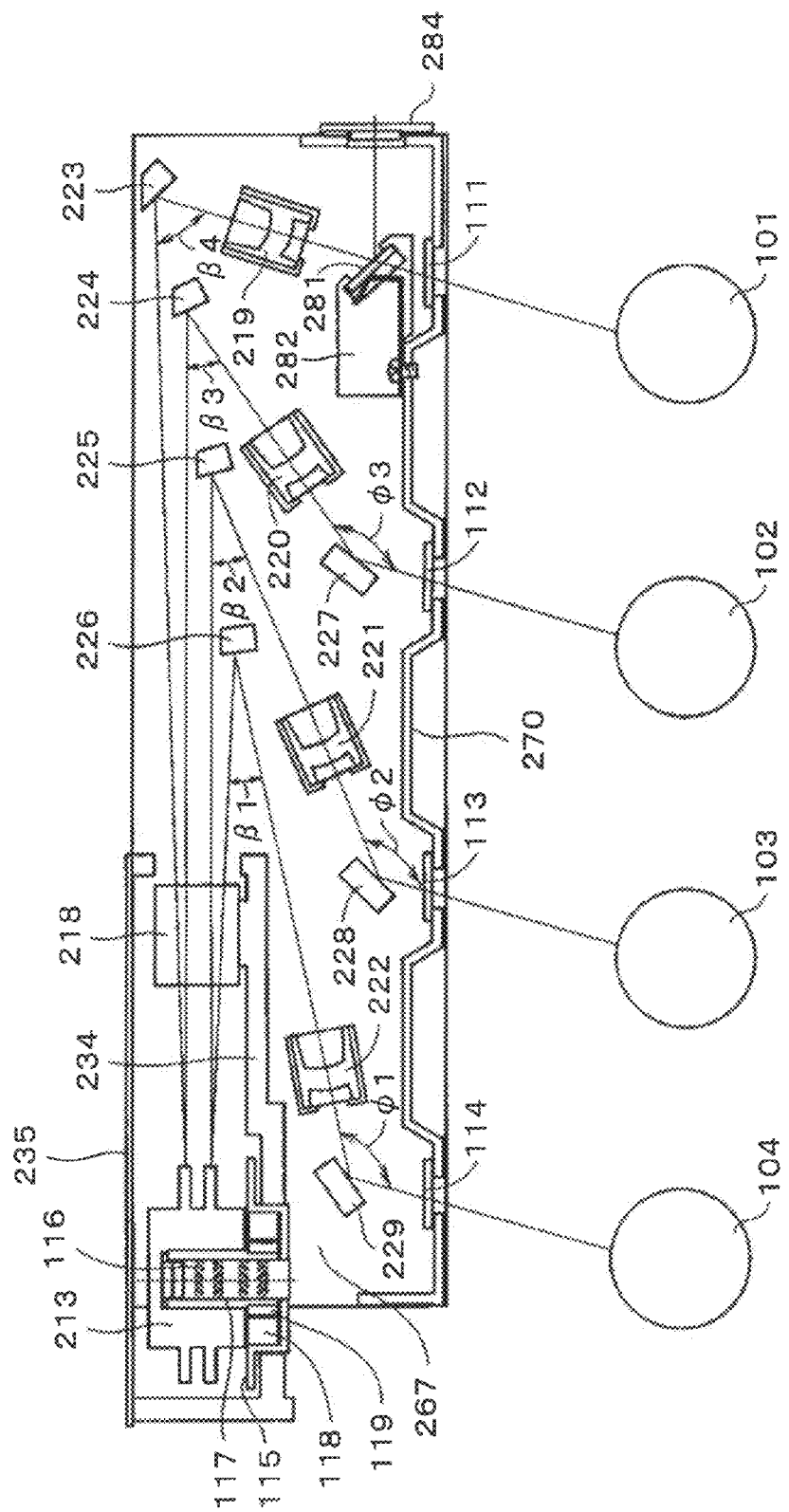
FIG. 16 is a cross-sectional view of the optical scanning device of FIG. 15 taken along the polygon mirror revolving shaft in FIG. 15.

FIG. 15 is a diagram for explaining the embodiment of the present invention. FIG. 16 is the sectional side elevation containing the polygon mirror revolving shaft in FIG. 15.

Figure 17:
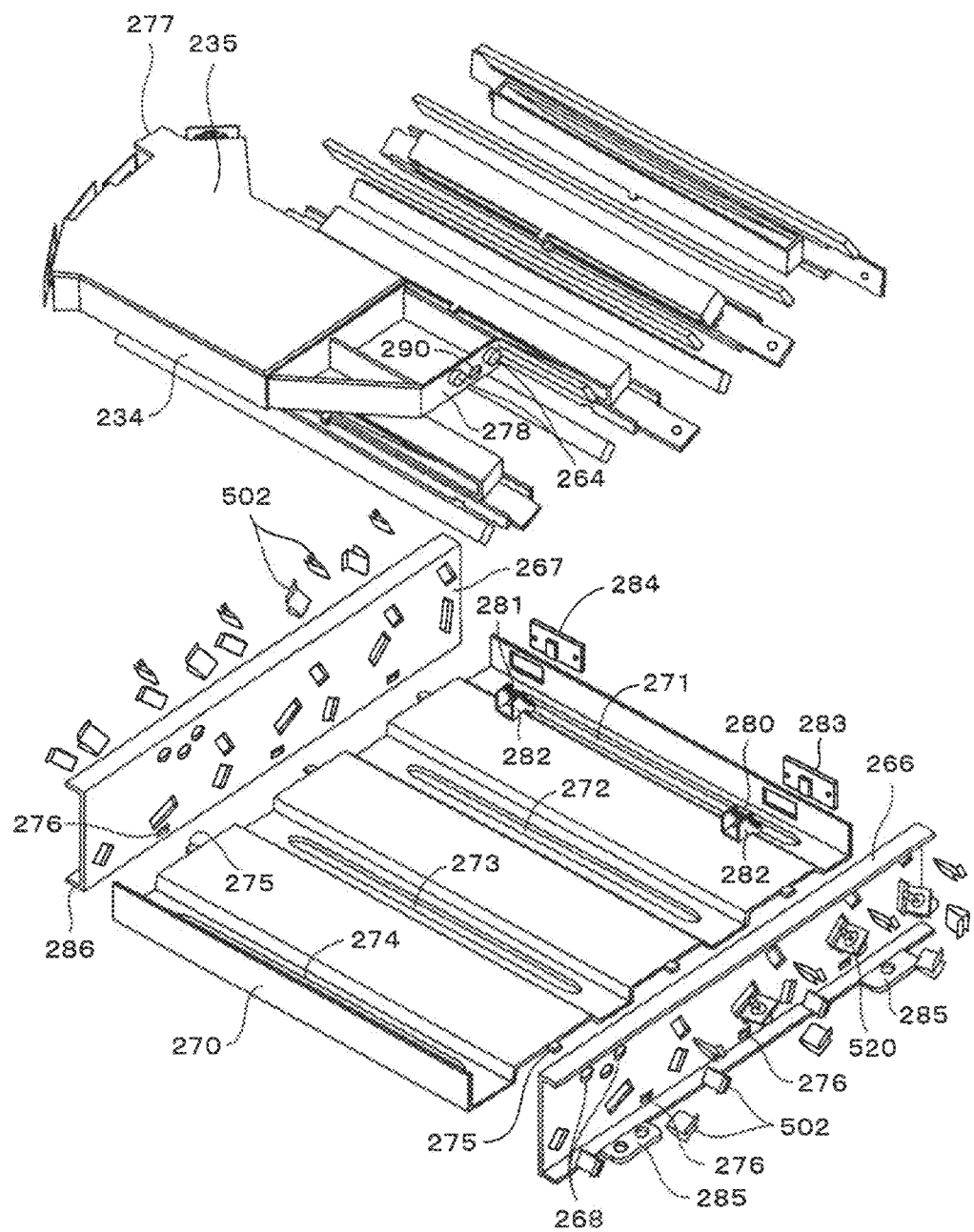
FIG. 17 is an exploded perspective diagram showing the composition of the housing.
Figure 18:
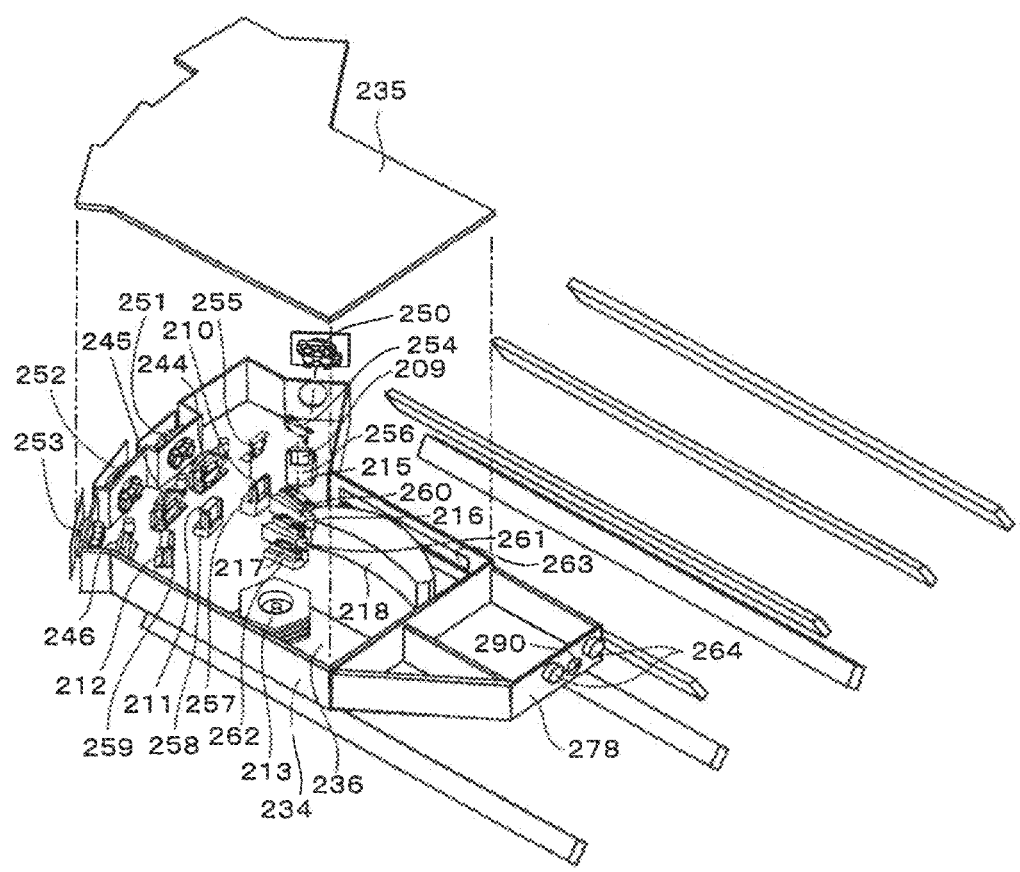
FIG. 18 is an exploded perspective diagram showing the composition of the housing.

FIG. 17 and FIG. 18 are the decomposition perspective diagrams showing the composition of housing.

In each of FIG. 15 to FIG. 18, the reference numerals 101-104 denote the photoconductor drums, 105 denotes the transferring belt, 111-114 denote the dust-proof glass, 115 denotes the polygon motor base region, 116 denotes the fixed shaft, 117 denotes the cylinder sleeve, 118 denotes the magnetic coil, 119 denotes the annular magnet, 201-204 denote the light beams, 209-212 denote the cylinder lenses, 213 denotes the polygon mirror as a deviation unit, 215-217 denote the reflective mirrors, 218 denotes the fθ lens, 219-222 denote the toroidal lenses, 223-226 denote the reflection mirrors, 227-229 denote the reflection mirrors, 231 denotes the LED component, 232 denotes the photosensor, 233 denotes the focusing lens, 234 denotes the housing, 235 denotes the covering, 236 denotes the polygon motor, 241-243 denote the non-parallel plates, 250-253 denote the light-source units, 254 and 255 denote the leaf springs, 256-259 denote the contact regions, 260-262 denote the contact regions, 263 denotes the opening of the housing wall surface, 264 and 265 denote the pins, 266 and 267 denote the side plates, 268 and 269 denote the reference holes, 270 denotes the bottom plate, 271-274 denote the slit-like openings, 275 denotes the projection, 276 denotes the engagement hole, 277 and 278 denote the housing front and rear wall surfaces, 280 and 281 denote the reflection mirrors, 282 denotes the support components, 283 and 284 denote the substrates, 285 and 286 denote the mounting surfaces, 290 denotes the screw hole, 502 denotes the wedge-like leaf spring, and 520 denotes the L-shaped bracket, respectively.

In this embodiment, the optical scanning is performed with the light beams from the four stations in one direction. The four photoconductor drums 101, 102, 103, and 104 are arranged along the movement direction of the transferring belt 105, each optical scanner is constituted from transferring the toner image of different color one by one in one in the image forming device which forms the color image, and all light beams are scanned in respect of the single polygon mirror 213 the same.

In this embodiment, it is made to scan the two lines at a time simultaneously by arranging the semiconductor laser by the pair to each photoconductor, shifting by the one-line pitch to the sub-scanning direction, and scanning according to the recording density.

In this embodiment, the light beams 201, 202, 203, and 204 from the light-source units are arranged so that it may become the position where the emission position of the light-source unit 250 separated from the housing base most highly in the part and embodiment from which the emission position differs in the sub-scanning direction for every light-source unit. And the order of the light-source units 251, 252, and 253, the optical path length from the point emitting light is arranged so that the emission direction may converge on the main scanning direction toward the deviating point of the polygon mirror, and the deviating point of the polygon mirror each it is set up so that it may become the same.

The cylinder lenses 209, 210, 211, and 212 have the flat surface for one side, and have the curvature common to the sub-scanning direction for another side, it arranges so that the optical path length to the deviating point of the polygon mirror 213 may become equal, and it converges so that it may become the line in respect of the deviation at the sub-scanning direction, and each light beam makes the surface failure compensation optical system in combination with the toroidal lens which it mentions later to the sub-scanning direction as the deviating point and photoconductor side top is conjugated.

The non-parallel plates 241, 242, and 243 are also called optical wedge, and it is put on the direction to which the optical axis and the whole surface cross at right angles, and it is the glass substrate which is able to lean other whole surface to the Lord or the sub-scanning direction slightly, and is arranged at the station (the embodiment except the beam from the light-source unit 250) except reference color, and each scanning position is stably held by carrying out roll control to the circumference of the optical axis.

The angle of reflection is keeping away the position of the reflective mirror sequentially from the polygon mirror at the same time it arranges from the deviating point so that the reflection position in the beam unification unit is near, and it may become the acute angle, and made the distance from the reflection point to the point emitting light differ, and the reflective mirrors 215, 216, and 217 as a beam unification unit are that each light-source units shift and overlap forward and backward, and they are arranged so that the printed circuit boards may not interfere.

In addition, although it is made for the beam from the light-source unit 250 to go to the direct polygon mirror without the reflective mirror, it may arrange and turn up the reflective mirror as well as other beams. Each reflection surfaces differ in the height in the shape of a stairway, and the beam from the light-source unit 250 grazes each reflective mirror top, and goes to the polygon mirror.

The beam from the light-source unit 251 is turned up by the reflective mirror 215, makes the main scanning direction approach the optical path length from the light-source unit 250, grazes the reflective mirrors 216 and 217 top, and goes to the polygon mirror. Moreover, the beam from the light-source unit 252 is turned up by the reflective mirror 216, makes the main scanning direction approach similarly, grazes the reflective mirror 217 top, and goes to the polygon mirror. Thus, from the side far from the polygon mirror, the main scanning direction of each beam is united one by one, and incidence is carried out to the polygon mirror 213.

Each beam is L=5 mm in equal spacing and the embodiment so that it may become parallel to the sub-scanning direction respectively. It emits from each semiconductor laser, and the polygon mirror reflection surface also maintains this spacing L, and incidence is perpendicularly carried out to the reflection surface. Therefore, a light-source unit to hold the semiconductor laser and the coupling lens is difficult for putting on the upper and lower sides (sub-scanning direction) physically, and is shifted and arranged at the main scanning direction.

In the embodiment, the polygon mirror 213 is formed in a certain thickness, and it is made into the configuration where prepared the slot and the windage loss is reduced more so that it may become the part between the beams which are not used for the deviation from the inscribed circle of the polygon mirror with the minor diameter a little, and it considers as the 6th face mirror and it sets thickness of the one layer to about 2 mm.

The fθ lens 218 is common to each beam, is formed in a certain thickness like the polygon mirror, and does not have the convergence power in the sub-scanning direction. It is arranged for every nothing which gave power the non-radii side configuration and nothing, and beam so that the beam may move to the main scanning direction on each photoconductor side with rotation of the polygon mirror at uniform velocity, and image-formation of each beam is carried out to the shape of a spot on the photoconductor side by the toroidal lenses 219, 220, 221, and 222 which have the surface failure compensation function of the polygon mirror, and an optical scanning unit to record the four latent images simultaneously is constituted respectively.

With each optical scanning unit, two or more reflection mirrors are arranged so that each optical path length from the polygon mirror to the photoconductor side may be in agreement, and so that the incidence position and incident angle to each photoconductor drum arranged at equal intervals may become equal.

If the optical path length is explained for every optical scanning unit, after deviating in the best layer of the polygon mirror and passing the fθ lens 218, it will be reflected by the reflection mirror 223, and the beam 201 from the light-source unit 250 will be led to the photoconductor drum 101 through the toroidal lens 219, and will form the yellow image as 1st optical scanning unit.

After the beam 202 from the light-source unit 251 is deflected in the 2nd step of layer of the polygon mirror and passes the fθ lens 218, it is reflected by the reflection mirror 224, and through the toroidal lens 220, it is led to the reflection mirror 227 and the photoconductor drum 102, and forms the magenta image as 2nd optical scanning unit.

After the beam 203 from the light-source unit 252 is deflected in the 3rd step of layer of the polygon mirror and passes the fθ lens 218, it is reflected by the reflection mirror 225, and through the toroidal lens 221, it is led to the photoconductor drum 103 by the reflection mirror 228, and forms the cyan image as 3rd optical scanning unit.

After the beam 204 from the light-source unit 253 is deflected in the lowest layer of the polygon mirror and passes the fθ lens 218, it is reflected by the reflection mirror 226, and through the toroidal lens 222, it is led to the photoconductor drum 104 by the reflection mirror 229, and forms the black image as the 4th optical scanning unit.

Among this, the reflection mirrors 224, 225, and 226 constitute the beam branch unit, first branch the beam from the light-source unit 253 which joined at the end by the beam unification unit in accordance with the flow of the beam, and branch one by one further like the beam from the light-source unit 252 branch corresponding to the order of the array of the sub-scanning direction. The degree of beam incident angle to each photoconductor drum is the same.

As shown in FIG. 18, the part from the light-source units 250, 251, 252, and 253 of four optical scanning units to the fθ lens 218 is contained by the single housing 234, and the encapsulation of the up opening is carried out with covering 235.

The polygon motor 236 is the hydrodynamic bearing manner, and as shown in FIG. 16, screw-thread fixation is carried out on the housing base on the basis of the base region 115. The fixed shaft 116 which formed the ring bone slot in the base region 115 perimeter is set up, and the rotor equipped with the cylinder sleeve 117 is inserted in the core of the polygon mirror 213.

The annular magnet 119 is arranged by the rotor lower part, and it rotates by the magnetic coil 118 which counters the circumferential direction. The detail of the light-source units 250, 251, 252, and 253 will be mentioned later. The electrode holder, the contact side which intersects perpendicularly with the optical axis of the component is dashed against the wall surface of housing, it inserts in the fit hole in which the body is prepared by the wall surface, and screw-thread fixation is carried out.

The shape of the L character which changed and set up the height dashes the cylinder lenses 209, 210, 211, and 212 against the housing base respectively, they dash the lens base and flat-surface side against the regions 256, 257, 258, and 259 respectively, and energize and support it by the leaf spring 255. The leaf spring 255 dashes and screw-thread fixation is carried out at the region. It dashes, and the reflective mirrors 215, 216, and 217 dash the bottom which changed the height into the housing base similarly and is set up and which is the reflection surface respectively against the regions 260, 261, and 262, and press and support it by the leaf spring 254.

In the center section, adhesion fixation of the fθ lens 218 is carried out in the plinth side established in the housing base, and the emitted light beam is respectively emitted to the housing exterior in parallel with the sub-scanning direction through the opening 263 of the housing wall surface.

In FIG. 18, the reference numerals 244, 245, and 246 denote the optical-axis change units in which the non-parallel plates 241, 242, and 243 are attached to the rotation mechanism.

In FIG. 17, the housing front and rear wall surfaces 277 and 278 are formed with the pair of the pins 264 and 265. The side plates 266 and 267 are made from the sheet metals which are bent back. The pins 264 and 265 are inserted in the reference holes 268 and 269 formed in the plate surfaces, and positioned in the direction of the optical axis and the direction of the sub-scanning (height), respectively.

By screwing the screw thread in the tapped hole 290 through the side plate, it is fixed between the plate surfaces, and the side plates 266 and 267 are arranged so that the ends thereof in the main-scanning-direction may be countered mutually. It is bent by the side-plates 266 and 267 bottom in the shape of toothing, and the bottom plate 270 made from the sheet metal in which the slit-like openings 271, 272, 273, and 274 are formed in the position corresponding to the irradiation position of each photoconductor drum is arranged.

From the ends side, two or more projected projections 275 are respectively inserted in the engagement hole 276 formed in the side plates 266 and 267, crimping is carried out, and the structure held so that the side plate 266 and 267 comrades may be kept parallel is made. It pierces in each plate surface so that the reflection mirror and the support component of the toroidal lens may penetrate, opening is prepared in it, and it is arranged so that the opening position may overlap with the main scanning direction right through between each side plate by the locator pins 264 and (265) of the housing front and rear wall surfaces.

Figure 19A:
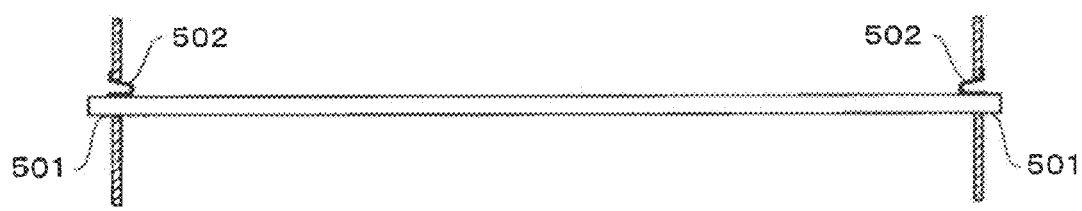
FIG. 19A and FIG. 19B are diagrams for explaining the method of fixing the reflection mirror.
Figure 19B:
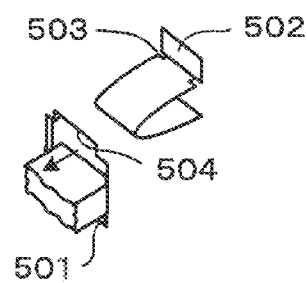

FIG. 19 shows the fixed approach of the reflection mirror. In FIG. 19, in the one side of the side-plate punching hole, and 502, the leaf spring on the wedge and 503 show the notching region of the leaf spring, and, as for the sign 501, 504 shows the opposite side of 501, respectively. The punching end surface the reflection-surface side of the mirror is dashed against 501 by return the one side, the wedge-like leaf spring 502 is inserted from the outside between the opposite arms 504 of the side plate the rear-face side, it engages with the edge 504 of the side plate, and both sides fix the cut out 503. The wedge-like leaf spring 502 is the same configuration altogether.

Figure 20:
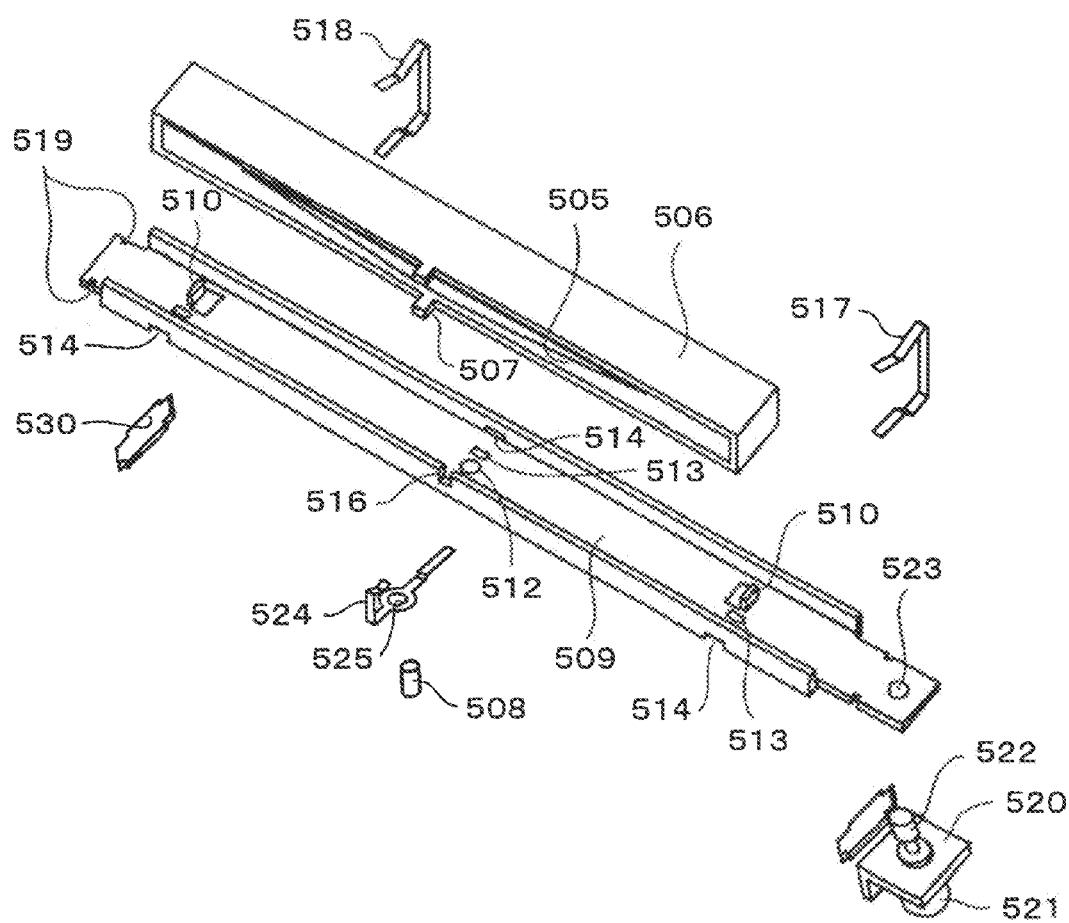
FIG. 20 is a diagram showing the composition of the support housing of the toroidal lens.

FIG. 20 shows the composition of the support housing of the toroidal lens. In FIG. 20, the reference numeral 505 denotes the toroidal lens, 506 denotes the rib region, 507 denotes the projection for positioning, 508 denotes the adjusting screw, 509 denotes the supporting plate, 510 denotes the raised portion, 512 denotes the tapped hole, 513 and 514 denote the openings, 516 denotes the cut out, 517 and 518 denotes the leaf springs, 519 denotes the cut out, 520 denotes the L-shaped bracket, 521 denotes the stepping motor, 525 denotes the hole of the leaf spring, 522 denotes the feed screw, 523 denotes the screw hole, 524 denotes the leaf spring, and 530 denotes the one side of the opening provided in the side plate, respectively.

The rib region 506 is formed so that the toroidal lens 505 may enclose the lens region by the product made of the resin, and the projection 507 for positioning is formed in the center section.

The supporting plate 509 is formed and bent back with the sheet metal, the toroidal lens 505 engages the projection 507 with the cut out 516 formed in the raised portion, dashes the undersurface of the rib against the raised portion 510, and positions it, and energizes it from the top face of the rib by the leaf springs 517 and 518, and holds ends.

The leaf springs 517 and 518 are inserted in from the outside, where the toroidal lens 505 is laid on top of the supporting plate 509, take out the end inside from opening 513, and insert and fix it to opening 514.

Moreover, the tapped hole 512 is made to screw the adjusting screw 508 in the center section, the leaf spring 524 is similarly inserted in from the outside, and it hooks inside the bottom rib, and it energizes so that the undersurface of the rib may contact at the nose of cam of the adjusting screw 508 certainly.

The hole 525 of the leaf spring is the hole which penetrates the adjusting screw 508. There is nothing that keep the configuration stable by making the supporting plate meet in this way although it will deform also by the differential thermal expansion if it is easy to produce deformation (camber) only by the toroidal lens 505 being the long picture, and slight stress being added since rigidity is low and there are temperature distribution up and down with change of ambient temperature, and is mentioned later and that is made to transform the toroidal lens even if it leans and stress is added locally in the case of adjustment (the linearity of the bus-bar is held) it is made like.

The supporting plate equipped with the toroidal lens fixes the cut out 519 of opening in which the plate surface in the sub-scanning direction is prepared by the side plate 267 which dashed the one side against 530 and is formed in the edge by engaging with the edge of opening by the leaf spring 502 as well as the mirror, and the end screws in the tapped hole 523 the feed screw 522 formed at the nose of cam of the shaft of the stepping motor 521 which made the side plate 266 penetrate, and supports it. In order to take the backlash in the feed screw 522, the leaf spring 502 is fitted here and it is energized by the spring force.

The stepping motor 521 is attached in the L-shaped bracket 520 joined by the outside of the side plate 266, and makes displacement possible at the sub-scanning direction (the height direction of the toroidal lens).

Therefore, the right reverse rotation of the stepping motor 521 is followed, in the surface where the optical axis and the toroidal lens 505 cross at right angles, rotation regulation of the include angle gamma can do it, using the opening edge of the side plate 267 as the fulcrum, the bus-bar of the toroidal lens in the sub-scanning direction inclines in connection with it, and the scanning line as an image-formation position of the toroidal lens is leaned.

Figure 21:
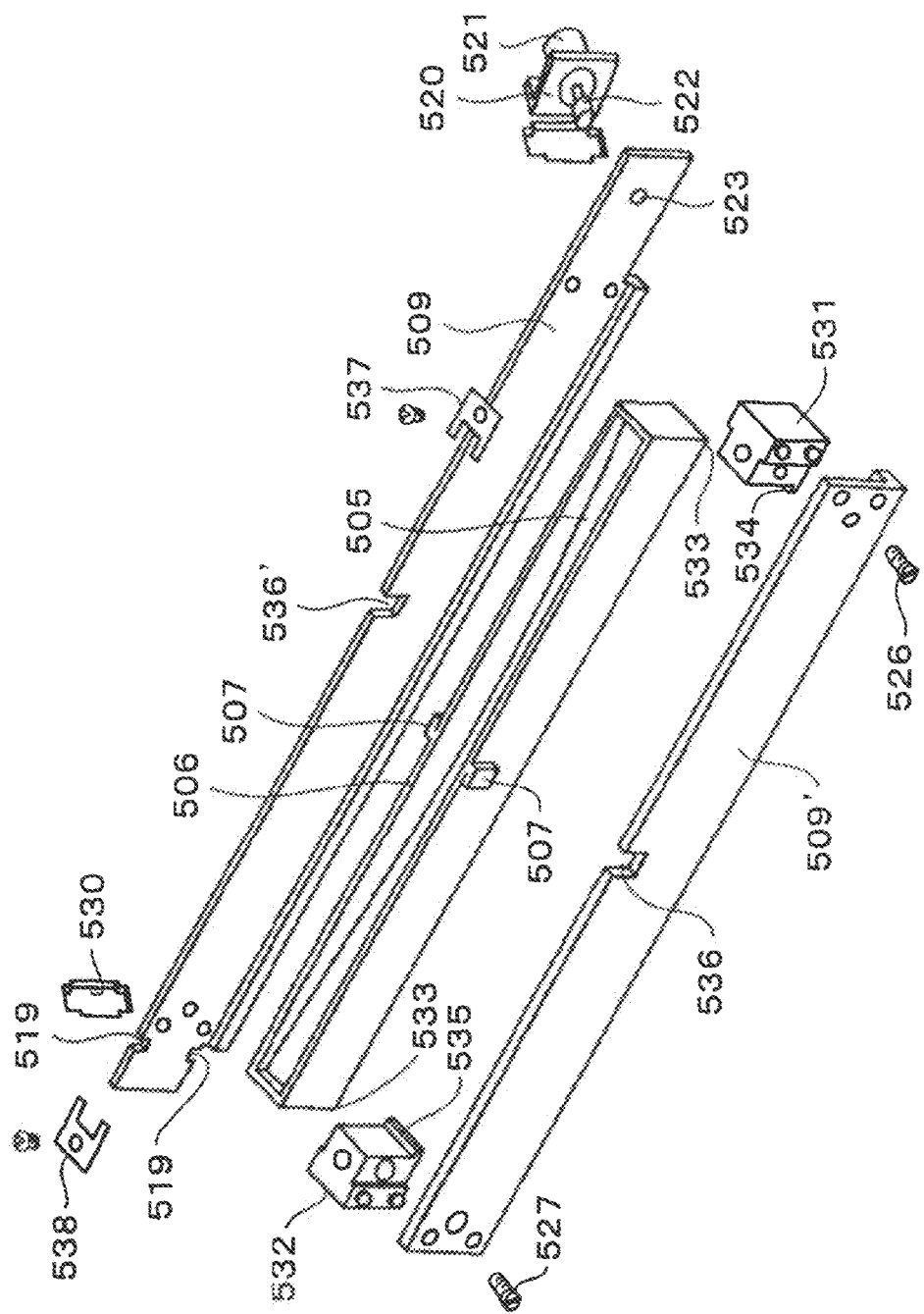
FIG. 21 is a diagram showing the other composition of the support housing of the toroidal lens.

In the embodiment, either of the composition of being shown in FIG. 20 or FIG. 21 arranges the direction of the rotation fulcrum end with other toroidal lenses except black, and is arranged.

FIG. 21 shows the composition of another support housing of the toroidal lens.

In FIG. 21, the reference numerals 509 and 509' denote the rib receptacle region and 536536' show 537, and, in the edge of the rib, and 534 and 535, the cut out and 538 show the 1st and 2nd supporting plates, and 531 and 532 the block and 533 the leaf spring, respectively. In FIG. 21, the elements which are the same as corresponding elements in FIG. 20 are designated by the same reference numerals.

The rib region 506 is formed so that the toroidal lens 505 may enclose the lens region by the product made of the resin, and the projection 507 for positioning is formed in the center section. The support housing is formed with the sheet metal and it comes to join it between the 1st supporting plate 509 and 2nd supporting-plate 509' in the shape of a frame on both sides of the blocks 531 and 532 made of the resin.

In the embodiment, the projections set up on the upper and lower junction sides of the blocks 531 and 532 are inserted in the fit holes of the 1st supporting plate 509 and the 2nd supporting-plate 509', and crimping and joining is performed. The toroidal lens 505 formed the edge 523 of the rib of the direction of the optical axis in each block receiving the regions 534 and 535 dashing the leaf springs 537 and 538 energizing the direction of the optical axis moreover, it is incorporated and fixed so that the projection 507 may be engaged with the cut out 536 of each supporting plate, and 536', the main scanning direction may be positioned and it may put from the upper and lower sides.

Figure 22:
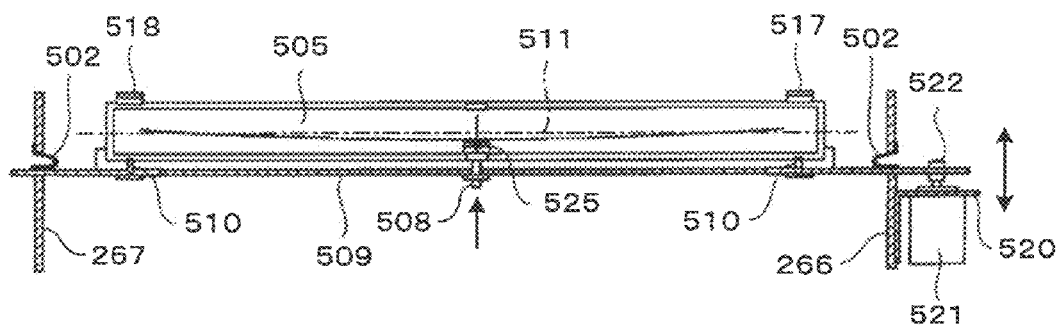
FIG. 22 is a diagram showing the mounting state of the toroidal lens of FIG. 20 when viewed from the optical axis.

FIG. 22 shows the mounting state of the toroidal lens of FIG. 20 when viewed from the optical axis. In FIG. 22, the reference numeral 511 denotes the bus-bar of the toroidal lens. The toroidal lens 505 has ends supported on the edge of the raised portion 510, and the center is supported at the nose of cam of the adjusting screw 508, and when the amount of butts of the adjusting screw 508 is insufficient in the height of the raised portion 510, it curves so that the bus-bar 511 of the toroidal lens 505 may turn to the convex down. Conversely, if it projects and the amount exceeds, it will curve to the up side at the convex.

Therefore, by adjusting these adjusting screws 508, the bus-bar of the toroidal lens 505 curves to the sub-scanning direction, and the deflection of the scanning line can be rectified.

Figure 23:
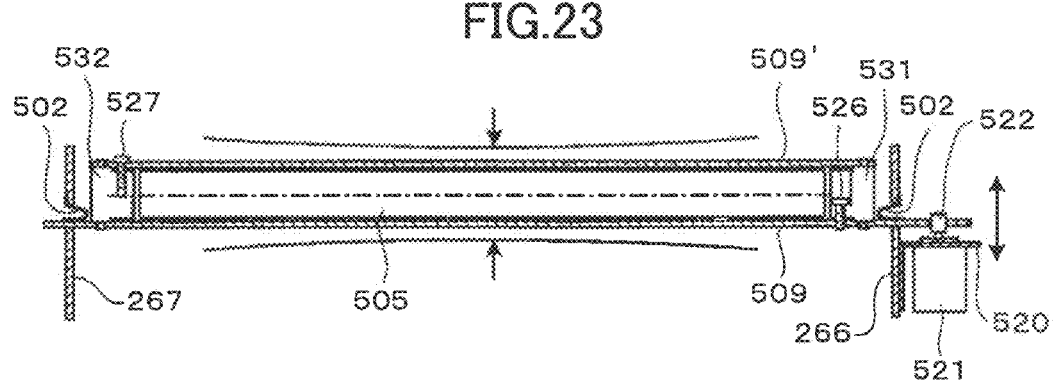
FIG. 23 is a diagram showing the mounting state of the toroidal lens of FIG. 21 when viewed from the optical axis.

FIG. 23 is a diagram which saw the mounting state of the toroidal lens shown in FIG. 21 from the optical axis. Blocks 531 and 532 are formed in the same height as the toroidal lens 505, and between the 1st supporting plate 509 and 2nd supporting-plate 509', the rib region 506 vertical side of the toroidal lens 505 sticks, and is supported.

The junction side of block 531 and the 532 upper and lower sides is formed with the stage, and makes it low slightly inside the 1st supporting plate 509 and the contact side with 2nd supporting-plate 519'. The non-contact region is provided and the 1st supporting plate 509, the 1st adjusting screw 526 to screw, and the 2nd supporting-plate 509' and the 2nd adjusting screw 527 are provided respectively.

If the bottom deforms so that the 1st supporting plate 509 may become the convex, if it is made to be arranged through the clearance and the 1st adjusting screw 526 is screwed in, and it screws in the 2nd adjusting screw 527, 2nd supporting-plate 509' will deform the bottom so that it may become the convex.

Therefore, by adjusting these adjusting screws, the bus-bar of the toroidal lens 505 can curve to the sub-scanning direction, and can curve the scanning line uniformly. Generally, although the deflection of the scanning line originates in the arrangement error of the optical component which constitutes the optical system, the deformation at the time of fabrication, etc., the direction and amount of the improvement or the curve between each scanning line by linearity can be arranged by incurvating the toroidal lens 505 in the direction which cancels this.

In the above-described embodiment, maintaining being arranged by all toroidal lenses including black (4th optical scanning unit), uniting so that the direction and amount of deflection may be equal to the scanning line of the black which serves as reference in the scanning line of each color at the time of manufacture, and this state it inclines and adjustment is performed. Anchoring is made by the body by the screw-thread stop on the basis of the mounting sides 285 and 286 where the optical unit constituted by the above is respectively formed in the bending region of the side plates 266 and 267.

In FIG. 16, the dust-proof glass members 111, 112, 113, and 114 are joined so that the opening provided in the bottom plate may be plugged up. The support to which the mirrors 280 and 281 which turn up the scanning beam to the scanning start of the image record region and scanning termination side are joined to the bottom plate 270 as shown in the 1st optical scanning unit FIG. 17 the component 282 is equipped and the each beam is detected in the substrates 283 and 284 which mounted the photosensor. The screw-thread stop of the substrates 283 and 284 is carried out so that the photosensor may show from opening to the starting side of the bottom plate.

In the embodiment, the substrate 283 is shared so that the timing of the writing start in all stations may be measured based on the synchronous detection sensor, nothing, and this detecting signal. The reference frequency of the pixel clock which detects change of scanning speed and modulates each semiconductor laser to change of the detected scanning speed on the other hand because the substrate 284 measures the time difference of the detecting signal with nothing and the synchronous detection sensor 283 for the termination detection sensor inverse proportion twice it can carry out and the full magnification on the transferring belt later mentioned about the 1st optical scanning unit which serves as reference at least can hold stably by reconfiguring.

Figure 24:
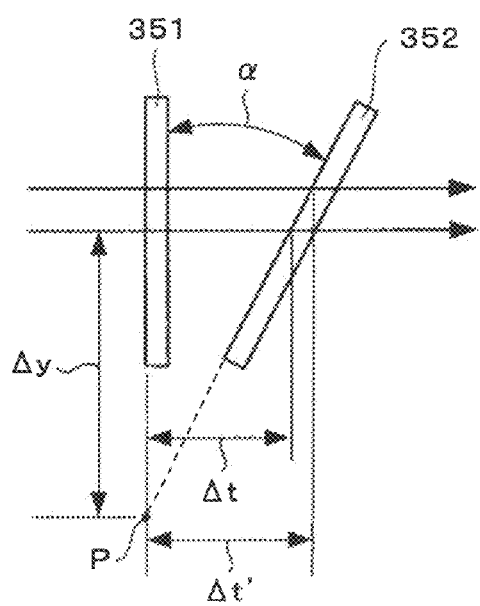
FIG. 24 is a diagram showing the configuration of the light-receiving region of the photosensor.

FIG. 24 shows the configuration of the light-receiving region of the photosensor. In FIG. 24, the reference numerals 351 and 352 denote the photodiodes which are elongated in one direction, respectively.

By constituting the long arm from the non-parallel slender photo diode 352 to it with the slender photo diode 351 turned at right angles to the main scanning direction, time difference delta-t from the photo diode 351 to the photo diode 352 is measured, and deviation delta-y of the feed position of the light beam is detected.

The deviation delta-y of the feed position seen from the intersection P of both the photodiodes 351 and 352 arranged being non-parallel and imagination is expressed by the formula: delta-y=(V/tan(alpha))–delta-t using the tilt angle (alpha) of the photo diode 352, and the scanning speed V of the light beam, and it can hold the scanning position by carrying out feedback compensation using an optical-axis deviation unit to mention later so that the set-up feed resist deviation may not arise so that delta-t may become fixed.

Figure 25:
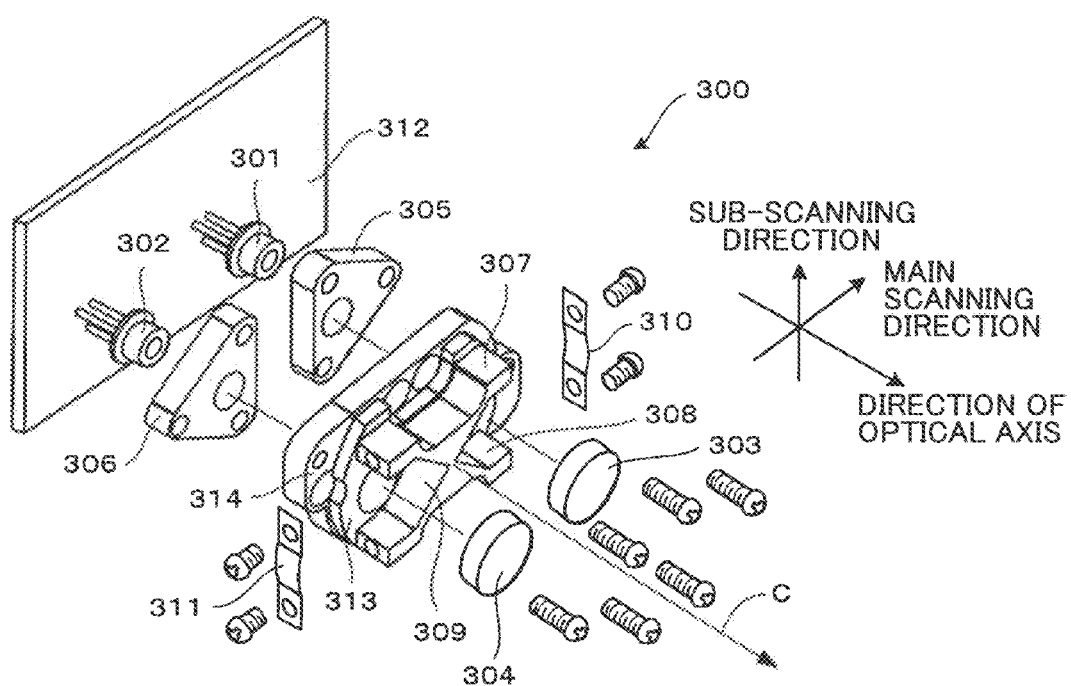
FIG. 25 is a perspective diagram of the light-source unit.

FIG. 25 is the perspective diagram of the light-source unit. In FIG. 25, the reference numerals 301 and 302 denote the semiconductor lasers, 303 and 304 denote the coupling lenses, 305 and 306 denote the base members, 307 denotes the holder member, 308 and 309 denote the V-grooves, 310 and 311 denote the leaf springs, 312 denotes the printed circuit board, 313 denotes the cylinder portion, and 314 denotes the contact surface, respectively. All the light-source units are provided to have the same composition.

Figure 26:
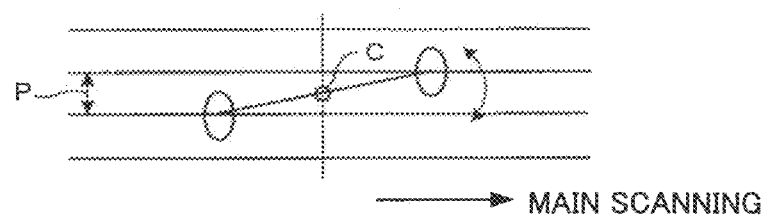
FIG. 26 is a diagram for explaining the relation of the beam spot on the image surface.

FIG. 26 is a diagram for explaining the relation of the beam spots on the image surface.

In FIG. 25, the semiconductor lasers 301 and 302 and the coupling lenses 303 and 304 are arranged symmetrically with the main scanning direction to the emission axis for every color scanning unit, and the semiconductor laser fits in on the perimeter of the package, and is respectively pressed fit in the base members 305 and 306 from the background.

The screw thread is made which penetrated three each from the table side screw and contact the rear face of the component 307, and it is held by the electrode holder, the coupling lenses 303 and 304 the electrode holder the perimeter is dashed against the V-grooves 308 and 309 so that it might open in the direction which disagrees with the component 307, it brings near inside by the leaf springs 310 and 311, and screw-thread fixation is carried out.

In such circumstances, the point of the semiconductor laser emitting light comes on the optical axis of the coupling lens as the arrangement on the contact side (the surface which intersects perpendicularly with the optical axis) of the base member, the position in the V-groove (on the optical axis) is adjusted, and it fixes so that the emission light from the coupling lens may become parallel mutually the optical axis of each emission light is leaned so that it may become the direction which crosses mutually to the emission axis C, and it becomes near the polygon mirror reflection surface about this intersection position in the embodiment as support the inclination of the component is set up.

The printed circuit board 312 in which the drive circuit is formed the electrode holder the plinth set up to the component 307 is equipped by screw fixation, and the light-source unit 300 consists of inserting and soldering the lead terminal of each semiconductor laser to the through hole (illustration abbreviation) in one. The engagement hole where the light-source unit 300 made the height differ on the wall surface of housing in, and formed it in it each electrode holder the body 313 of the component is inserted and positioned, the contact side 314 is dashed and the screw stop is carried out.

In such circumstances, by leaning on the basis of the body 313, and adjusting the amount beta, as shown in FIG. 26, beam-spot spacing of the sub-scanning direction can be united with the scanning line pitch P according to recording density.

Figure 27:
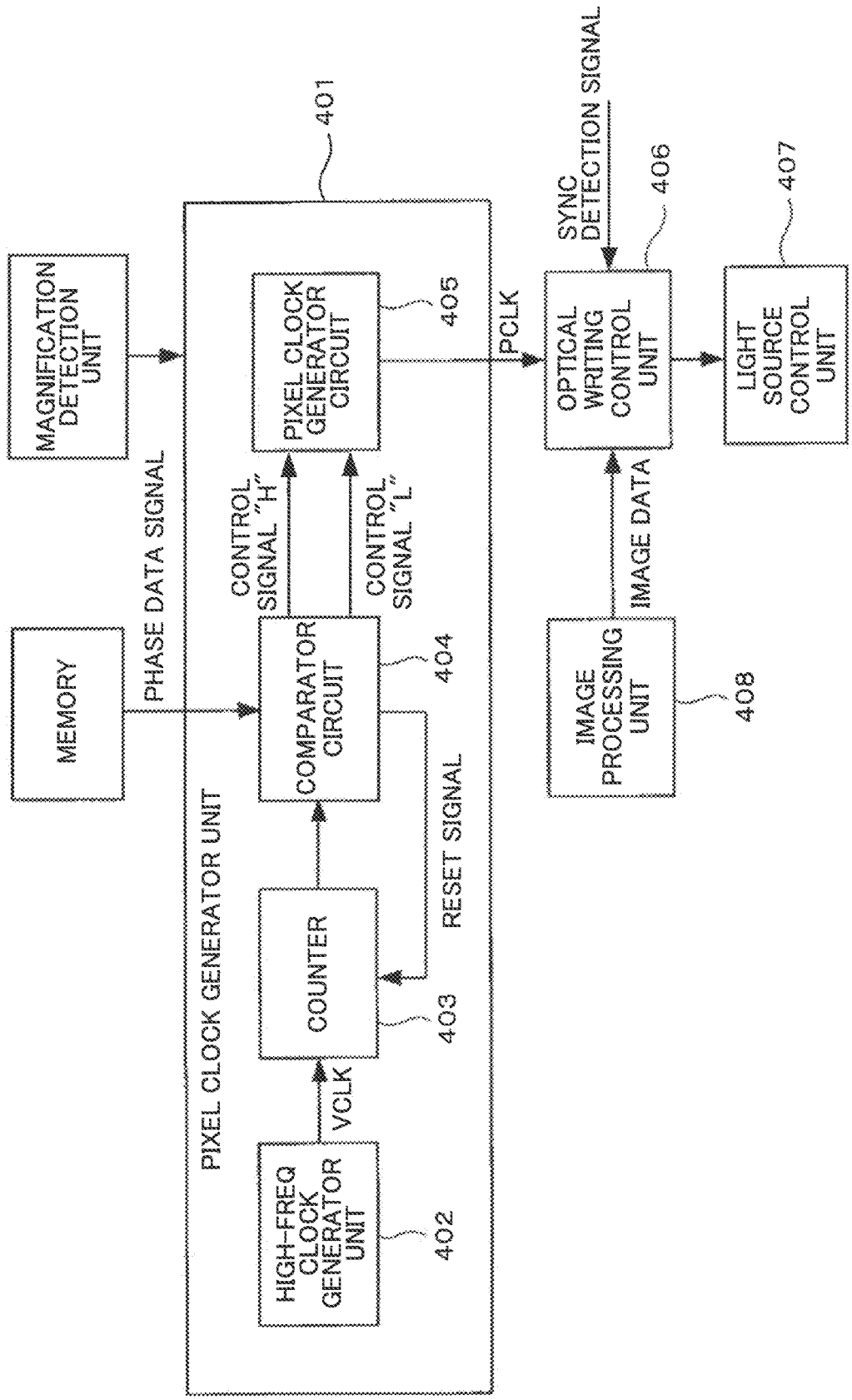
FIG. 27 is a block diagram of the writing control circuit.

FIG. 27 is the block diagram of the writing control circuit. In FIG. 27, the reference numeral 401 denotes the pixel clock generating unit, 402 denotes the high-frequency-clock generator circuit, 403 denotes the counter, 404 denotes the comparison circuit, and 405 denotes the pixel clock control circuit, respectively.

Operation of the writing control circuit will be explained. First, the pixel clock generating unit 401 is explained. In the counter 403, the high-frequency-clock VCLK which is created by the high-frequency-clock generator circuit 402 is counted. In the comparison circuit 404, the counted value is compared with the given from the outside (the memory) as the transition timing of the set point L beforehand set as this circuit based on the duty ratio, and the pixel clock the control signal L which specifies falling of the pixel clock PCLK when the phase data H which specifies the amount of phase shift and counted value is in agreement with the set point L.

When it is in agreement with the phase data H, the control signal H which specifies the start of the pixel clock PCLK is outputted to the pixel clock control circuit 405. Under the present circumstances, the counter 403 is being reset simultaneously with the control signal H and performing the count from 0 again, and can form the continuous pulse train.

In this way, the phase data H is given for every clock, and the pixel clock PCLK with which adjustment of the pulse period is carried out one by one is created.

In the embodiment, the pixel clock PCLK is made into 8 times the period of high-frequency-clock VCLK, and can be made to carry out adjustment of the phase with the resolution of the ⅛ clock.

Figure 28:
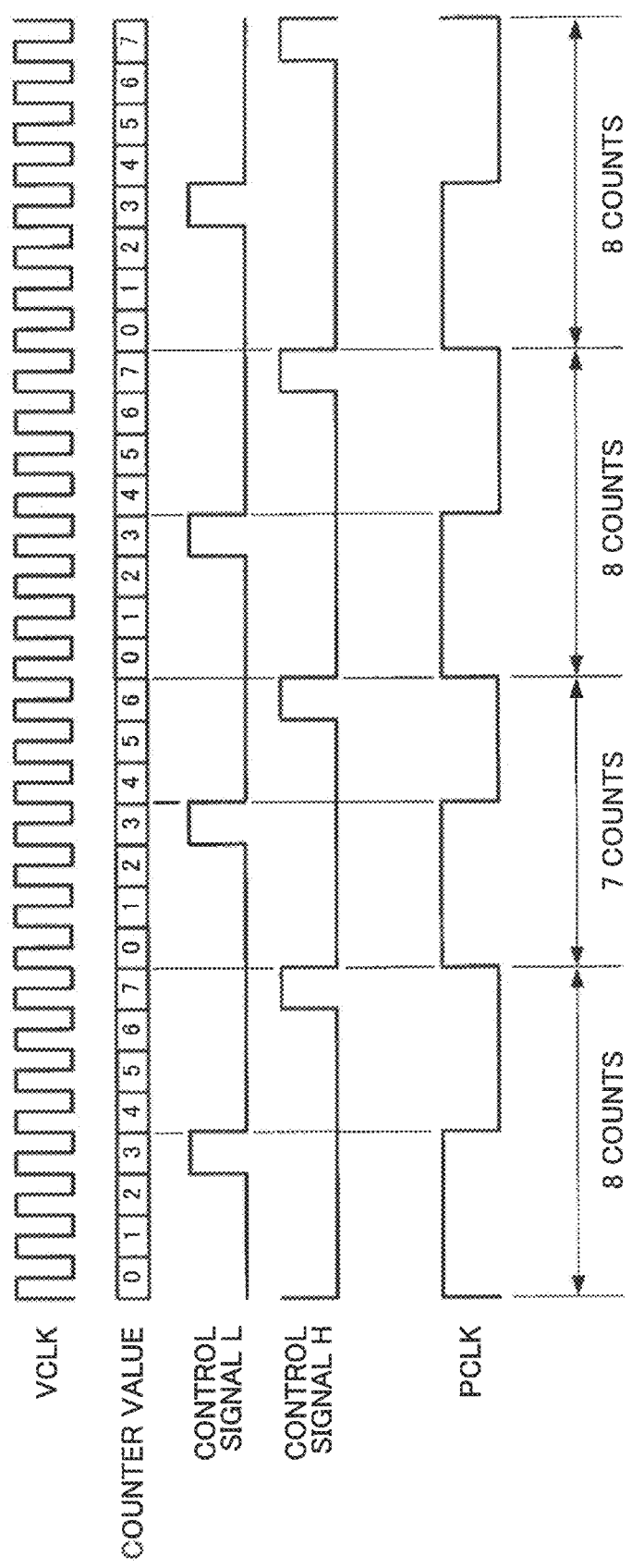
FIG. 28 is a timing chart for explaining the phase change.

FIG. 28 is the timing chart for explaining the clock phase change. The example which delays ⅛ clock phase is explained. If duty 50%, the set point L=3 will be given, the 4 counts are detected by the counter 403, and the pixel clock PCLK is brought down. As for the phase data H, 7 is usually given.

Supposing it delays ⅛ clock phase, the phase data H=6 will be given temporarily, and it rises by the 7 counts.

Since the counter is reset simultaneously, 0 comes to the degree of the number of counts 6. Since the set point L=3 does not change, it brings down again at the four counts. The phase data is again returned to 7, and after counting the counter to 7, it is reset by 0. That is, it means that the periodicity of the pixel clock decreases to the seven counts from the eight counts in the counter, and the adjoining pulse period had contracted by the ⅛ clock by returning to the eight counts again.

In this way, the pixel clock PCLK which it created is given to the light-source control unit 407, assigns the image data read by the image-processing unit 408 to each pixel on the basis of the pixel clock PCLK, creates modulation data, and drives the semiconductor laser.

Therefore, the writing timing which carries out adjustment of the timing which this image data is read can be changed. Since it is as for the phase of the pixel clock PCLK possible to make it change for every clock according to the composition, although the high definition compensation is possible, giving the magnification corresponding to the pulse period for every clock in this way. Since there is also no photosensor which measures the magnification in such minute spacing in the memory of the considerable amount is needed and causing the cost rise, the format which did not carry out preparing phase data corresponding to all pixels, but is settled in the permissible range of giving phase data for every pixel has been taken.

Therefore, the scanning region is divided into two or more sections, and while setting up spacing and the shift amount of the pixel which shift the phase for every division section, it is made to give phase data in the embodiment according to a certain formula.

When change of the magnification to the scanning position x is now set to L(x), change of the beam-spot position deviation M(x) is expressed with the integral value. When the number of the pixels in sigma (fixed) and the division section is set as the deviation of M(x)=integral L(x)dx, the division section width accompanying change of the magnification (it is called the partial magnification below) of a certain division section, to N for the resolution of delta-m and the phase shift, it is made for the beam-spot position deviation to become 0 at the starting point and the terminal point of the division section.

What is necessary will be just to shift D≈N/(delta m/sigma), however D sigma every for every pixel shown integrally.

If it does in this way, the full magnification can also be united without accumulating the compensation remainder of each division section. In this case, the division section what is necessary is just to decide the number of each division position and the division sections that this maximum becomes in tolerance, although the beam-spot position deviation serves as the maximum by the intermediate valve position exactly. Although the pixel which carries out the phase shift is arranged at equal intervals in the embodiment, below, another embodiment which expressed this spacing with the function expression is shown.

Figure 29:
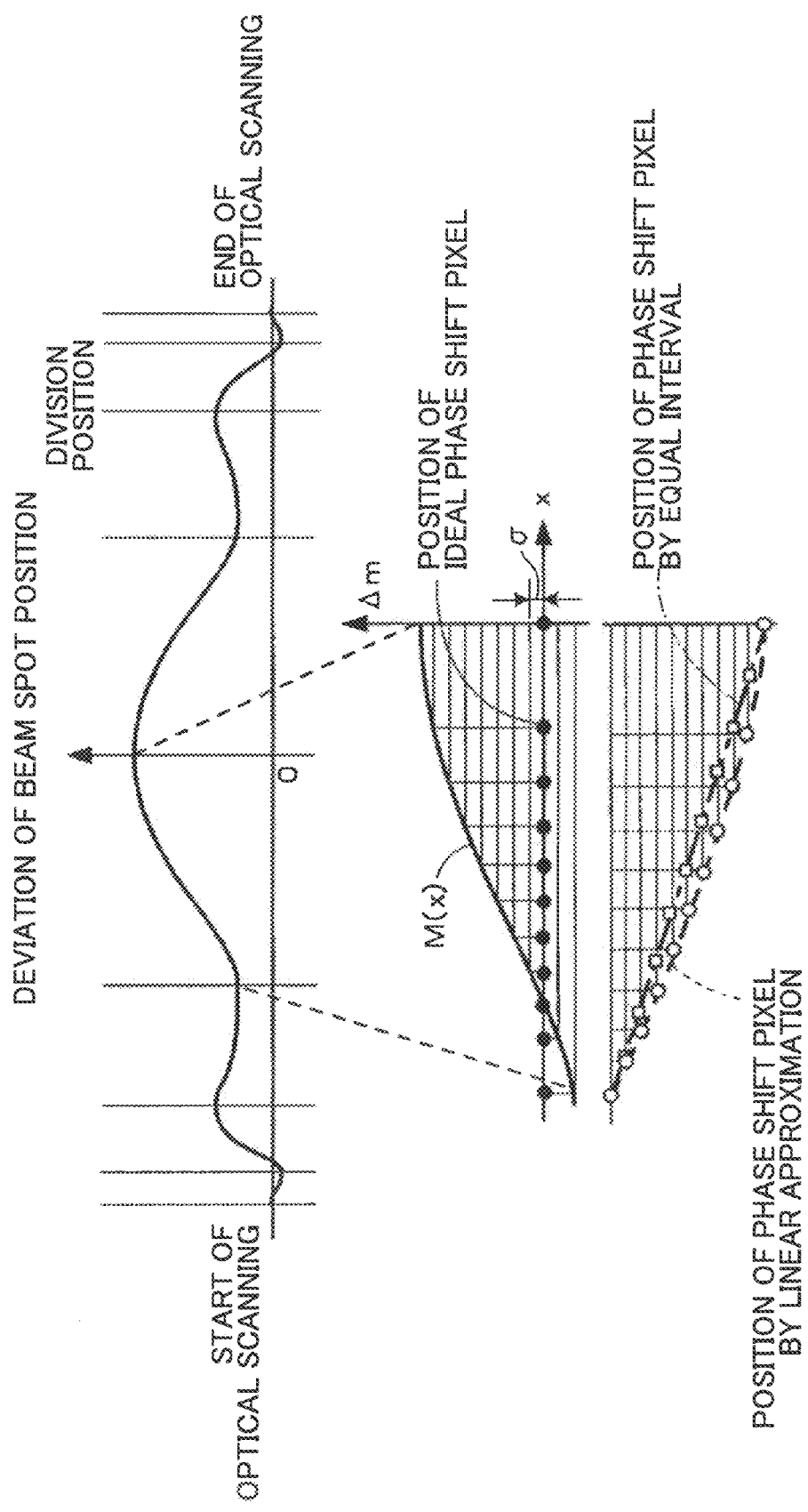
FIG. 29 is a diagram for explaining the magnification compensation for every section to the scanning position.

FIG. 29 and FIG. 30 are drawings for explaining the magnification compensation for every section to the scanning position. As shown in the seven local extremums and the example of FIG. 30, the periodicity is short, so that it has the five local extremums and goes on the outskirts by some local extremums and the example of FIG. 29 from the center of the image. It is made to become the curve which makes the division position the position used as this local extremum, and increased or decreases in monotone in each division section here. The resolution of the phase shift of each section is the deviation delta of the resist deviation in the termination (the Nth pixel) and division section width m is divided by sigma, the intersection with change curvilinear of the beam-spot position deviation M(x) can determine the spacing Di of the pixel which shifts the phase.

In this case, the center from the image left applying (scanning start edge side) each section the spacing Di of this pixel the terminal point from the starting point applying gradually being prolonged the right from the center of the image applying (scanning termination side) since there is the inclination shrunk gradually, the spacing Di of the pixel of each section can be approximated by the primary outline formula: Di≈a·x+b, where Di is the integer, and a and b are the coefficients.

Thus, since what is necessary is not to give phase data for every pixel by giving by the function expression, and just to make only the coefficient of each item memorize on the memory, in being able to reduce the amount of memories, the compensation in the range which can be permitted without increasing the number of the division sections is attained.

What is necessary is to use not only the primary formula but the multi-degree type or the sin function etc., and just to choose so that the change curve may be fitted, if possible. Thus, although the beam-spot position improves by dividing the scanning region among the two or more division, and rectifying the deviation of the partial magnification for every division section, since there is the limitation also in the number of partitions as described above, each error will be accumulated and the deviation of the full magnification will become large.

Then, it is made to put in the partial magnification in each division section in permission in the embodiment supposing uniting full by the compensation of the pixel clock reference value mentioned later etc. That is, in the embodiment, the compensation is applied so that the partial magnification in each division section may suit the full magnification G.

Figure 31A:
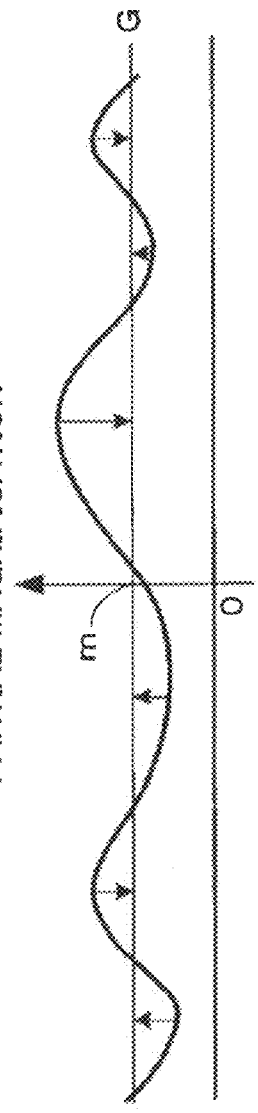
FIG. 31A and FIG. 31B are diagrams for explaining the deviation of the magnification change and the beam-spot position in the main scanning direction.
Figure 31B:
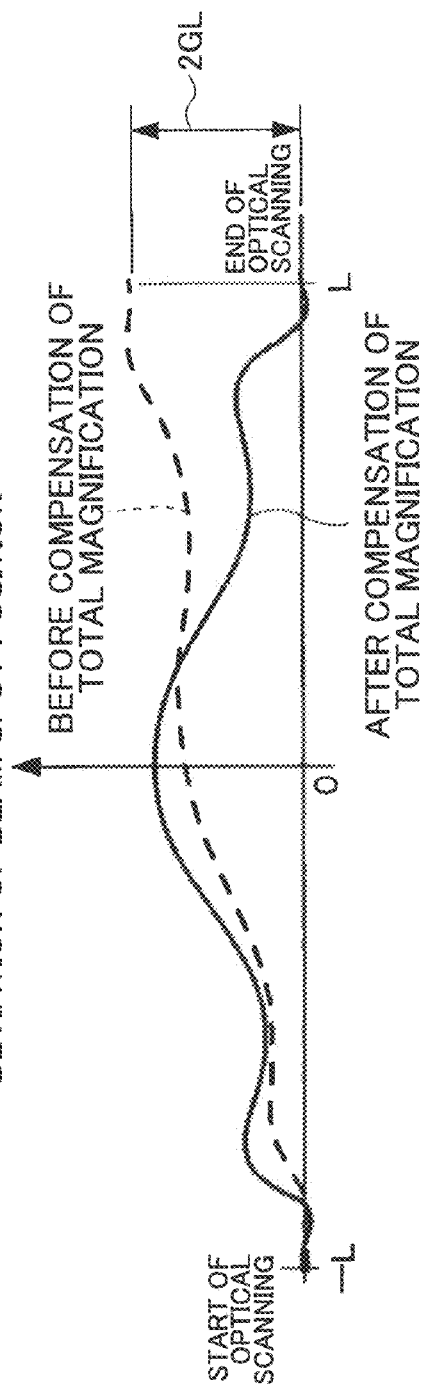

FIG. 31A and FIG. 31B are drawings for explaining the deviation of the magnification change in the main scanning direction, and the beam-spot position. FIG. 31A shows the change of the partial magnification. FIG. 31B shows the deviation of the beam-spot position. Change of the magnification in each section in alignment with the main scanning direction (axis of abscissa) and the deviation of the beam-spot position (beam attainment position) generated in connection with it are explained using FIG. 31A and FIG. 31B.

Since whole magnification is these accumulation, it serves as the average m. Although the beam-spot position is in agreement at the time of synchronous detection, before full magnification compensation, only scan-width xG will shift at the scanning termination gradually at the beginning of the deviation.

When it rectifies so that the scanning start edge and the scanning termination may be in agreement in this state, the distortion will be shifted on to the center section, and the beam-spot position deviation will occur greatly most in the image center section as shown.

Figure 32:
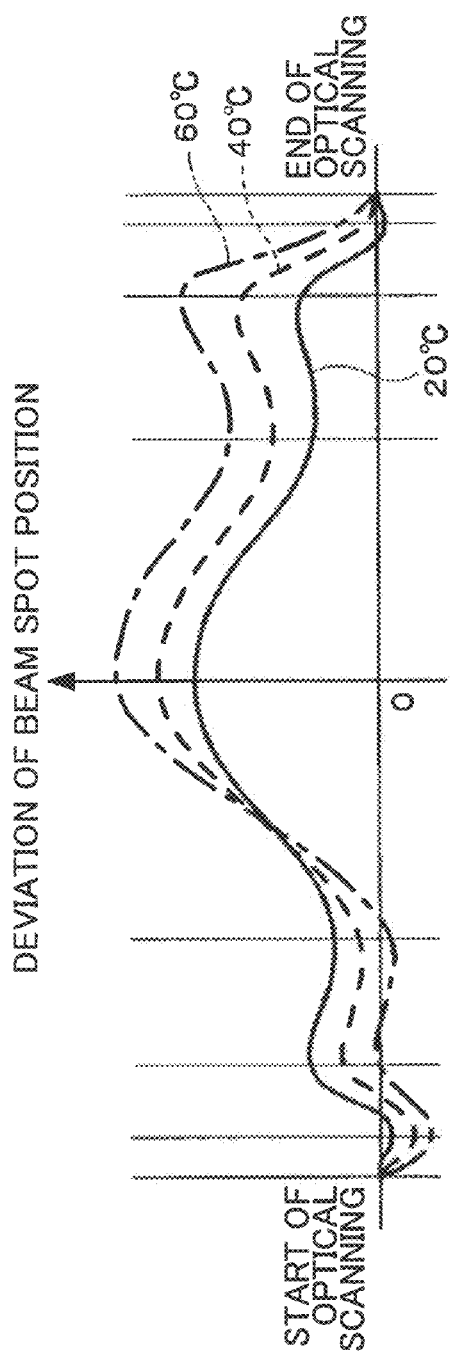
FIG. 32 is a diagram for explaining the temperature dependency of the beam-spot position deviation.
Figure 33:
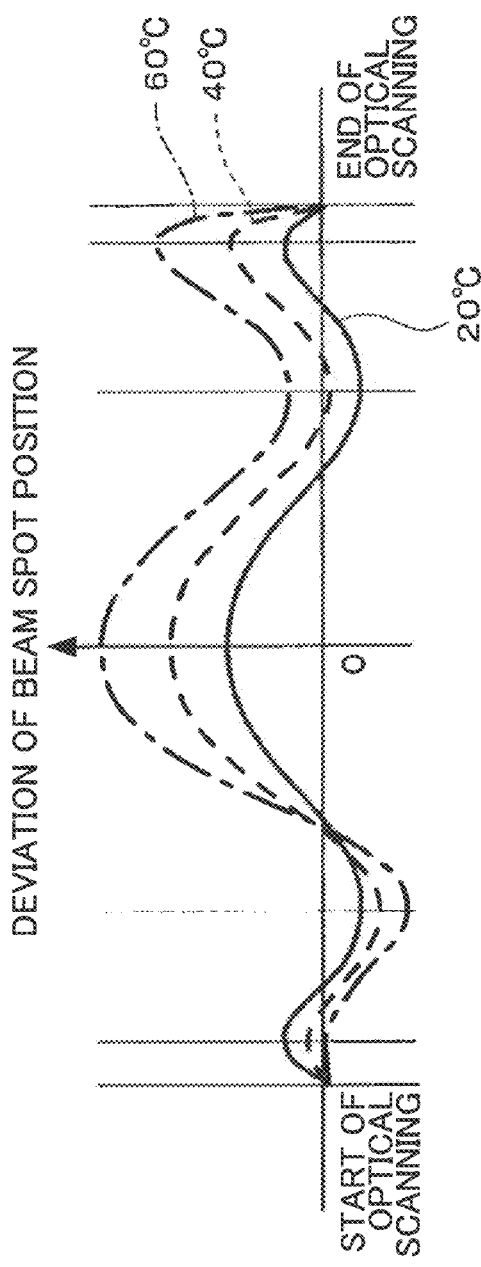
FIG. 33 is a diagram for explaining the temperature dependency of the beam-spot position deviation.

FIG. 32 and FIG. 33 are drawings for explaining the temperature dependency of the beam-spot position deviation. FIG. 32 corresponds to FIG. 29 and FIG. 33 correspond to FIG. 30.

When adjustment of the magnification is carried out uniformly and it is arranged so that the full magnification may be in agreement as described above, the change of the partial magnification along the scanning region arises by change of environmental temperature. Especially in the embodiment, among each local extremum, it is large changeless at the center and the scanning termination, and if it sees for every division position, it will change with linearity to temperature.

In such a case, change of the magnification for every division section can be predicted by expressing with the primary formula which carried out weight attachment of the variation of the full magnification, and distributed it to each division section, for example, made variation of the full magnification the variable.

Therefore, if the detection time difference of the synchronous detection sensor and termination detection sensor which are described above even if it did not form the toner image detects the full magnification, the magnification compensation for every division section can be performed. Thus, the compensation in within the limits permissible with detection of only the full magnification is attained.

Figure 34A:
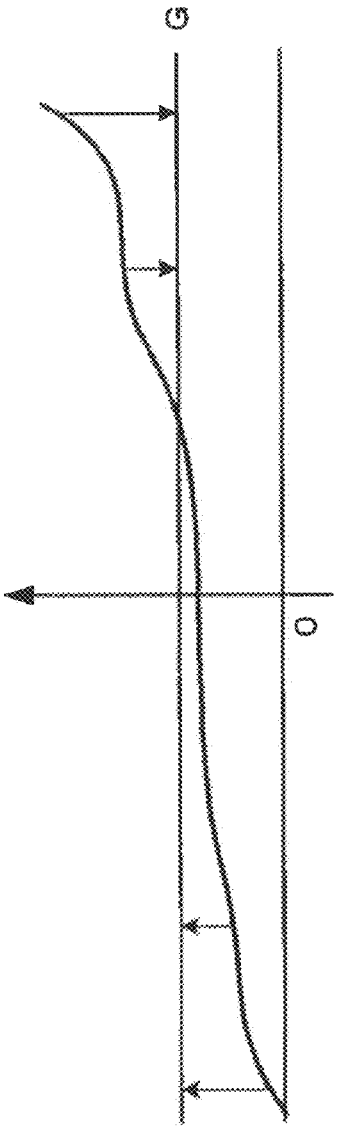
FIG. 34A and FIG. 34B are diagrams showing the change of the partial magnification after the inclination adjustment of the scanning line is performed.
Figure 34B:
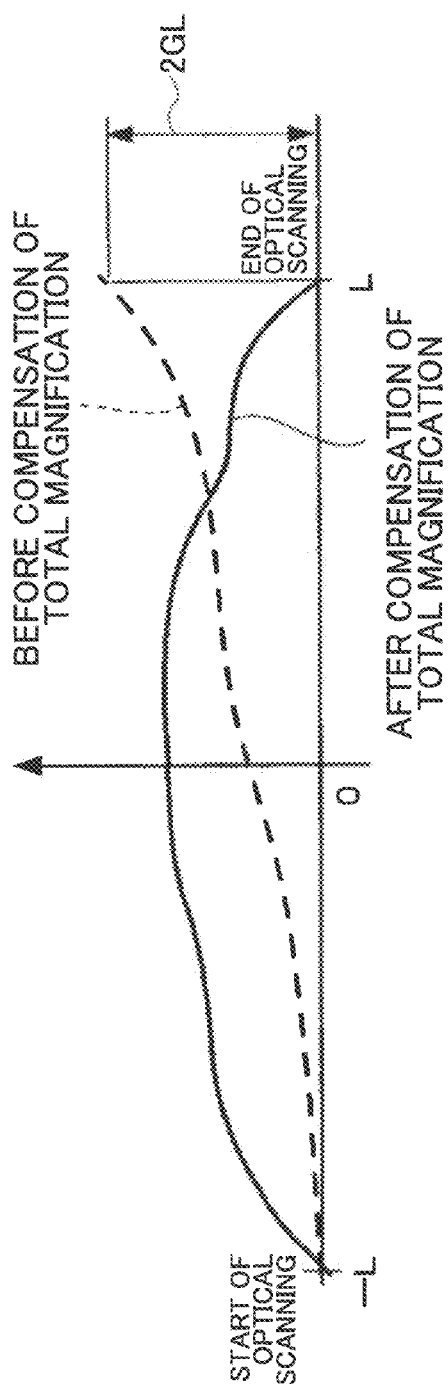

FIG. 34A and FIG. 34B are drawings showing change of the partial magnification after carrying out inclination adjustment of the scanning line etc. FIG. 34A shows change of the partial magnification. FIG. 34B shows the deviation of the beam-spot position.

It generates the scanning lens and by producing the optical-path-length difference at the scanning start edge and the scanning termination in connection with leaning the cuff mirror, and this change is shrunk by one side, and, on the other side, spreads.

Similarly, if it generates most greatly in the image center section and the beam-spot position deviation after rectifying the full magnification is seen for every division position, the toroidal lens will lean it and it will change with linearity to the amount (the amount of adjustments) gamma.

Therefore, change of the magnification for every division section can be predicted by expressing with the primary formula which made this amount gamma of adjustments the variable. By the way, in this case, each color image position is together put by the write-out timing of the sub-scanning direction, and the transferring belt 105 is piled up, although it rotates with the three rollers which consist of drive rollers and follower rollers and the toner image is transferred one by one from each photoconductor drum.

The superposition accuracy of each color image is reading the detection pattern of the toner image formed on the transferring belt 105, the deviation of the scanning resist, the main-scanning-direction magnification, the feed resist, and the scanning line inclination (skew) is detected, and compensation control is made periodically. Although between the time of starting of the device or the job etc. are common as for the timing of compensation control, when there is much print number of sheets of the one job, it may apply interruption on the way.

Figure 35:
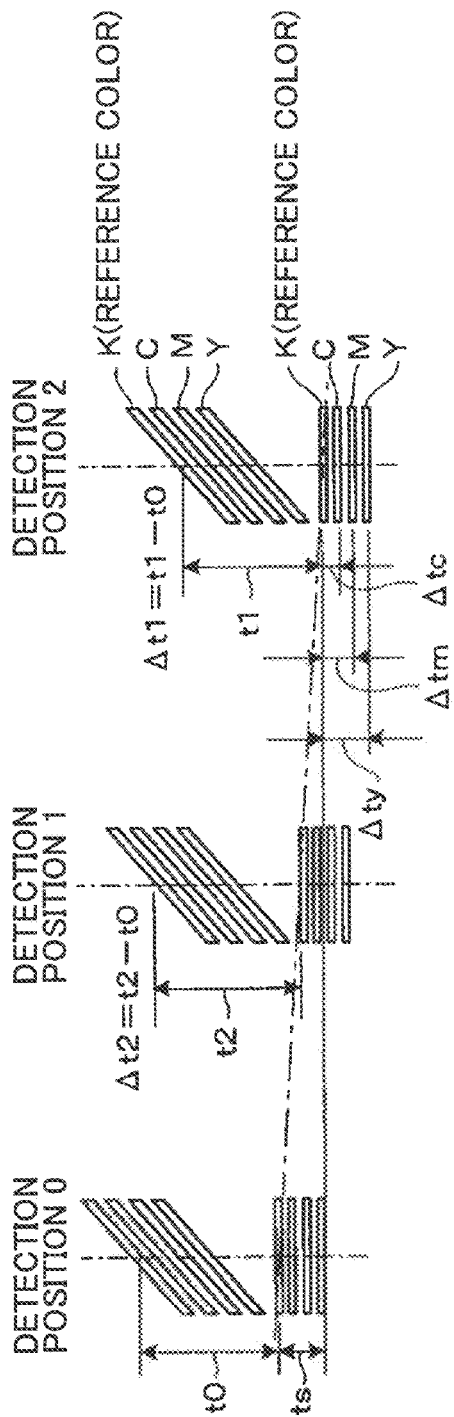
FIG. 35 is a diagram for explaining the detection situation of the deviation detection pattern.
Figure 36:
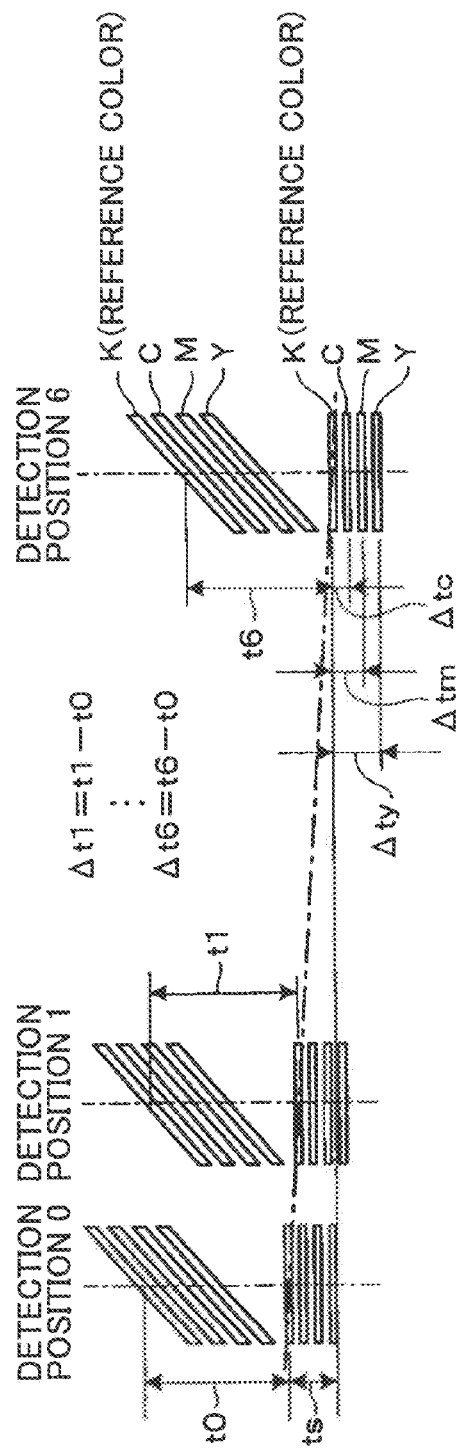
FIG. 36 is a diagram for explaining the detection situation of the deviation detection pattern.

FIG. 35 and FIG. 36 are diagrams for explaining the detection situation of the detection pattern. FIG. 35 shows the situation where the number of detection patterns is three, and FIG. 36 shows the situation where the number of detection patterns is six.

The detection pattern is easy to be what carried out the image formation of the pattern of the exclusive use called for example, toner patch on the transferring belt.

The detection unit consists of the photosensor 232 which receives the LED component 231 and reflected light for lighting, and the focusing lens 233 of the couple, it is arranged in each division position (refer to FIG. 15), and the line pattern group leaned about 45 degrees and the line pattern group in alignment with the main scanning direction are read in the main scanning direction which arranged in parallel and formed the black which is reference color and the cyan, the magenta, and the toner image of the yellow in the predetermined pitch one by one according to movement of the transferring belt. The detection time differences delta tc, delta tm, and delta ty of the line pattern in alignment with the main scanning direction the feed resist in each detection position, and the time ts between each detection position the scanning line inclination moreover, the scanning resist in each detection position and the main-scanning-direction magnification between each detection position are detected from the line pattern detection time difference leaned 45 degrees.

The detection time difference deltat1 between the detection units which have been arranged to ends about the main-scanning-direction magnification in the case of FIG. 35 the full magnification moreover, the magnification difference on either side is detectable with the detection time difference between the detection units arranged in the center.

In the case of FIG. 36, the partial magnification in each division section is detectable with the detection time differences delta t1, ..., delta t5 between detection units to adjoin the full magnification by the detection time difference deltat6 between the detection units arranged to ends.

When the amount of deviations of the division section width accompanying change of the magnification is set to delta x, feed-rate of the transferring belt v and detection time difference delta−t are used, and it is delta−x=v·delta−t. It comes out, it can express, and it will become the magnification if it breaks by division section width.

In the embodiment, the region where change is large brings spacing of the division position for each division position close along the scanning region, and the small region keeps away spacing, a part for that is, the deflection is made to rectify change of the partial magnification more exactly by carrying out comparatively.

Moreover, as described above, even if the patterning of change of the partial magnification does not detect the magnification for every division section, by detecting the magnification change between the two or more division with which only the specific division section connected two or more division sections, the magnification change for every division section is not measured purposely, but it corresponds by prediction.

Naturally, for every boundary of each division section, in the embodiment, since it is seven division, the detection unit may be prepared in the nine places, and it is possible to measure the partial magnification of each section.

In FIG. 36, the scanning region is divided into six and the photosensor 232 is formed in a total of seven places of the five near and ends of each local extremum, and the more there are many division sections, naturally the compensation is possible for accuracy the more.

However, the number of the photosensors also increases so much, the transition timing of the phase in each division section is set up because for this reason time approximates beforehand the change pattern of the magnification difference in each division section also to detection with the predetermined function as described above, and it expresses with the primary formula to it, and if possible, the number of the division sections is reduced.

Even if it finds each division position, like the above, by patterning change of the magnification difference of the whole scanning region, the region where change is large brings spacing of the division position close, and the small region keeps away spacing a part for that is, the deflection of the number of the division sections is reducible by carrying out comparatively.

It is made to end by the minimum number by bringing spacing of each division position close in it, so that it goes on the outskirts by the embodiment. For example, change of the magnification difference of each division section starts in alignment to environmental temperature.

FIG. 33 shows the situation when carrying out adjustment of the magnification uniformly and arranging it to change of the magnification difference of the whole scanning region produced by change of environmental temperature so that the full magnification may be in agreement. It is large changeless at the center and the scanning termination among each local extremum with especially the embodiment.

If this inclination is seen for every division position, it will change with linearity to temperature. In such a case, change of the magnification difference for every division section can be predicted by carrying out weight attachment of the variation of the full magnification, and distributing it to each division section. Therefore, by detection of only the full magnification, although it is not exact, the compensation in permissible within the limits is attained.

On the other hand, about the feed resist deviation to the detected reference color, the write-out timing in the sub-scanning direction is united by making the 1st face of every polygon mirror, and 1 scanning line pitch P into the unit.

It will be necessary to unite the resist deviation and the irradiation position is finely tuned using an optical-axis change unit to mention later etc., in the accuracy below 1 scanning line pitch P as the request quality of the color image increases in recent years. In addition, the detection pattern also performs detection of these feeds resist deviation.

Since each compensation of the scanning resist and the main-scanning-direction magnification, the feed resist, and the scanning line inclination (skew) is performed in parallel by feedforward control, the toner image is formed on the transferring belt and it is necessary to compensate again the deviation of the part which changes with the mutual side effects, for example, the scanning magnification produced by carrying out adjustment of the scanning line inclination.

However, forming the toner image repeatedly in this way, and re-detection is needed to manage one detection as much as possible, when the down time of the device which compensation control takes becomes long and productivity is dropped, in order for toner consumption to also increase.

Then, in the embodiment, the change pattern of the magnification in each division section to the good variable of the scanning line inclination is grasped beforehand, and the set-up phase data is corrected.

Moreover, as described above, even if it shifts the write-out position of the main scanning direction, it is made for the phase data corresponding to each spot position of the main scanning direction not to change.

Figure 37:
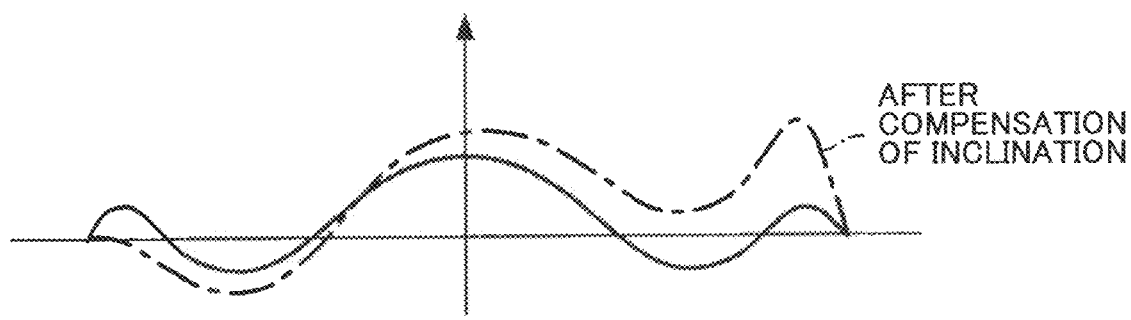
FIG. 37 is a diagram showing the change of the partial magnification before and after the inclination compensation is made.

FIG. 37 is a diagram in which inclining and showing change of the partial magnification before and after the compensation. Thus, one side of the image scanning end produces distortion that elongation another side is shrunk, and has the correlation to inclination correction value. Therefore, what is necessary is to predict the correction value of the magnification in each division section, and just to reconfigure phase data.

Moreover, although rectified by writing in from synchronous detection of modulation data and adjusting the timing of the start about the scanning resist deviation to reference color creating the pixel clock so that the phase data may be made to correspond to each spot position in the scanning region, considering the resist deviation on the basis of this pixel clock, giving the image data, and creating modulation data.

Even if it carries out adjustment of the scanning resist, it is made for the phase data which accompanies each pixel in each division section not to change.

Figure 38:
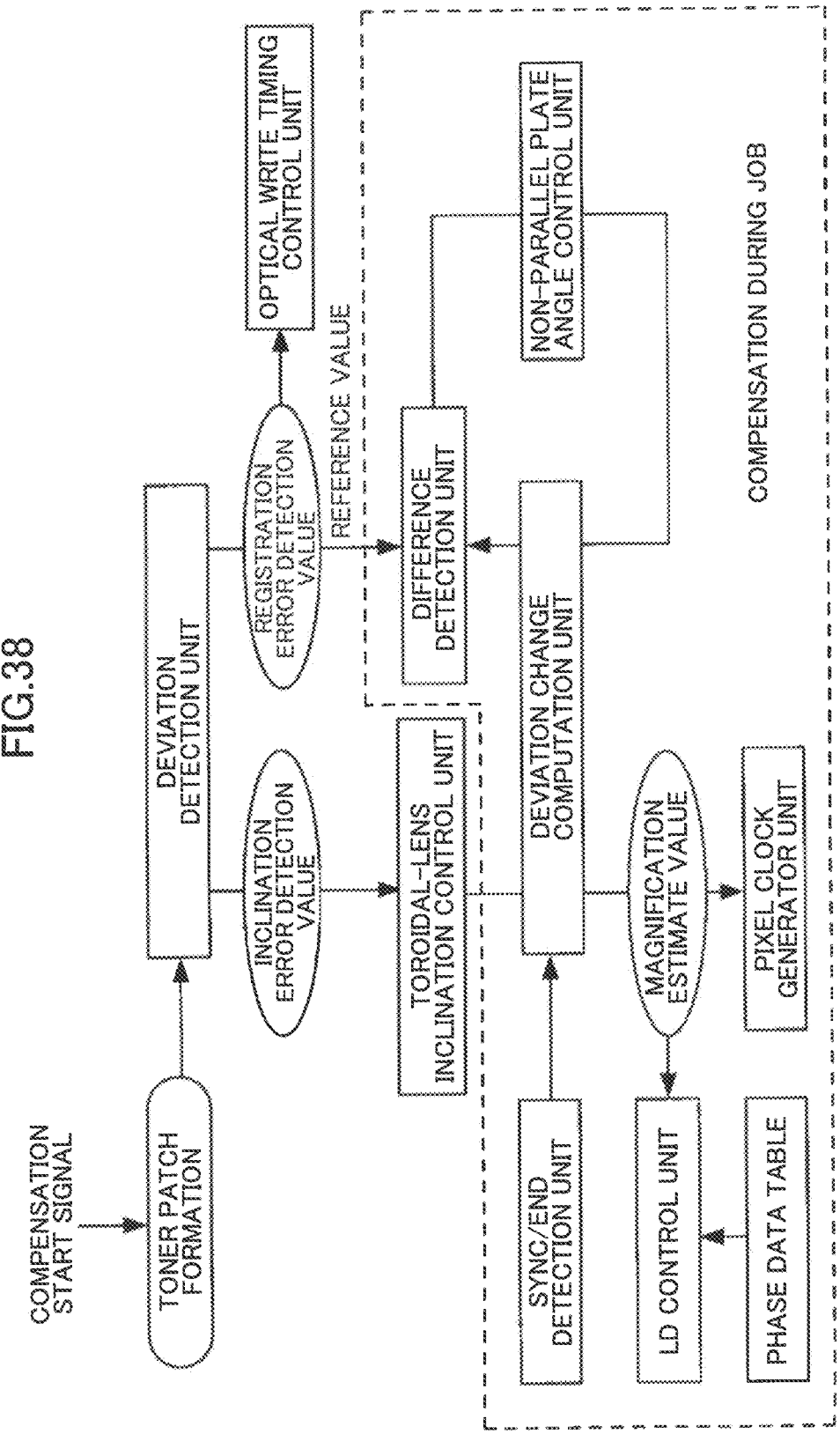
FIG. 38 is a diagram for explaining the control of the beam-spot position deviation.

FIG. 38 is a diagram showing control of the beam-spot position deviation. As described above, the detection pattern of the toner image is formed on the transferring belt by making the compensation start signal of the color deviation into the trigger between the time of device starting, or the job, and the deviation of the inclination of the scanning line to reference color, scanning, and the feed resist is detected.

About the inclination deviation, while driving and rectifying the inclination adjustment unit of the toroidal lens, it inclines by the function expression which made the amount gamma of adjustments the variable, and change of the partial magnification accompanying adjustment is predicted.

On the other hand, change of the partial magnification accompanying the temperature change is predicted by the function expression which made the full magnification the variable.

On the data table, the phase data to change of each partial magnification is memorized beforehand, and phase data is read and set up based on the predictor, and change of the partial magnification accompanying inclination adjustment is rectified so that the partial magnification of the difference with the full magnification for every division section may be lost.

Figure 39:
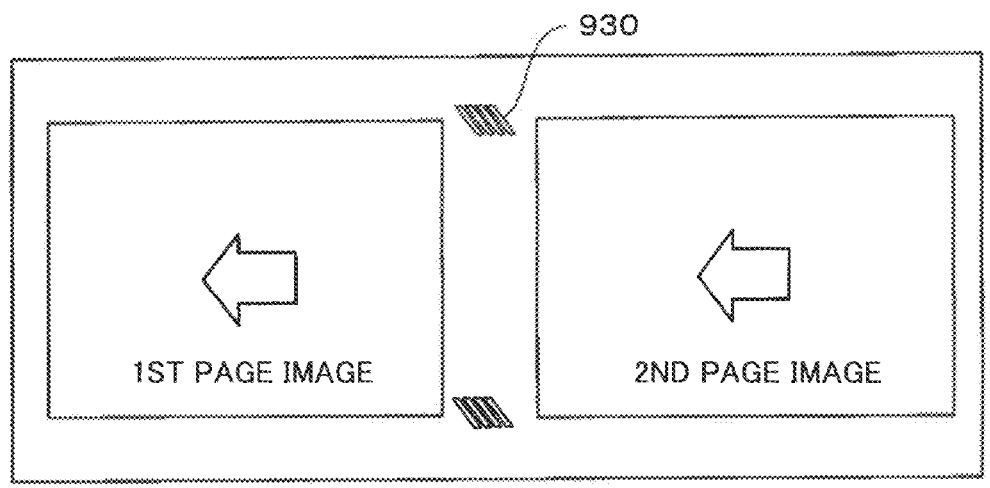
FIG. 39 is a diagram for explaining the timing of formation of the deviation detection pattern.

FIG. 39 is a diagram for explaining the formation timing of the detection pattern. The procedure of adding change of the partial magnification accompanying the temperature change to the set point which reads phase data based on the predictor and is already set up, and reconfiguring it rectifies. The full magnification rectifies the pixel clock reference value by carrying out adjustment.

Although the full magnification is computed from the detection time difference of the synchronous detection sensor and the termination detection sensor in the embodiment in order to enable it to detect change of the partial magnification accompanying the temperature change also in the job, if the detection pattern is formed to the timing which starts between the pages (between papers) along with movement of the transferring belt as shown in FIG. 39, the toner image can detect the full magnification, without stopping print operation.

By enabling it to perform such the compensation into the job, even if the print number of sheets of the one job increases, the color deviation of the main scanning direction with time can be suppressed.

Moreover, about the feed resist deviation, the write-out timing in the sub-scanning direction is united by making the 1st face of polygon mirror, and 1 scanning line pitch P into the unit.

It is necessary to unite the resist deviation in the accuracy below 1 scanning line pitch P, and the irradiation position is finely tuned using an optical-axis change unit to mention later etc., the excess which cannot be rectified by write-out timing among the feed resist deviations detected with the toner image is rectified, and the reference value (initial value) of the scanning position is set up as the request quality of the color image increases in recent years.

Furthermore, the set-up reference value is always made to be maintained by rectifying the difference of the detecting signal produced by the scanning position deviation by feedback control using the synchronous detection sensor which mounted the non-parallel photo diode as described above.

Figure 40A:
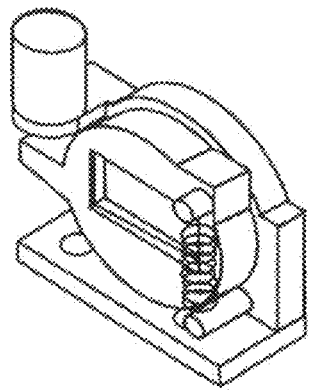
FIG. 40A and FIG. 40B are perspective diagrams showing the support region of the non-parallel plate which is the optical-axis change unit.
Figure 40B:
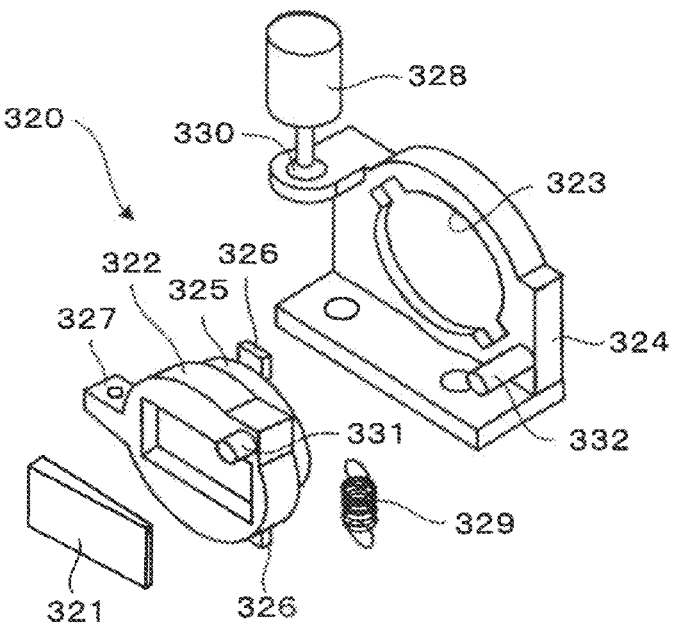

FIG. 40 is the perspective diagram showing the non-parallel monotonous support region which is the optical-axis change unit. In FIG. 40, the reference numeral 320 denotes the optical-axis change unit and 321 the non-parallel plate and 322 the electrode-holder component and 323 bearing and 324 the support component and 325 the fit region and 326 the key portion in the stepping motor and 329, the spring and 330 show 331 and the through hole and 332 show the region and 327 the lever region and 328 the pin, respectively.

The optical-axis change unit 320 represents the optical-axis change units 244-246 in FIG. 18. The non-parallel plate 321 represents the non-parallel plates 241-243 in FIG. 15. The non-parallel plate 321 the cylindrical electrode holder the component the support which is fixed within the 322 central limit and formed bearing 323 the key portions of the couple formed in the component 324 at the electrode-holder component inserting the region 326 according to the cut out, and returning horizontally the key portions 326 is caught in the background and is rotatably held on the basis of the engagement region 325 in the state where it stuck to the support component.

As described above, the screw-thread stop is carried out to housing on the basis of the base, the height is respectively set up so that the rotation core of bearing 323 may suit the emission axis and core of the light-source unit, and the component 324 can lean the emission axis of the beam slightly by rotation, the electrode holder it formed at the axial nose of cam of the stepping motor 328 engaged and fixed to the through hole 330 which the lever region 327 is formed in the end of the component, and is formed in the support component it sends, the screw is screwed and rotation of the non-parallel plate 321 is enabled with the vertical motion in order to take the backlash in this case the electrode holder the pin 331 of the component, and support the drawbar pull is applied with the spring 329 between the pins 332 of the component, and it considers as the composition put aside.

If this rotation angle is now set to delta and the feed magnification of fc and the optical system whole system is set the non-parallel monotonous apex angle to zeta for the focal distance of epsilon and the coupling lens, feed position change delta-y in the photoconductor side will be given by the formula: delta y=zeta−fc and (n0−1) epsilon-sin delta (monotonous index of refraction with non-parallel n0). In the range of the minute rotation angle, it changes in proportion almost to the rotation angle. The non-parallel monotonous apex angle epsilon is set as about 2 degrees.

Figure 41:
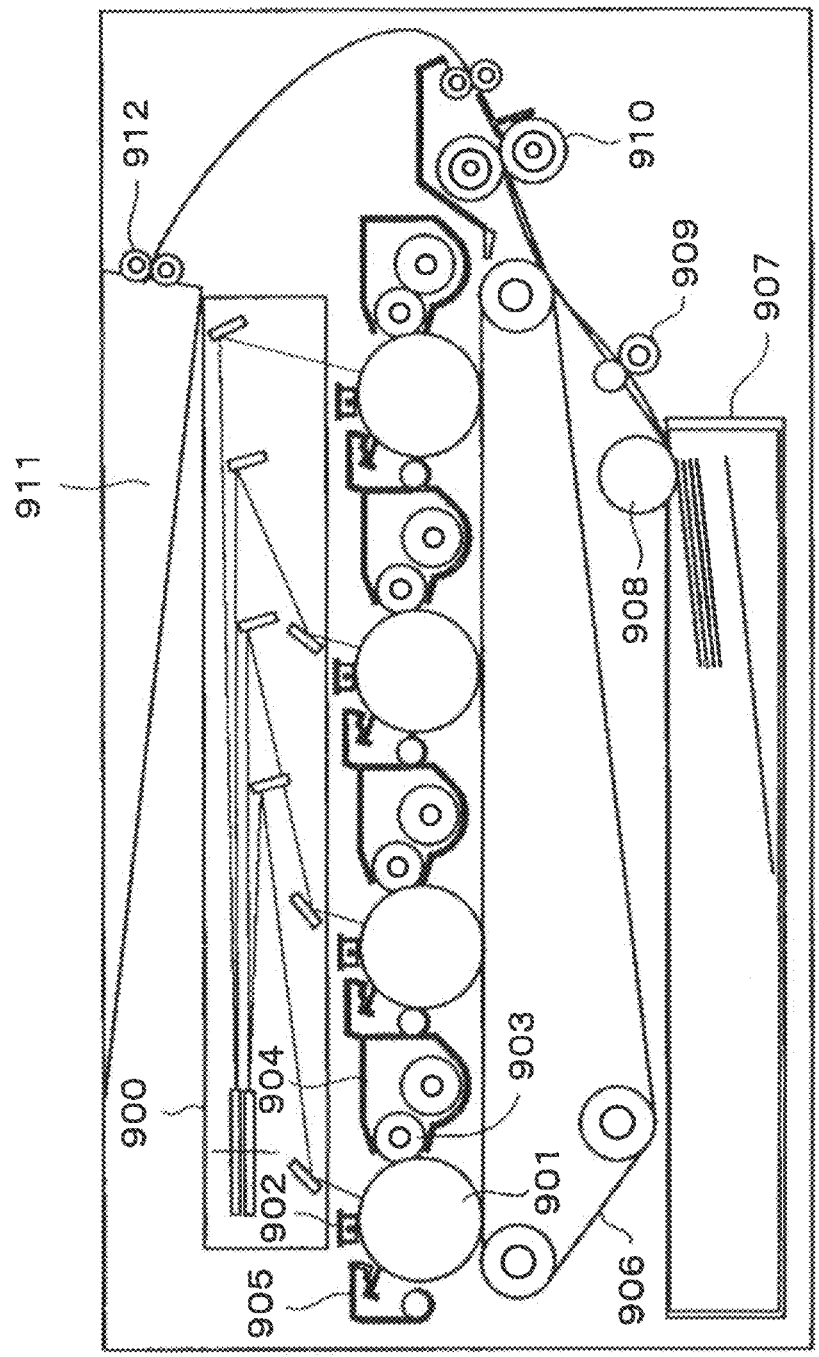
FIG. 41 is a diagram showing the embodiment of the image forming device in which the optical scanning device of the invention is provided.

FIG. 41 is a diagram showing the example of the image forming device which carried the optical scanner.

In FIG. 41, the reference numeral 900 denotes the optical scanner and 901 the photoconductor drum and 902 the electrification charger and 903 the developing roller and 904 the toner cartridge and 905 the cleaning case and 906 the transferring belt and 907 in the resist roller pair and 910, the fixing roller and 911 show the ejection tray and 912 shows the paper feed tray and 908 the feed roller and 909 the ejection roller, respectively.

The toner cartridge 904 which supplies the toner to the developing roller 903 which adheres and transfers the electrified toner to the electrostatic latent image recorded on the perimeter of the photoconductor drum 901 by the electrification charger 902 charged in high pressure in the photoconductor and the optical scanner 900, and the developing roller, and the cleaning case 905 which scratches the toner which remained in the drum and stores it are arranged, and the image-formation station is constituted.

As described above to the photoconductor drum 901, in two or more lines and the embodiment, image record of the five lines is simultaneously performed by the scan for the 1st face of every polygon mirror. The plural image-formation stations are arranged in parallel in the movement direction of the transferring belt 906, the yellow, the magenta, the cyan, and the toner image of black are transferred one by one, uniting timing on the transferring belt, and the color image is formed repeatedly. Toner color only differs and each image-formation station is the same composition.

On the other hand, the recording paper is supplied by the feed roller 908 from the paper feed tray 907 having the resist roller pair it is sent out by 909 according to the timing of the recording start of the sub-scanning direction, the color image is transferred from the transferring belt, and it is established with the fixing roller 910, and is discharged by the ejection tray 911 with the ejection roller 912.

Figure 42:
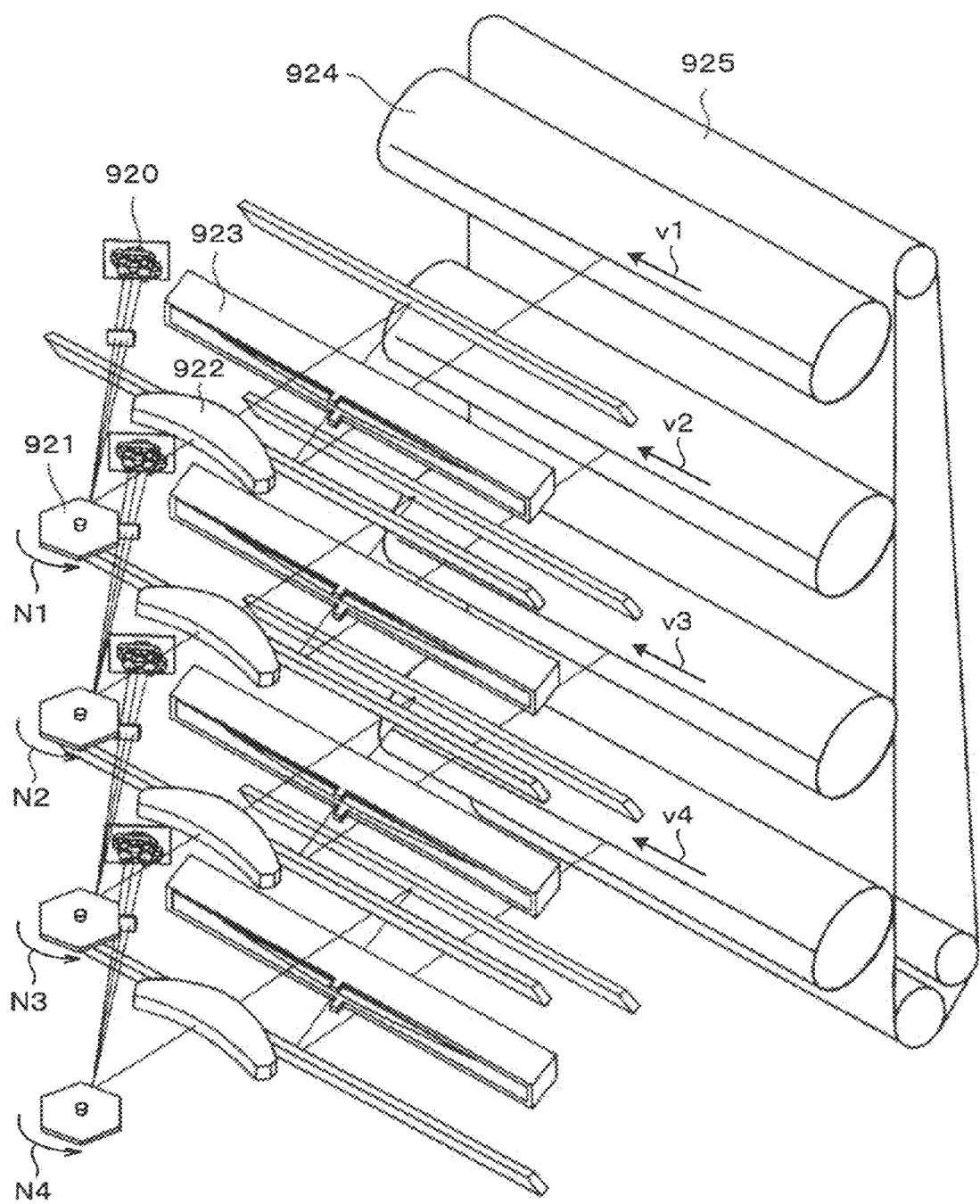
FIG. 42 is a diagram showing the principal part of the image forming device using the four optical scanning devices of the invention.

FIG. 42 is a diagram showing the principal part of the image forming device which uses the four optical scanning devices. Also in such composition, the above-described embodiment is applicable.

The light beam emitted from the light-source unit 920 is deflected by the polygon mirror 921, and scans the photoconductor drum 924 through the fθ lens 922 and the toroidal lens 923. The respective color images formed on the photoconductor drums 924 are transferred to the transferring belt 925 in an integrated manner.

The rotational speed N of the polygon mirror 921 is controlled by the reference clock sent from the corresponding one of the individual pulse generator circuits, and the difference of the full magnification is compensated by carrying out adjustment of each reference clock.

According to the present invention, the part by uniform magnification change is compensated beforehand with the full magnification, and only the difference for every division section is compensated with the phase data, so that the partial magnification in alignment with the main scanning direction can be compensated, and the full magnification is compensated certainly. Since it is controllable so that the difference of the full magnification between two or more optical scanning units and the partial magnification in alignment with the main scanning direction does not arise by compensating the scanning magnification difference between each color image, the good-quality color image which has neither the color deviation nor the discoloration over the extended period of time can be formed.

With reference to FIG. 43 through FIG. 69, the other preferred embodiments of the present invention will be explained.

Figure 43:
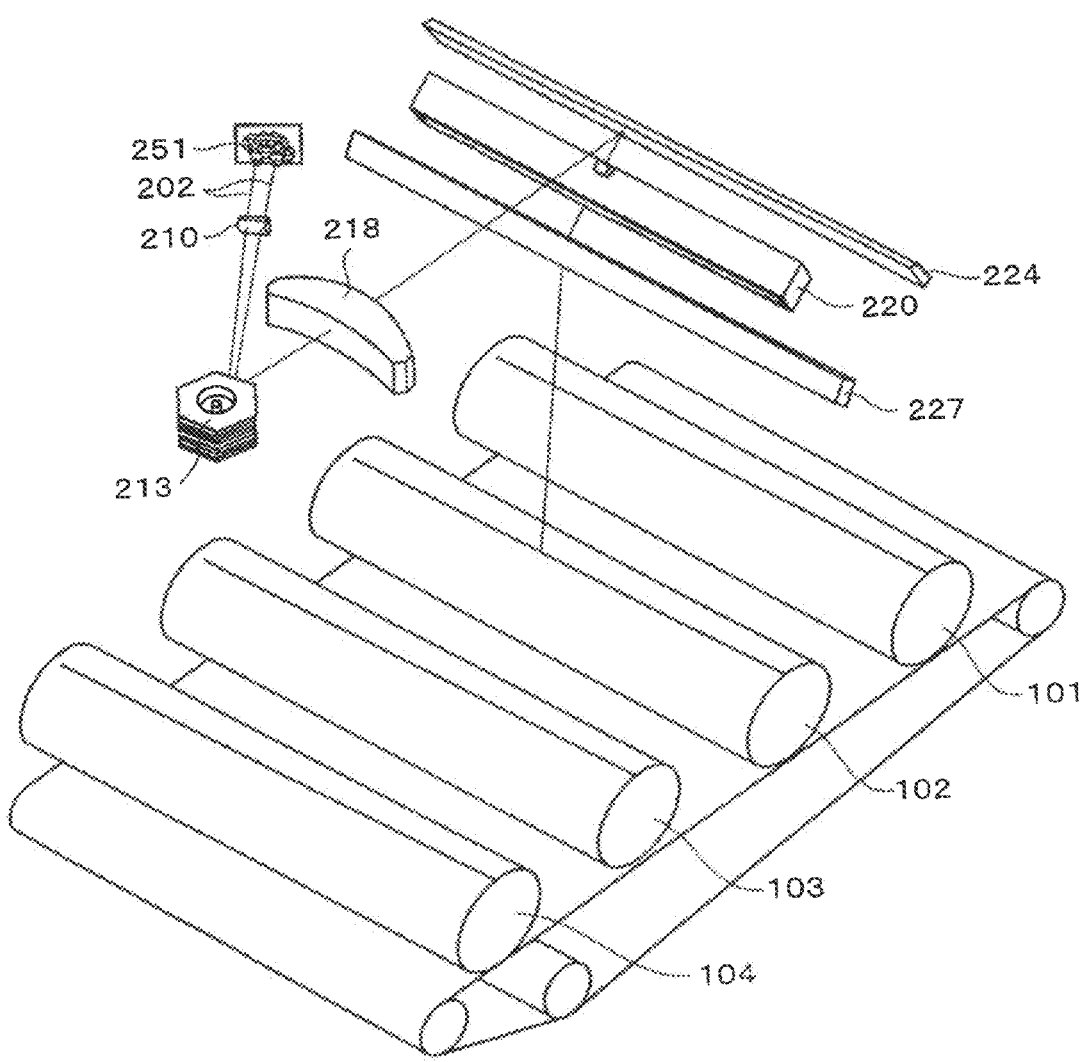
FIG. 43 is a diagram for explaining the optical scanning.

FIG. 43 shows the principal part of the tandem-type color image forming device in the preferred embodiment of the invention. In FIG. 43, the reference numerals 101, 102, 103 and 104 denote the photoconductors in which the electrostatic latent image is formed on the scanned surface by the light beam emitted. These photoconductors 101-104 are arranged in parallel with each other in the shape of a drum, and the electrostatic latent image of the yellow, the magenta, the cyan, and each color components image of black is formed in these photoconductors of the optical scan.

FIG. 43 shows the state where the optical scanning is made to the photoconductor 102. The electrostatic latent image of the magenta components image is written in by the optical scan of the photoconductor 102.

In FIG. 43, from the light-source unit 251, the two laser beams are emitted as the light beams 202. The two light beams are the parallel light beams in this example, and the light beams have the include angle in the main scanning direction, and incidence of the spacing is carried out to the cylindrical lens 210 with slight straightness, and it faces to the optical deflector 213, being completed by the cylindrical lens 210 to the sub-scanning direction.

The optical deflector 213 is the rotary polygon mirror and is divided into the four steps of polygon mirrors having the six deflection/reflection surfaces corresponding to the optical scanning of the photoconductors 101-104. Incidence of the two light beams from the light source 201 is carried out to the 2nd step of polygon mirror from the top among the four steps of polygon mirrors.

At this time, image-formation of each light beam is carried out as the slender line image to the main scanning direction by the action of the cylindrical lens 210 near the deflection/reflection surface which constitutes the reflective region. The line image which each light beam forms is divided into the sub-scanning direction, and when it is viewed from the revolving shaft of the optical deflector 213 the two light beams intersect the main scanning direction near the deflection/reflection surface.

When the optical deflector 213 carries out uniform rotation, the two light beams will be reflected and deflected in angular velocity, the 1st lens 218 is penetrated, the optical path length is bent by the reflection mirror 224, the 2nd long lens 220 is penetrated, the optical path length is bent by the 2nd reflection mirror 227, and incidence is carried out to the photoconductor 102.

For the sake of simplicity of illustration, the light beam is shown as a single beam after it passes the optical deflector 213. The two light beams which are incident to the photoconductor 102 are focused so that the two optical spots are separated from each other by the predetermined distance in the sub-scanning direction by the action of the 1st lens 218 and the 2nd lens 220 which constitute the scanning/focusing optical system, and carry out the optical scanning of the photoconductor 102 simultaneously for the two scanning lines. That is, this image forming device uses the multi-light-beam scanning method.

In the composition of such an optical system, the inclination of the scanning line and the deflection of the scanning line occur by the manufacture error, the installation error or deformation with time of the optical deflector 213, the scanning/focusing optical systems 218 and 220, and the reflection mirrors 224 and 227, and also deformation of the optical scanner itself.

The inclination of the scanning line can be compensated if it is performed as follows.

Figure 44A:
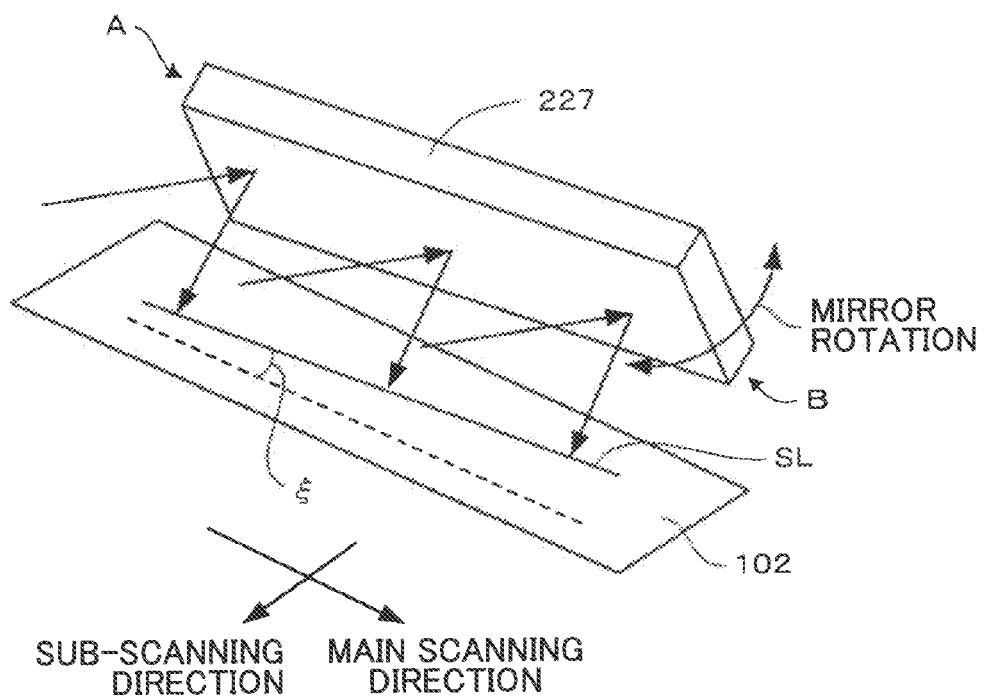
FIG. 44A and FIG. 44B are diagrams for explaining the compensation of the inclination of the scanning line.
Figure 44B:
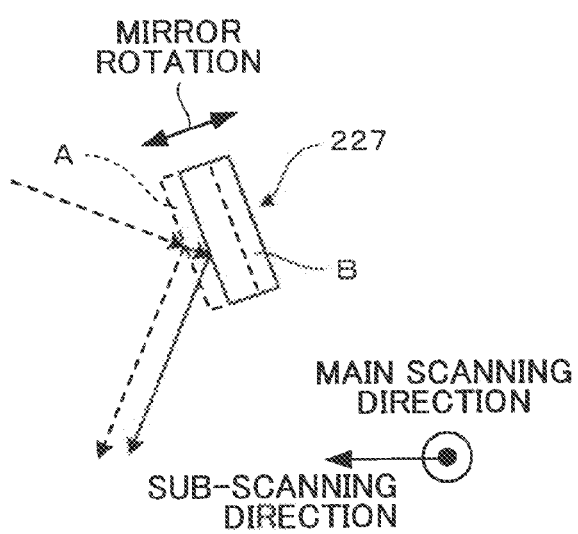

The first example is the method of adjustment of the posture of the reflection mirror 227 in FIG. 43. FIG. 44A and FIG. 44B show this adjustment method.

In FIG. 44A, the reference numeral 102 denotes the scanned surface. The scanned surface 102 means the photoconductor 102 of FIG. 43 in actual condition. However, in FIG. 44A, it is illustrated as the flat surface.

By the method of FIG. 44A and FIG. 44B, rotation adjustment of the posture of the reflection mirror 227 is carried out in order to compensate the inclination of the scanning line SL. Suppose that the both ends of the main scanning direction which is parallel to the longitudinal axis of the reflection mirror 227 are referred to as the edges A and B.

If the edge B side is rotated by using the edge A side as the fulcrum like FIG. 44A, the position where the deflected light beam is incident changes with the rotation from the edge A side to the edge B side continuously, and the reflected-light beam changes from the edge A side to the edge B side in alignment with the sub-scanning direction continuously as shown in FIG. 44B.

Since the inclination angle $\xi$ to the main scanning direction of the scanning line SL on the scanned surface 102 can be changed as shown in FIG. 44A by adjusting the posture of the mirror 227 through the rotation adjustment, this can compensate the inclination of the scanning line by return.

Figure 45A:
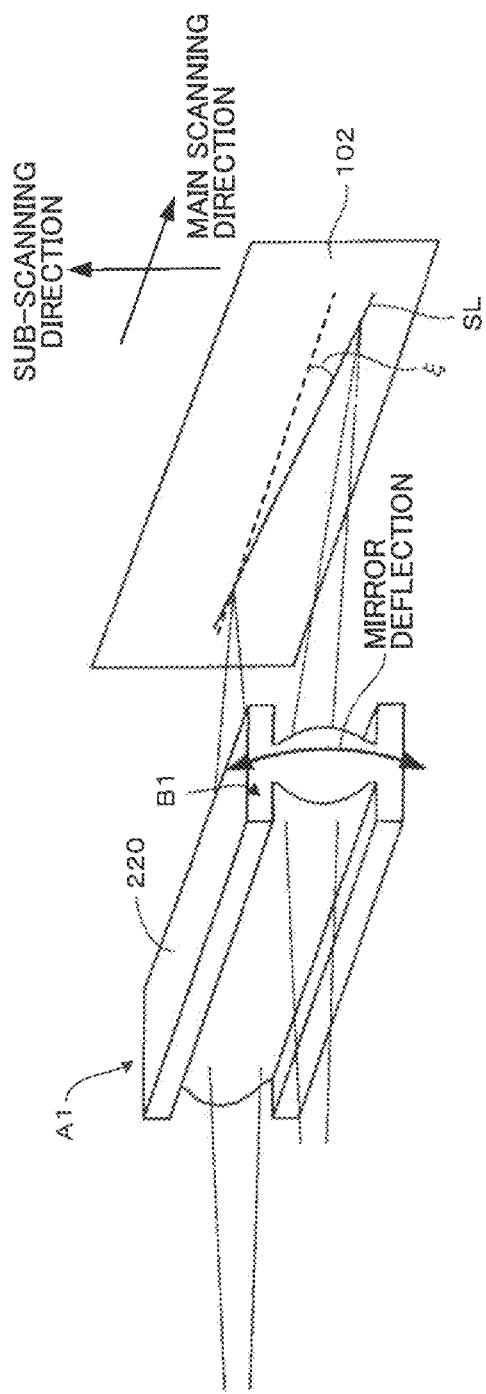
FIG. 45A and FIG. 45B are diagrams for explaining the compensation of the inclination of the scanning line.
Figure 45B:
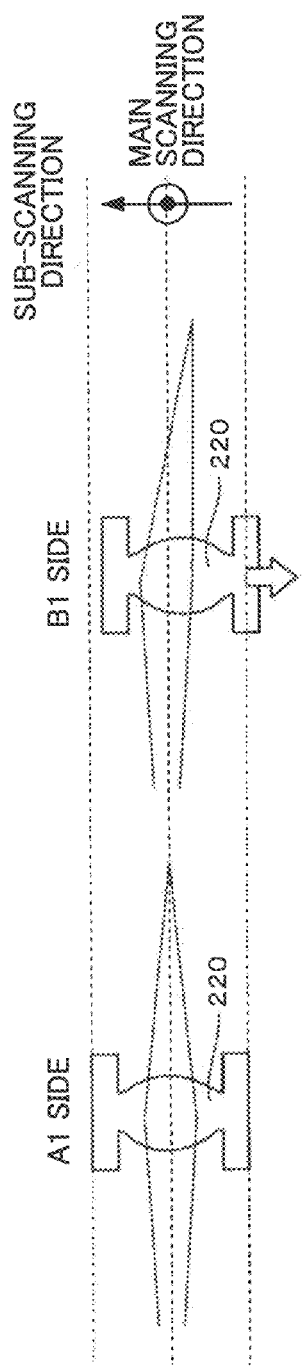

The example shown in FIG. 45A and FIG. 45B is the method of adjusting the posture of the 2nd lens 220 of the long picture in FIG. 43. In FIG. 45A, the reference numeral 102 is the scanned surface (in stereo FIG. 43 photoconductors 102), and since it is easy, it is illustrated superficially.

By the method of FIG. 45A and FIG. 45B, rotation adjustment of the posture of the 2nd lens 220 is carried out compensating the inclination of the scanning line SL.

Namely, as shown in drawing, when setting to A1 and B1 the both ends of the main scanning direction which is the lengthening joint of the 2nd long lens 220, for example, as shown in FIG. 45B if the edge B1 side is rotated in the sub-scanning direction by using the edge A1 side as the fulcrum like FIG. 45A. The optical axis of the 2nd lens 220 to the deflected light beam sets to the sub-scanning direction.

Since it changes from the edge A1 side continuously toward the edge B1 side and the advance direction of the light beam changes from the edge A1 side to the sub-scanning direction continuously toward the edge B side by adjusting the posture of the 2nd lens 220 by the rotation adjustment, as shown in FIG. 45A, the main scanning direction of the scanning line SL on the scanned surface 102 is received since it can incline and xi can be changed, this can compensate the inclination of the scanning line.

In the above description, the compensation of the inclination of the scanning line by posture adjustment of the reflection mirror 227 and the 2nd lens 220 has been explained. In the following, the compensation of the deflection of the scanning line will be explained.

Figure 46A:
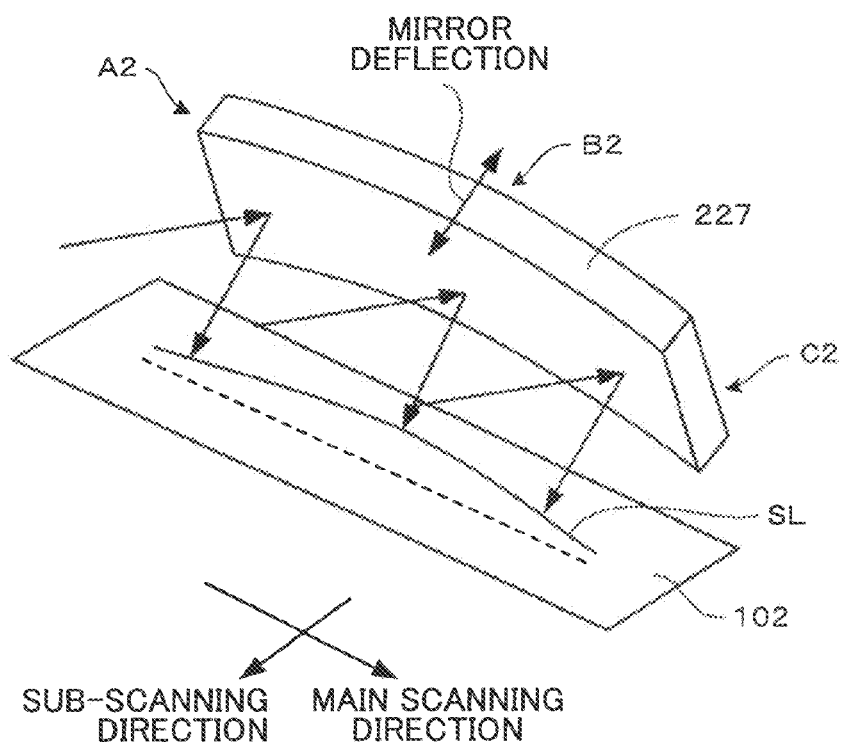
FIG. 46A and FIG. 46B are diagrams for explaining the compensation of the deflection of the scanning line.
Figure 46B:
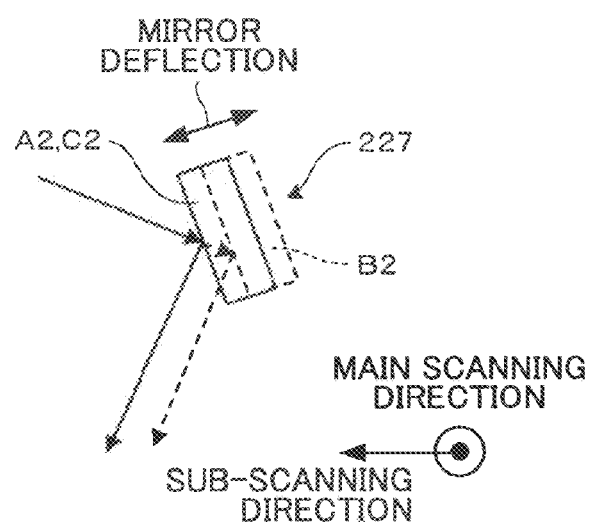

In FIG. 46A and FIG. 46B, the reference numeral 102 shows the scanned surface (in stereo photoconductor 102), and the reference numeral 227 shows the reflection mirror.

As shown in FIG. 46A, it makes it act in the direction which makes B-2 the both ends of the lengthening joint (main scanning direction) of the reflection mirror 227, and intersects perpendicularly A2, C2, and the center section with the surface in them at the lengthening-joint both ends A2 and C2 and center-section B-2 it is the force of the reverse direction mutually, and the mirror 227 is sagged by return.

As shown in FIG. 47B, the light beam reflected by the reflection mirror 227 changes to the sub-scanning direction according to bending of the reflection mirror 227. Thereby, the scanning line SL in the scanned surface 102 curves, as shown in FIG. 46A.

Since the grade of the curve of the scanning line SL can be changed by adjusting the amount of bending of the reflection mirror 227, deflection of the scanning line can be compensated using this. In FIG. 47A and FIG. 47B, the reference numeral 102 shows the scanned surface (in stereo photoconductor 102), and the reference numeral 220 shows the 2nd long lens.

As shown in FIG. 47A, A3, C3, and the center section are set to B3 for the both ends of the lengthening joint (main scanning direction) of the 2nd lens 220. The 2nd lens 220 sag the main scanning direction as the both ends A3 and C3 and center-section B-2 of the lengthening joint are made to act and the force with the reverse direction is shown in them in parallel with the sub-scanning direction, and mutually at FIG. 47B.

Since the position relation of the optical axis of the light beam and the 2nd lens 220 which carries out incidence changes to the 2nd lens 220 according to the amount of bending of the 2nd lens 220, the advance direction of the light beam which penetrated the 2nd lens 220 changes to the sub-scanning direction according to bending of the 2nd lens 220. Thereby, the scanning line SL in the scanned surface 102 curves, as shown in FIG. 47A.

Since the grade of the curve of the scanning line SL can be changed by adjusting the amount of bending of the 2nd lens 220, deflection of the scanning line can be compensated using this.

In the above, the compensation of the inclination of the scanning line by posture adjustment of the reflection mirror 227 and the 2nd lens 220 and the compensation of the deflection of the scanning line by deformation (curve) of the reflection mirror 227 and the 2nd lens 220 are explained.

It is also possible to compensate the inclination and deflection of the scanning line simultaneously combining the posture adjustment and deformation. For example, the amount adjustment of curves of the reflection mirror 227 can compensate the deflection of the scanning line, and the inclination of the scanning line can also be compensated by posture adjustment of the 2nd lens 220.

Or the amount of curves of the reflection mirror 227 (or the 2nd lens 220) can compensate the deflection of the scanning line, and the inclination of the scanning line can also be compensated by the posture adjustment by rotation adjustment.

Referring back to FIG. 43, in order to compensate the inclination and deflection of the scanning line, posture adjustment is carried out, or any of the 1st lens 218, the 2nd lens 220, and the reflection mirrors 224 and 227 are sufficient as the optical component made to deform, and it can also perform posture adjustment and deformation in such proper combination.

The position error of the main scanning direction of the optical spot on the scanned surface follows on the compensation of the inclination and deflection of the scanning line by posture adjustment and deformation of the optical component explained above as a side effect. For example, FIG. 48 show the state where the inclination of the scanning line is compensated, by carrying out posture adjustment (rotation adjustment which uses the edge A side as the fulcrum) of the reflection mirror 227.

The reflection mirror 227 is in the state which shows with the broken line before posture adjustment. The inclination of the scanning line is adjusted by adjusting the posture to the state which is shown as the continuous line.

Figure 48:
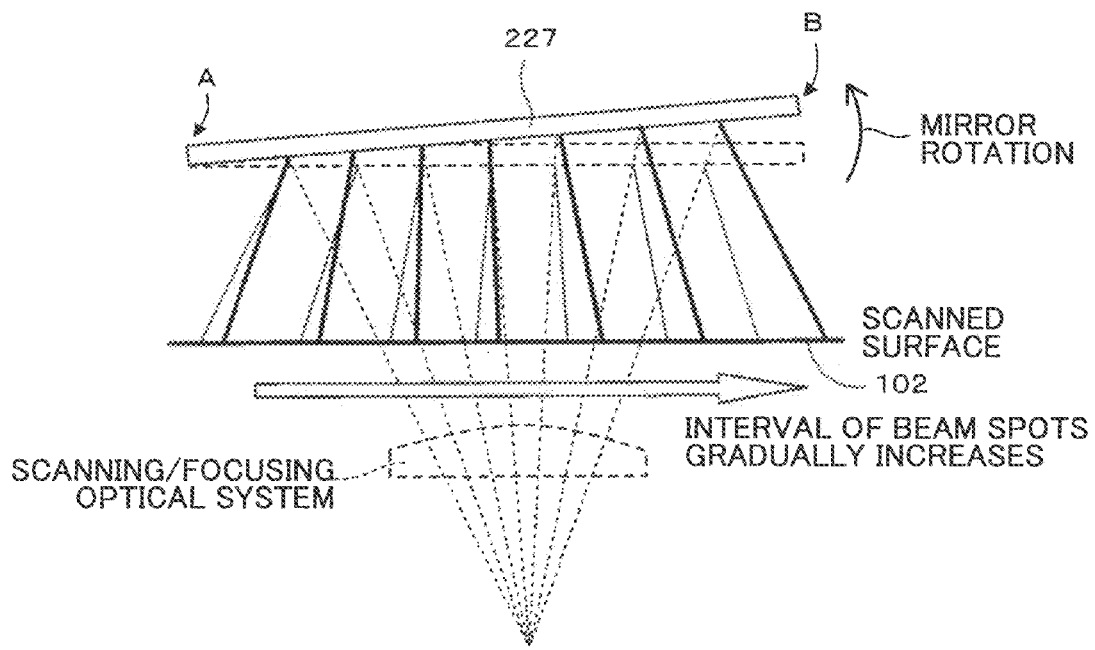
FIG. 48 is a diagram for explaining the position error of the optical spot resulting from the compensation of the inclination of the scanning line.

In addition, it sets after the optical deflector that it is with the scanning/focusing optical system in FIG. 48, it packs the optical system on the optical path length which results in the mirror 227 by return (the 1st lens 218, 2nd lens 220 grade), and shows it typically.

In connection with having carried out posture adjustment of the reflection mirror 227, the incident angle to the reflection mirror 227 of the deflected light beam becomes the thing different posture adjustment before, and the attainment position (the thick line shows the image quantity optical path length of the optical spot) to the scanned surface of the light beam shifts from the position before posture adjustment (the thin line shows the optical path length).

That is, the incident angle becomes small as compared with posture adjustment before in the edge A side, and becomes large in the edge B side. Moreover, the incidence position to the reflection mirror 227 shifts large on the edge B side. For this reason, spacing of the main scanning direction of the optical spot corresponding to the contiguity pixel changes so that it may spread gradually toward the edge B side from the edge A side.

When the direction of rotation for posture adjustment of the reflection mirror 227 is made into the direction (clockwise rotation) contrary to that of FIG. 48, spacing of the main scanning direction of the optical spot corresponding to the contiguity pixel changes so that it may narrow gradually toward the edge B side from the edge A side.

When posture adjustment of the lens 220 contained in the scanning/focusing optical system, for example, the 2nd lens, is carried out like FIG. 45A and FIG. 45B and the inclination of the scanning line is compensated, the part which the light beam penetrates with posture adjustment since the lens configuration on the cross section which intersects perpendicularly with the main scanning direction changes with the incidence position. The image-formation characteristics of the main scanning direction of the 2nd lens 220 change with the incidence position, and spacing of the main scanning direction of the optical spot corresponding to the contiguity pixel changes intricately according to image quantity.

Figure 49:
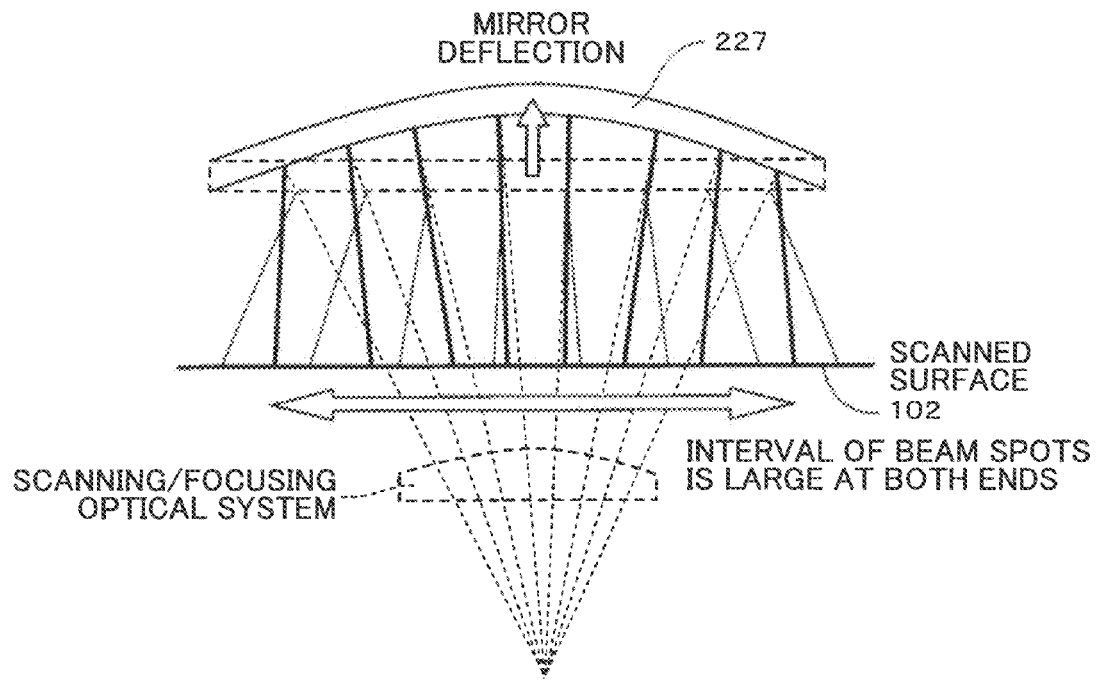
FIG. 49 is a diagram for explaining the position error of the optical spot resulting from the compensation of the deflection of the scanning line.

When sagging the reflection mirror 227 as shown in FIG. 49 in order to compensate deflection of the scanning line for example, the incident angle of the light beam to the optical-path-length reflection mirror 227 changes. Near the center of the main scanning direction, the incident angle and the incidence position do not carry out remainder change to the incident angle and the incidence position changing a lot by the both-ends side of the main scanning direction.

Spacing of the main scanning direction of the optical spot corresponding to the contiguity pixel becomes so large that it is close to the both ends of the main scanning direction. It will become this reverse if the direction of bending is reverse.

When stir-frying the lens 220 contained in the scanning/focusing optical system, for example, the 2nd lens, like FIG. 47A and compensating the deflection of the scanning line with the curve of the lens.

Since the lens configuration on the cross section which intersects perpendicularly with main scanning direction of the part which the light beam penetrates changes with the incidence position, the image-formation characteristics of the main scanning direction of the 2nd lens 220 change with the incidence position, and spacing of the main scanning direction of the optical spot corresponding to the contiguity pixel changes intricately according to image quantity.

Figure 50A:
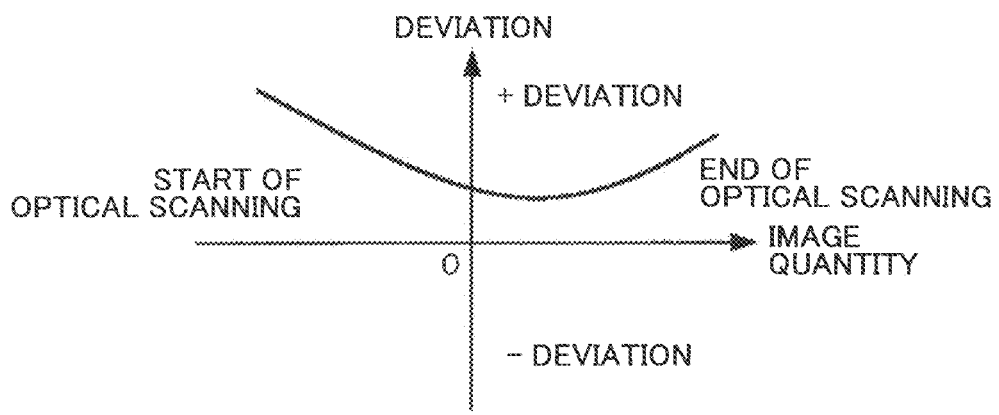
FIG. 50A, FIG. 50B and FIG. 50C are diagrams for explaining the example of the position error of the main scanning direction of the optical spot and the compensation thereof.

Generally, in the compensation which is explained by FIG. 48 and which carries out posture adjustment of the reflection mirror compensates the deflection of the scanning line, the amount of position deviations of the optical spot the position error becomes the characteristics that it has the one local extremum to image quantity (axis of abscissa) as shown in FIG. 50A. In addition, the direction of the position deviation makes the direction which shifts to optical scanning start one end the position deviation of +.

Therefore, it is good to set the amount of compensation has the one local extremum in the characteristics over image quantity in case the position-error compensation unit compensates the position error up the amount of compensation like.

Figure 50B:
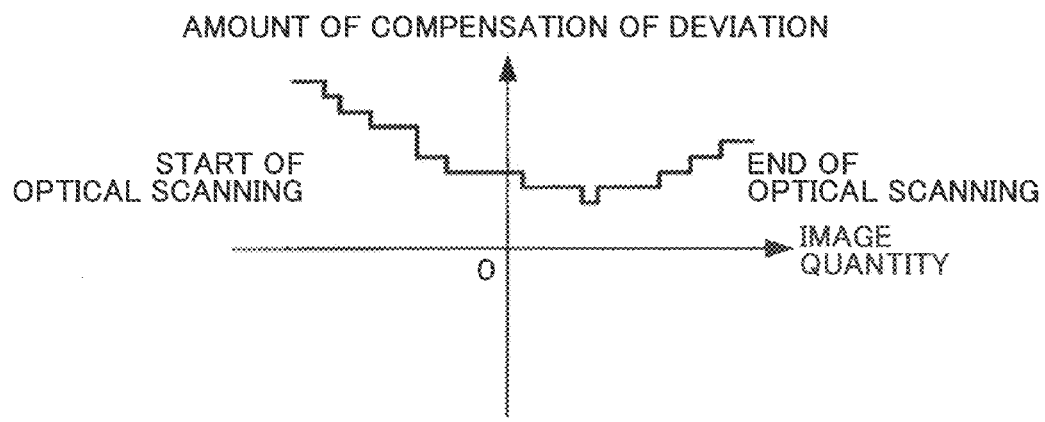

If the amount of compensation of the position error is set up for every pixel, according to each pixel, the optical spot can be compensated in the proper position (state which compensated completely the position error resulting from the inclination of the scanning line). However, from practical use the perfect compensation is not required, and as the effective light scanning region is divided into two or more regions, for example, it is shown in FIG. 50B, it makes the amount of compensation the fixed value according to the region in each region. As a whole, it is possible to be made to perform the compensation which approximates the position error of FIG. 50A in the shape of a stairway.

Figure 50C:
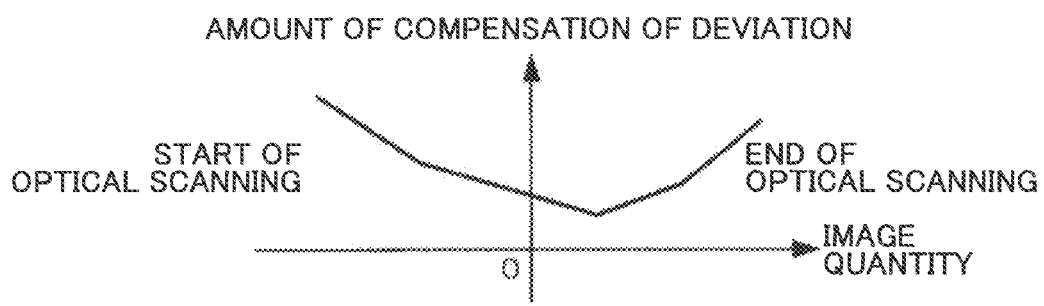

Or, as shown in FIG. 50C, it is possible to perform the compensation which the amount of compensation of the position error is changed in polygonal line, and approximates the position error. As the method of the compensation by the position-error compensation unit, how to change the frequency of the clock of the image signal as mentioned above can be considered.

What is necessary is just to be made to let the frequency of the clock be the predetermined value for each stage when performing the compensation in FIG. 50B. In compensating FIG. 50C, what is necessary is just made to make the rate (differentiation value) of change of the frequency regularity in the part of each polygonal line.

Or, what is necessary is just to change the shift amount, whenever it sets the shift amount constant for each stage of every and the one step of amounts of compensation differ, when the phase shift of the clock of the image signal performs the compensation shown in FIG. 50B. In this case, the shift amount is defined for every stage and the position of the optical spot located in the beginning of each stage is shifted according to the amount of compensation (the position of all the optical spots of the others which belong to the same stage in this case will be compensated in the amount of compensation, and the optical spot of the same stage becomes the same amount of compensation like FIG. 50B).

Or, it is possible to be made to compensate polygonal line approximation like FIG. 50C. In the case where the compensation of polygonal line approximation of FIG. 50C is performed the optical spot changes it shifts, and the amount of phase shift is set up in common in each polygonal line region, and the number of the pixels which perform phase shift for every polygonal line region what is necessary is just to make it like.

In such the compensation, each polygonal line region becomes the shape of a fine stairway. It does not interfere, even if it regards it as the straight line (polygonal line region) as a whole, since the stairway is fine. In this case, when the step of each stairway gathers, the case where the pixel which performs the phase shift is located in a line at equal intervals can consider that the part of the shape of a fine stairway is the shape of a straight line.

There is no need that the pixel which performs the phase shift is not necessarily located in a line at equal intervals, if it carries out giving and arranging the roughness and fineness of the pixel which performs the phase shift, it can also express the curves, such as the secondary function and the 3rd function, and the highly precise compensation of it will be attained.

As mentioned above, since the pixel written in by the optical spot continues, if the position error of the one optical spot is compensated, the position error corresponding to the pixel which follows in connection with this will also interlock, and only the amount of compensation will be compensated.

In compensating the inclination of the scanning line by posture adjustment of the lens in the optical scanning image-formation component, the position error of the optical spot changes intricately according to image quantity. In this case, the relation between the amount of posture adjustments of the lens and the position error of the optical spot is beforehand decided in survey or simulation, and compensating based on it is good. Thus, the effective compensation of the position error is attained by setting up compensation data. That is, it can know what position error if the position error of the optical spot accompanying the compensation of the inclination of the scanning line can take the amount of compensation of the inclination of the scanning line, and good correlation and the amount of compensation of the inclination of the scanning line understands it, will generate it. Therefore, it is good to determine the amount of compensation of the position error according to the amount of compensation of the inclination of the scanning line.

Since compensation highly precise than does not need to become possible and does not need to form the toner image for detection as compared with method which detects the state of the scanning line of the main scanning direction by toner mark sensor by doing in this way, toner consumption can be reduced. In carrying out deformation of the reflection mirror compensating the deflection of the scanning line, generally the amount of compensation to the image quantity of the position error has the n+1 local extremum to several n of the local extremum in deformation of mirror it changes like which is explained by FIG. 49.

Figure 51A:
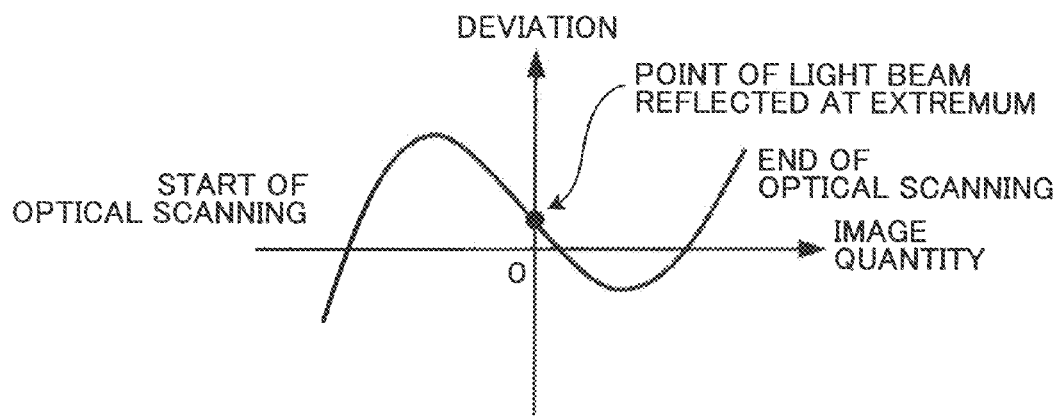
FIG. 51A, FIG. 51B and FIG. 51C are diagrams for explaining the example of the position error of the main scanning direction of the optical spot and the compensation thereof.
Figure 51B:
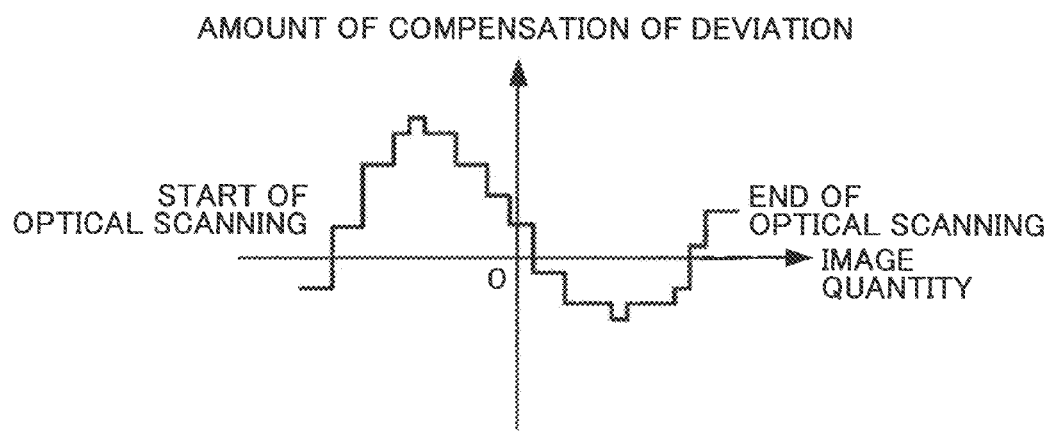
Figure 51C:
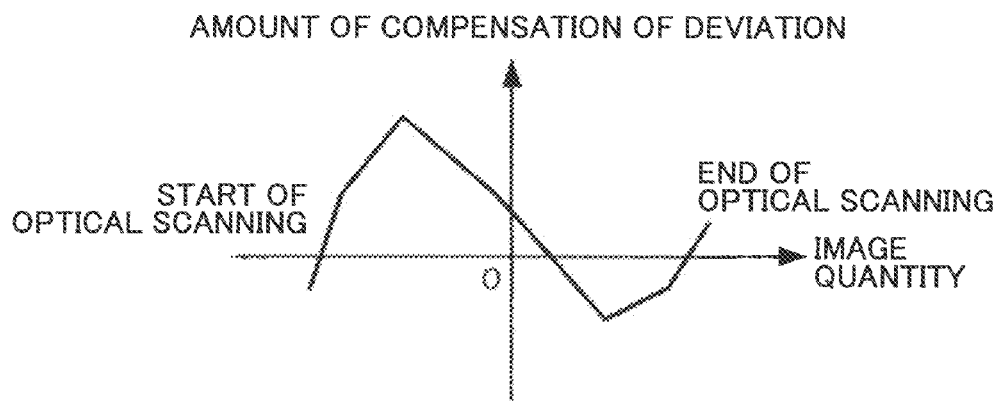

FIG. 51A to FIG. 51C show the example of the situation (characteristics) of the change to the image quantity of the position error in n=1 (in this case, the reflection mirror is stir-fried so that it may have the one local extremum, as shown in FIG. 49).

At this time, it is the local extremum (it corresponds to the image quantity 0) of the mirror side. The tangent of the main scanning direction becomes parallel to the main scanning direction. It sets in the image quantity before and behind the position error (the reaching point of the beam of light and display which are reflected by the local extremum of side configuration all over drawing) of the optical spot which the light beam which the light reflected in the part to take forms, and the position error is the local extremum.

It is the optical scanning start side and is the optical local maximum and scanning end side, and since the local minimum is taken, it is good to set up the amount of compensation so that the amount of compensation of the position error may also take the local extremum (it being the optical scanning start side and being the optical local maximum and scanning end side in the example of drawing local minimum) according to this.

When it does in this way, the amount of compensation of the position error will be set up to several n of the local extremum in deformation of the reflection mirror so that it may have the n+1 local extremum. The compensation of the position error the amount of compensation of the position error is set up for every pixel, and it is possible to make it compensate the optical spot in the proper position according to each pixel.

The effective light scanning region is divided into two or more regions, and it may be made to perform the compensation which approximates the position error of FIG. 51A in the shape of a stairway as shown in FIG. 51B.

Or, as shown in FIG. 51C, it is possible to perform the compensation which the amount of compensation of the position error is changed in polygonal line, and approximates the position error. These compensation can change the frequency of the clock of the image signal, as FIG. 50A to FIG. 50C explained previously, or the phase shift can perform it.

Since the position error of the optical spot changes intricately according to image quantity as mentioned above in compensating deflection of the scanning line by deformation of the lens in the optical scanning image-formation component, in this case, the relation between the deformation of the lens and the position error of the optical spot is beforehand decided in survey or simulation, and compensation based on it is good. Thus, the effective compensation of the position error is attained by setting up compensation data. That is, it can know what position error if the position error of the optical spot which originates in the compensation of the deflection of the scanning line and is generated can take the amount of compensation of the deflection of the scanning line, and good correlation and the amount of compensation of the inclination of the scanning line understands it, will generate it.

Therefore, it is good to determine the amount of compensation of the position error according to the amount of compensation of the deflection of the scanning line. By doing in this way, as compared with the method the toner mark sensor detects the state of the scanning line of the main scanning direction, the highly precise compensation is attained and can reduce toner consumption.

In the following, the method of the phase shift of the clock of the image signal is explained with the one example of the position-error compensation unit with reference to FIG. 52 through FIG. 54.

Figure 52:
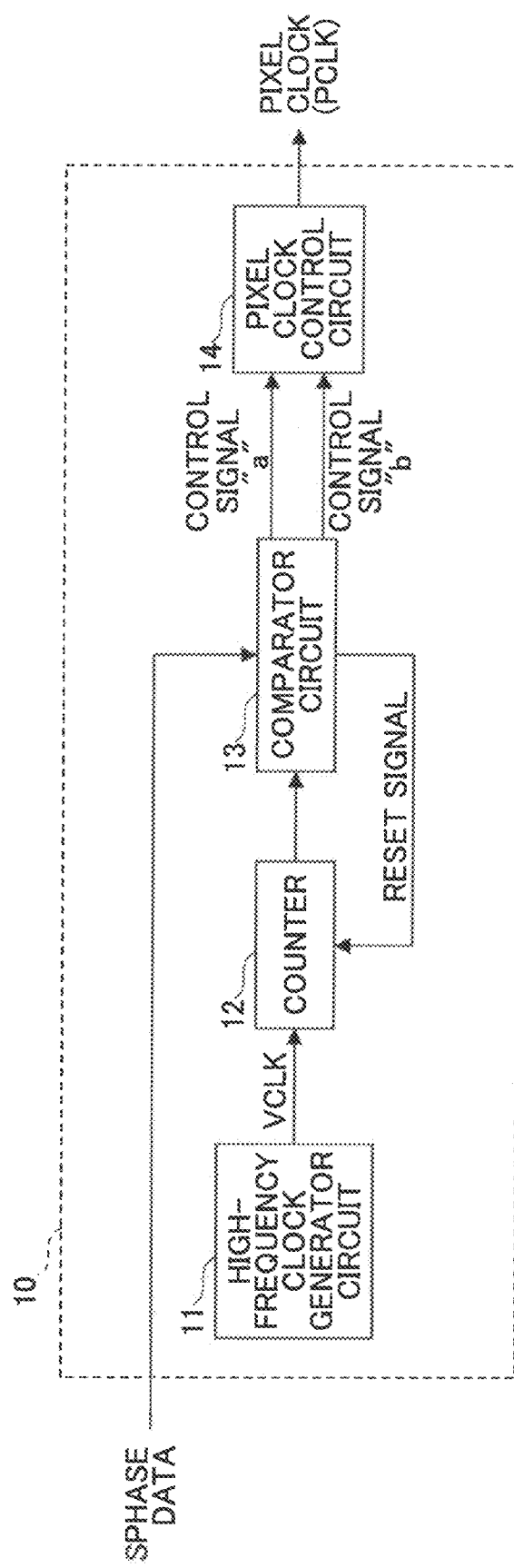
FIG. 52 is a block diagram for explaining one embodiment of the position-error compensation unit for compensating the position error of the main scanning direction of the optical spot.

In FIG. 52, the pixel clock generator circuit 10 has the high-frequency-clock generator circuit 11, the counter 12, the comparison circuit 13, and the pixel clock control circuit 14. The high-frequency-clock generator circuit 11 creates high-frequency-clock VCLK used as the reference of the pixel clock PCLK. The pixel clock PCLK is the clock of the image signal. The counter 12 operates at the rising edge of high-frequency-clock VCLK, and counts this clock VCLK.

The comparison circuit 13 outputs the control signal a and the control signal b based on the comparison result as compared with the phase data which directs the amount of phase shifts as transition timing of the pixel clock given from the counted value, the predetermined value, and the outside of the counter 12.

The pixel clock control circuit 14 controls the transition timing of the pixel clock PCLK based on the control signals a and b. The above phase data is the data which directs the shift amount of the phase of the pixel clock, in order to compensate the position error resulting from the compensation of the inclination of the scanning line, and/or deflection, and generally it is given by the digital value of several bits.

The data which compensates the position error (position error peculiar to the optical system) produced with the characteristics of the scanning/focusing optical system with the data for the compensation of the position error, the position error resulting from rotation variation of the optical deflector, the position error produced with the chromatic aberration of the laser beam of the laser used as a light source, etc. can also be included in phase data.

Figure 53A:
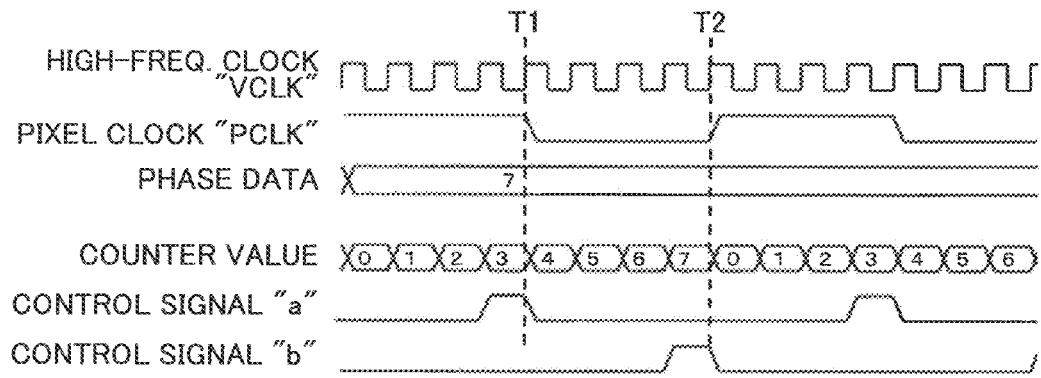
FIG. 53A, FIG. 53B and FIG. 53C are diagrams for explaining the phase shift of the clock of the image signal performed by the position-error compensation unit of FIG. 52.
Figure 53B:
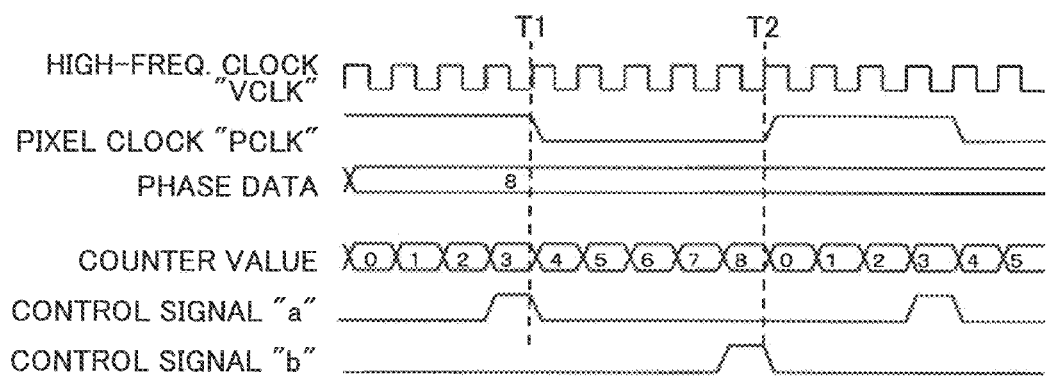
Figure 53C:
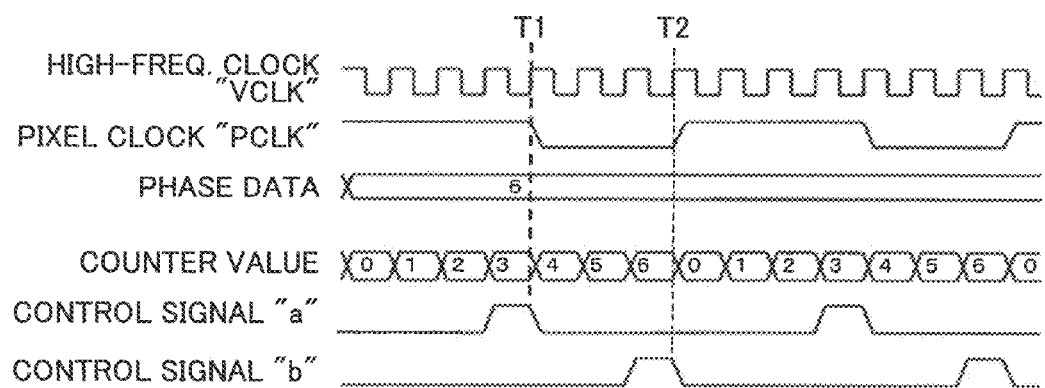

FIG. 53A, FIG. 53B and FIG. 53C are the timing charts for explaining operation of the pixel clock generator circuit 10 of FIG. 52. In this example, the pixel clock PCLK is made into 8 times the period of high-frequency-clock VCLK, and, as standard, it considers as 50% of duty ratio.

Figure 60A:
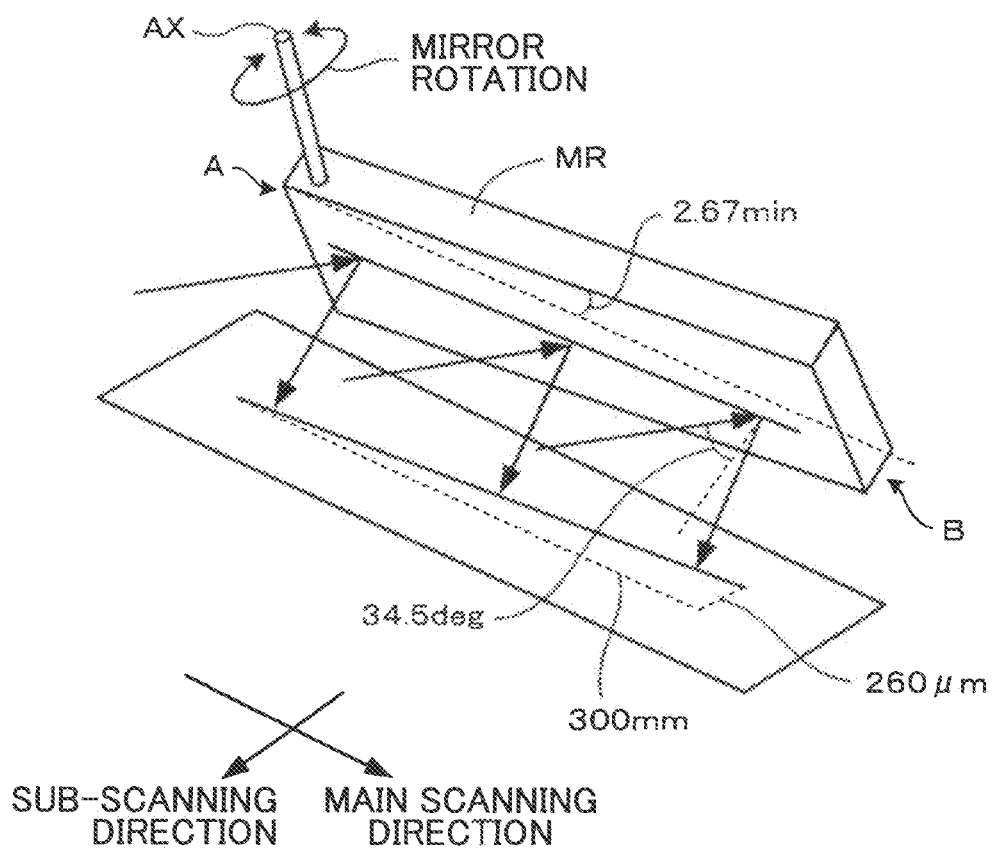
FIG. 60A and FIG. 60B are diagrams for explaining the posture adjustment (rotation) of the reflection mirror in the Example 1.
Figure 60B:
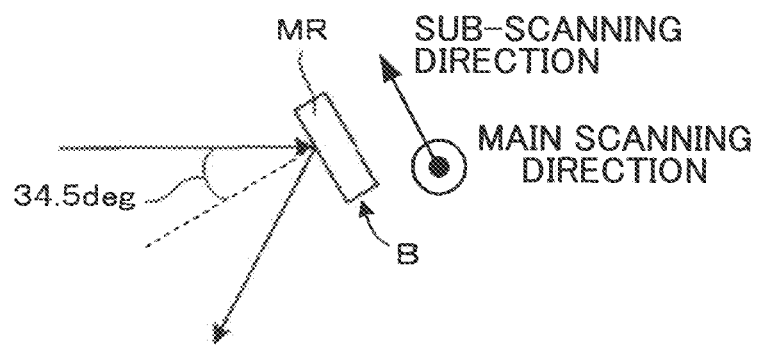

FIG. 60A shows the state that the standard pixel clock PCLK of 50% of duty ratio equivalent to 8 times the period of high-frequency-clock VCLK is created. FIG. 60B shows the state that the pixel clock PCLK (the optical spot position shifts to the optical scanning end side by the ⅛ pixel with this pixel clock) with which only the ⅛ clock advanced the phase is created to 8 dividing clock of high-frequency-clock VCLK. FIG. 60C shows the state that the pixel clock PCLK (the optical spot position shifts to the optical scanning start side by the ⅛ pixel with this pixel clock) with which only the ⅛ clock delayed the phase is created to 8 dividing clock of high-frequency-clock VCLK.

In FIG. 60A, the value of "7" is given as phase data. "3" is beforehand set to the comparison circuit 13. The counter 12 counts by operating in the standup of high-frequency-clock VCLK. The comparison circuit 13 outputs the control signal a in the place where the value of the counter 12 became "3". Since the control signal a is "H", the pixel clock control circuit 14 makes the pixel clock PCLK change from "H" to "L" to timing T1.

Subsequently, the comparison circuit 13 compares the phase data "7" and the counter value which are given, and if in agreement, it will output the control signal b. In FIG. 60A, the comparison circuit 13 outputs the control signal b in the place where the value of the counter 12 became "7". Since the control signal b is "H", the pixel clock control circuit 14 makes the pixel clock PCLK change from "L" to "H" to "timing T2". The comparison circuit 13 makes the counter 12 reset simultaneously with the changes, and makes the count start from "0" again at this time.

Thus, the pixel clock PCLK of 50% of duty ratio equivalent to 8 times the period of high-frequency-clock VCLK is generable. In addition, the duty ratio can be changed if the set point (it is "3" at the example) of the comparison circuit 13 is changed.

In FIG. 60B, "8" is given as phase data. The counter 12 counts high-frequency-clock VCLK. The comparison circuit 13 outputs the control signal a in the place where the value of the counter 12 became "3". Since the control signal a is "H", the pixel clock control circuit 14 makes the pixel clock PCLK change from "H" to "L" at the "timing T1".

Subsequently, if the comparison circuit 13 is in agreement with the phase data ("8") with which the value of the counter 12 is given, it will output the control signal b.
Since the control signal b is "H", the pixel clock control circuit 14 is the "timing T2" in drawing, and it makes the pixel clock PCLK change from "L" to "H" at this time.
The comparison circuit 13 makes the counter 12 reset simultaneously with the changes, and makes the count start from "0" again at this time.
Thus, the pixel clock PCLK to which only the ⅛ clock advanced the phase to 8 dividing clock of high-frequency-clock VCLK can be created.
In FIG. 60C, "6" is given as phase data here.
The counter 12 counts the pixel clock VCLK.
The comparison circuit 13 outputs the control signal a in the place where the value of the counter 12 became "3."
Since the control signal a is "H", the pixel clock control circuit 14 makes the pixel clock PCLK change from "H" to "L" at the "timing T1" in drawing.
Subsequently, if the comparison circuit 13 is in agreement with the phase data ("6") with which the value of the counter 12 is given, it will output the control signal b.
Since the control signal b is "H" at this time, the pixel clock control circuit 14 makes the pixel clock PCLK change from "L" to "H" at the timing T2.

The counter 12 is reset simultaneously with these changes, and the count is again started from "0".

Thus, the pixel clock PCLK with which only the ⅛ clock delayed the phase to 8 dividing clock of high-frequency-clock VCLK is generable. In addition, the phase data is synchronized with the standup of pixel clock PCLK, and is given, and enables it to change the phase of the pixel clock PCLK for every clock.

Figure 54:
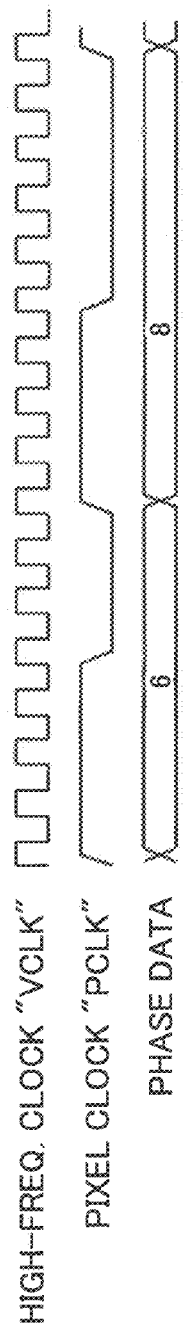
FIG. 54 is a diagram for explaining the example of the clock of the image signal compensated by the position-error compensation unit of FIG. 52.

FIG. 54 is the timing chart for explaining the above-mentioned case. As mentioned above, since the variation rate of the position of the optical spot can be carried out to the main scanning direction by making it shift so that the phase of the pixel clock which is the clock of the image signal may be advanced, or so that it may be behind, the compensation of the position error is attained by giving the direction and magnitude of the shift of the phase as position-error compensation data.

By the method explained above, it becomes possible to control the phase of the pixel clock PCLK by easy composition in the ± direction in clock width of high-frequency-clock VCLK. Since it is possible to make it change for every clock as for the phase of the pixel clock PCLK, the high definition compensation is possible. Every clock in order to make it memorize in the memory it is phase data (position-error compensation data) for every clock to change the phase, the memory of the considerable amount is needed and it is easy to invite the cost rise. For avoiding the cost rise the effective light scanning region two or more regions dividing the compensation in the region unit is performed what is necessary is just to make it like. The capacity of the memory can be sharply reduced by doing in this way.

Moreover, the need of not necessarily shifting the phase to every number of fixed pixels in the region is good as for how for there not to be and to give the roughness and fineness to spacing of the pixel to which the phase is shifted according to the state of the position error of the optical spot to compensate.

The highly precise optical scan is attained by doing in this way. Not only the data that directs the shift amount of the phase as mentioned above the phase data but the information as to how many pixels whose phase is shifted can also be included. When dividing the effective light scanning region on the scanned surface into two or more regions and compensating for every region, as for the division into the region, it is good to make it become approximately regular intervals.

If the region where width is wide is made, the compensation in the region where width is wide will become difficult, and the compensation accuracy in the region where width is wide will fall. Moreover, the adjustment process is complicated and it becomes the cause of the cost rise. Therefore, what is compensated with sufficient balance with high precision in all regions by making division into two or more regions into approximately regular intervals becomes possible, and the cost cut by simplification of the adjustment process can be aimed at.

It is required to get to know the inclination and/or deflection of the scanning line in the optical scan in implementation of this invention, the scanning line compensation unit compensates the inclination and /deflection of the scanning line which are known in this way, and the position-error compensation unit compensates the position error of the main scanning direction of the optical spot which originates in this compensation and is generated.

In order to know the inclination and/or deflection of the scanning line, the image formation may actually be performed, the line image of the main scanning direction may be visualized as a toner image, and the inclination and/or deflection of the toner image which are visualized may be measured.

Figure 55:
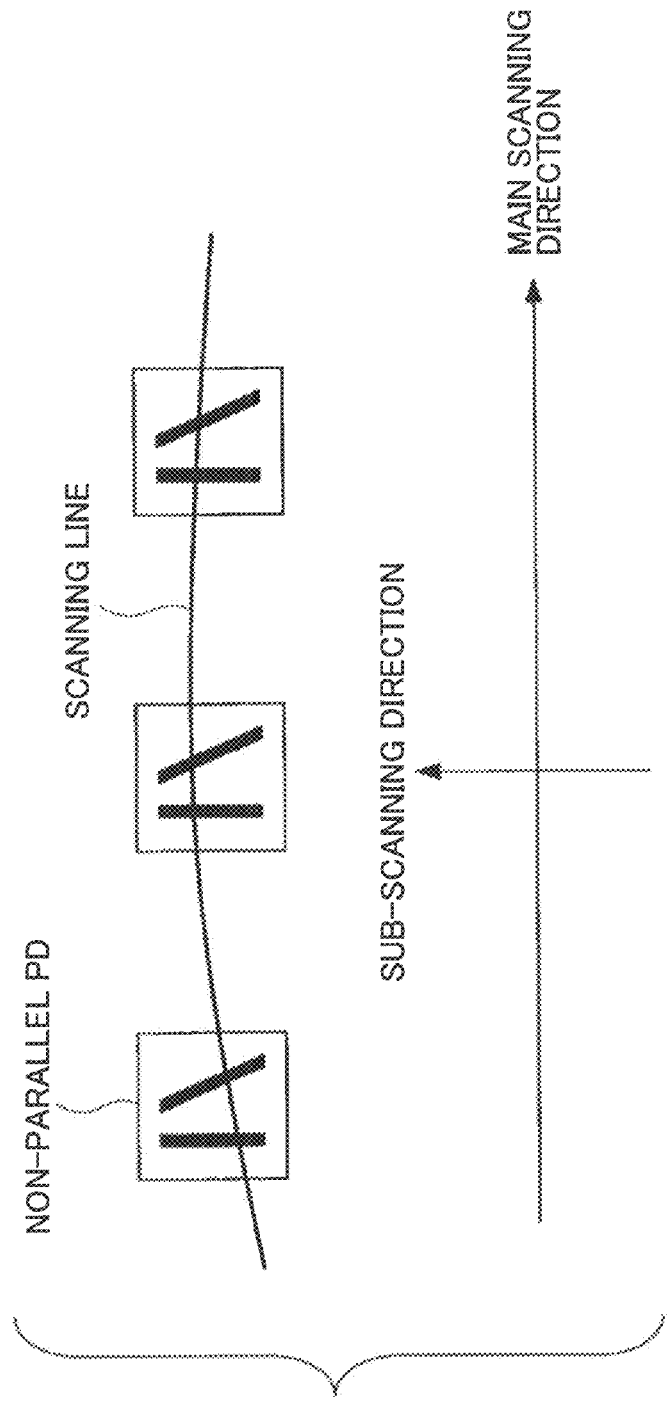
FIG. 55 is a diagram for explaining the example of the method of detection of the inclination and deflection of the scanning line.

The toner mark may be formed in two or more places of the main scanning direction, and the inclination and/or deflection of the scanning line may be detected by detecting by the toner mark sensor. Moreover, as shown in FIG. 55, non-parallel PD to which at least two photodetectors are located in a line with being nor parallel can be arranged to two or more places of the main scanning direction, and the inclination and/or deflection of the scanning line can also be detected.

Since the difference of two output time of the photodetector changes with differences in the sub-scanning-direction height which passes along the photodetector located in a line, non-parallel PD can detect the inclination and/or deflection of the scanning line by preparing non-parallel PD in two or more places of the main scanning direction.

Figure 56:
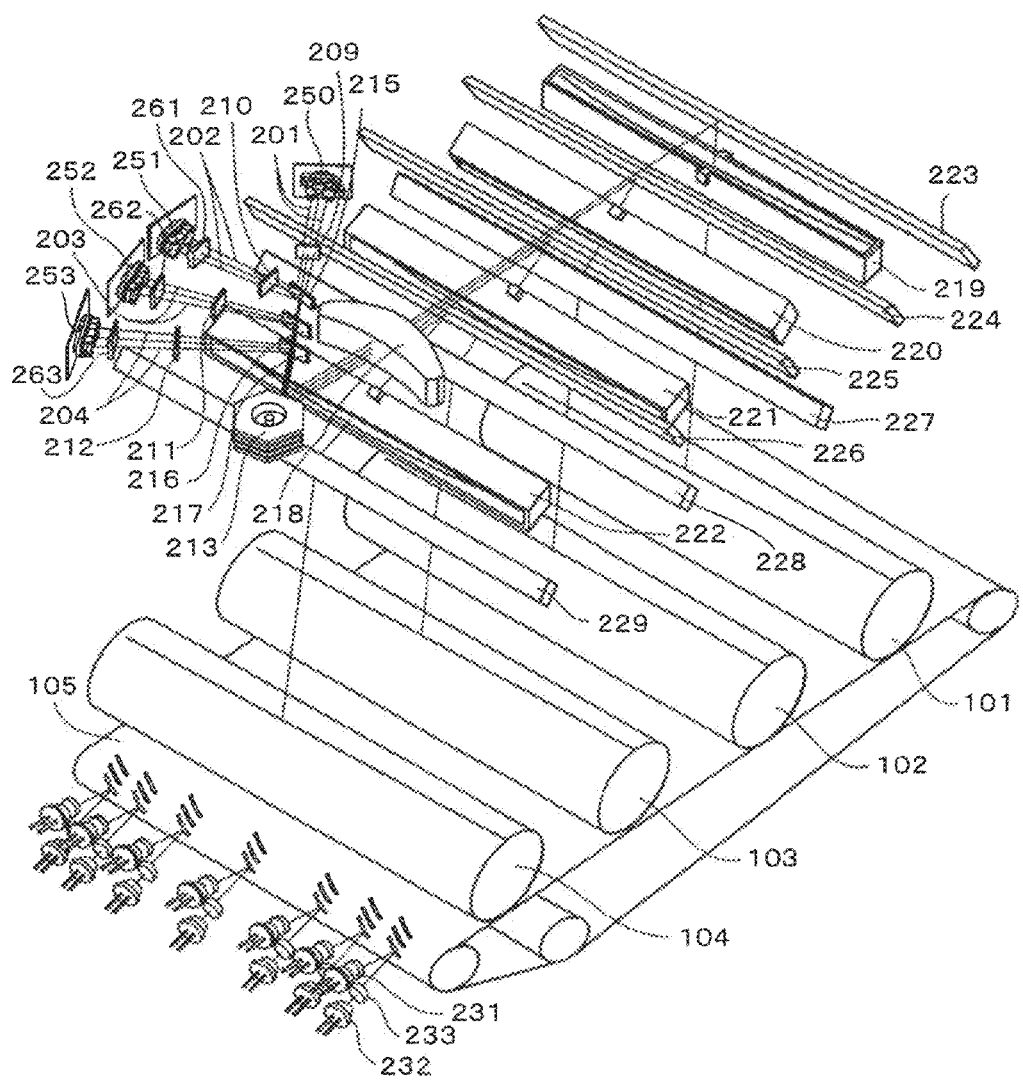
FIG. 56 is a diagram showing the principal part of the embodiment of the full-color image forming device.

One preferred embodiment of the image forming device for full color image formation is shown in FIG. 56.

What is explained with FIG. 43 is the optical scanning device which performs the optical scanning to the photoconductor 102 in the image forming device shown in FIG. 56.

The four photoconductors 101, 102, 103, and 104 formed in the shape of a drum are arranged along the move direction of the peripheral surface of the transferring belt 105 as shown in FIG. 56, the toner image of different color one by one is formed, these toners image is transferred and established at the same sheet-like recording medium, and the full color image is acquired.

As described above with FIG. 43, in this image forming device, the multi-light-beam light scan of each photoconductors 101-104 is carried out by the two light beams. The light beams 201, 202, 203, and 204 (these are the two light beams.) from each light-source units 250-253 are set as the part from which the shot position differs in the sub-scanning direction for every light-source unit, and are set for the shot position of the light-source unit 250 to be the highest, and to be set and to method the housing base in order of the light-source units 251, 252, and 253 continuously so that it may become the position distant from the housing base which is not illustrated.

Moreover, it is arranged so that the injection direction may serve as the letter of radiation from the origin of the deviation by the optical deflector 213 at the main scanning direction, and the optical path length which results in the origin of the deviation from the point of each light-source unit emitting light is set up identically respectively.

The surface of another side is the cylindrical surface at the flat surface, one side has forward power common to the sub-scanning direction, the cylindrical lenses 209, 210, 211, and 212 are arranged so that the optical path length to the origin of the deviation of the optical deflector 213 may become equal, and they carry out image-formation of each light beam to the main scanning direction as the line image in the position at the deflection/reflection surface.

The non-parallel plates 261, 262, and 263 are the glass substrates which leaned one surface to the main scanning direction or the sub-scanning direction slightly, are arranged to the station (except light-source unit 250) except the reference color, and hold each optical scanning position stably by carrying out rotation adjustment of these at the circumference of the optical axis.

The reflective mirrors 215, 216, and 217 which are light-beam unification units the angle of reflection the reflection reflective position serves as the acute angle from the origin of the deviation, so that it is near while being arranged like, are keeping away the position of each reflective mirror sequentially from the optical deflector 213, make the distance from the reflection reflective spot to the point of each light source emitting light differ, and the layout is made so that it may avoid each light-source units overlap forward and backward, and the printed circuit board interferes.

The light beam from the light-source unit 250 is made to face to the optical deflector 213 directly in this embodiment. It is good as for how to arrange and turn up the reflective mirror up like other light beams. In addition, since illustration is easy, in FIG. 43, the glass substrate 261 and the reflective mirror 215 are omitted.

The optical deflector 213 is formed in certain thickness, is used as the four steps of polygon mirrors with the deflection/reflection surface of the 6th face, and the part which is not used for the deviation between polygon mirrors is made into the configuration where prepared the slot and the windage loss is reduced more so that it might become the minor diameter from the inscribed circle of the polygon mirror a little, and it sets thickness of the one step of polygon mirror to about 2 mm. The four steps of each polygon mirrors of the optical deflector 213 differ in the height gradually these deflection/reflection surfaces in the sub-scanning direction, and incidence of the light beam from each light-source unit is carried out to the deflection/reflection surface of the corresponding polygon mirror.

If this incidence situation is seen from the optical deflector 213 the revolving shaft, it overlaps mutually. The light beam (light beam which corresponds mutually between the two light beams emitted from each light-source unit) from each light-source unit becomes parallel to the each sub-scanning direction as equal spacing it specifically injects from each light-source unit at intervals of 5 mm, and the deflection/reflection surface of the polygon mirror of the optical deflector also maintains this spacing, and carries out incidence perpendicularly to the reflection surface.

The 1st lens 218 which makes the image-formation system of the scanning/focusing optical system is the fθ lens, and is the non-radii side configuration where power is given so that the uniform light scan of the photoconductor with which it is formed in a certain thickness like the optical deflector 213, and it is common to each light beam with the photoconductor, and does not have power in the sub-scanning direction, but each light beam corresponds with rotation of the optical deflector 213 in the main scanning direction might be carried out.

This 1st lens 218 and the 2nd lens 219-222 combined are the toroidal lenses which have the surface failure compensation function of the polygon mirror of the optical deflector 213, collaborates with the 1st lens and makes each light beam focused as an optical spot on the photoconductor.

Therefore, the four electrostatic latent images are simultaneously written in the four photoconductors 101-104. For this reason, each photoconductor is uniformly charged by the electrification unit which is not illustrated.

After the light beam 201 from the light-source unit 250 is deflected by the polygon mirror of the best layer of the optical deflector 213 and passes the fθ lens 218, it is reflected by the reflection mirror 223, and it is led to the photoconductor drum 101 through the toroidal lens 219, and forms the electrostatic latent image corresponding to the yellow components image.

After the light beam 202 from the light-source unit 251 is deflected by the 2nd step of polygon mirror of the optical deflector 213 and passes the fθ lens 218, it is reflected by the reflection mirror 224, and it is led to the photoconductor drum 102 through the toroidal lens 220 and the reflection mirror 227, and forms the electrostatic latent image corresponding to the magenta components image.

After the light beam 203 from the light-source unit 252 is deflected by the 3rd step of polygon mirror of the optical deflector 213 and passes the fθ lens 218, it is reflected by the reflection mirror 225, and it is led to the photoconductor drum 103 through the toroidal lens 221 and the reflection mirror 228, and forms the electrostatic latent image corresponding to the cyan components image.

After the light beam 204 from the light-source unit 253 is deflected by the polygon mirror of the starting step of the optical deflector 213 and passes the fθ lens 218, it is reflected by the reflection mirror 226, and it is led to the photoconductor drum 104 through the toroidal lens 222 and the reflection mirror 229, and forms the electrostatic latent image corresponding to the black components image. Each electrostatic latent image formed is the negative latent image. Moreover, the degree of incident angle of the light beam to each photoconductor is the same.

Reversal development is carried out by the toner which corresponds by the developing device which is not illustrated, and the electrostatic latent image formed in the photoconductors 101-104 is visualized. Thus, each acquired color toner image is transferred one by one by the transferring belt 105, overlaps mutually, and forms the full color image.

At this time, the position doubling pattern for uniting the transferring position with the transferring belt 105 is formed, the position doubling pattern is detected by the detector (the seven sets are arranged by the main scanning direction.) which consists of the semiconductor laser 232, the focuser lens 233, and the photodetector 231, and transferring position doubling is performed. It is transferred and fixed to the full color image formed on the transferring belt 105 on the sheet-like recording medium which is not illustrated, and it is discharged out of the device.

In the above image forming device, the good full color image by which the color deviation is mitigation or prevention effectively also to the sub-scanning direction also in the main scanning direction is carried out can be acquired by enforcing the optical scanning method mentioned above. In addition, the superposition of each color toner image is made to be performed good being alike the effective light scanning region when writing in each latent image serves as the respectively same width it is necessary to perform the optical scan like.

It is possible to perform the compensation of such width of the effective light scanning region by the method of changing the fundamental frequency of the clock of the image signal and adjusting the write-in die length to the number of predetermined pixels (the number of the pixels which constitutes the one line).

The position-error compensation unit may carry out as a part of position-error compensation of the main scanning direction of the optical spot, or it is possible to carry out by using together position-error compensation and the method of changing the fundamental frequency of the clock.

In the above, the example of the image forming device which forms the full color image is explained. The image forming device of this invention can also be carried out as an image forming device which forms the monochrome image.

Figure 57:
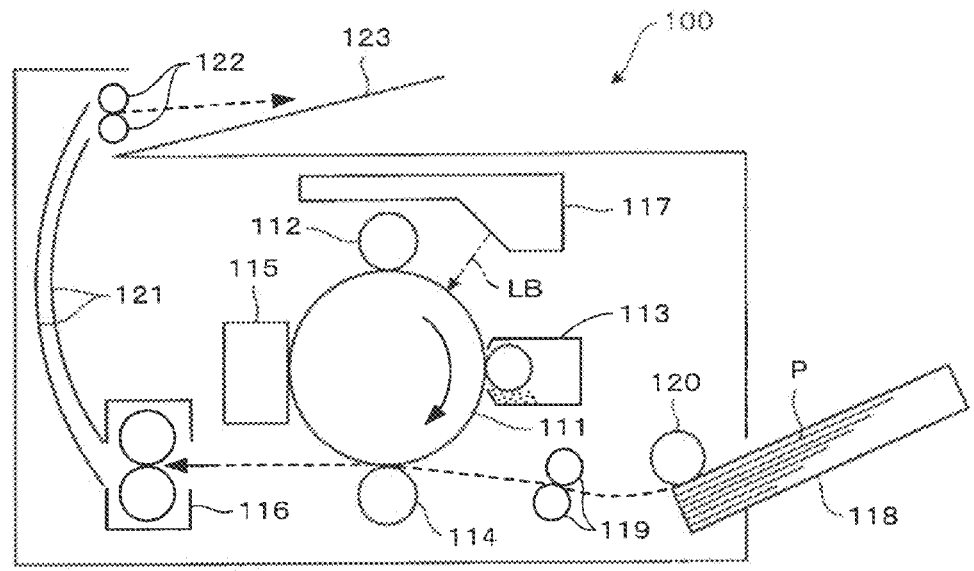
FIG. 57 is a diagram showing the principal part of the embodiment of the monochrome image forming device.
Figure 58:
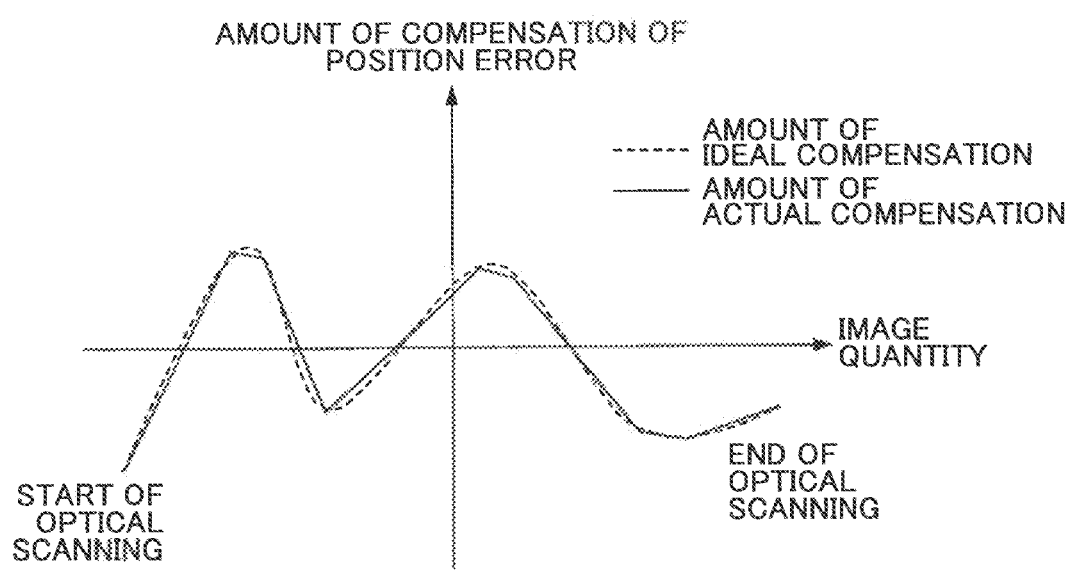
FIG. 58 is a diagram for explaining the compensation of the position error by the polygonal line approximation.

FIG. 57 shows the embodiment of the above-described image forming device. This image forming device is the laser printer. The laser printer 100 has the photoconductor of the photoconductivity formed in the shape of a cylinder as a latent-image support object 111 which forms the stereo of the scanned surface, and the electrification roller 112 as an electrification unit, the developing device 113, the transferring roller 114, and the cleaning device 115 are arranged by the perimeter. The corona charger can also be used as an electrification unit.

Furthermore, the optical scanner 117 which performs the optical scan by the light beam LB of the laser beam is formed, and exposure by the optical writing is performed between the electrification roller 112 and the developing device 113. The reference numeral 116 denotes the fixing device, the reference numeral 118 denotes the cassette, the reference numeral 119 denotes the conveyance way, the reference numeral 122 denotes the ejection roller pair, and, the reference numeral 123 denotes the tray, respectively. The letter P shows the resist roller pair, the reference numeral 120 denotes the feed roller, and the reference numeral 121 denotes the copy sheet as a recording medium.

When performing the image formation, uniform rotation of the image supporting medium 111 which is the photoconductor of photoconductivity is carried out clockwise, uniform electrification of the front face is carried out with the electrification roller 112, and the electrostatic latent image is formed in response to exposure by the optical writing of the light beam LB of the optical scanner 117.

The formed electrostatic latent image is the so-called negative latent image, and the image region is exposed. Reversal development of this electrostatic latent image is carried out by the developing device 113, and the toner image is formed on the image supporting medium 111. The copy sheet P to which the desorption is possible for the cassette 118 which contained the copy sheet P on the image-forming-device 100 body, and the paper is fed to the one sheet of the most significant of the copy sheet P contained in the state where it is equipped as shown in drawing by the feed roller 120, and is fed to the point of the resist roller pair so that it is caught by 119.

The resist roller pair 119 unites timing with the toner image on the image supporting medium 111 moving to the transferring position, and sends the copy sheet P into the transferring region. The sent copy sheets P are piled up with the toner image in the transferring region, and the action of the transferring roller 114 carries out the electrostatic transferring of the toner image. The copy sheet P with the toner image transferred is sent to the fixing device 116, and is established in the toner image in the fixing device 116 having the conveyance way 121 the passage the ejection roller pair it is discharged by 122 on the tray 123.

The front face of the image supporting medium 111 after the toner image is transferred is cleaned by the cleaning device 115, and the remains toner, the paper chip, etc. are removed.

When performing the optical scanning method explained above, using the optical scanner of this invention as an optical scanner 117 the deflection and the inclination of the scanning line effective compensating in addition and the high-definition monochrome image by which the position error of the main scanning direction is also compensated good can be acquired.

In the following, some concrete examples will be explained. The optical scanner of the single beam scanning type is prepared as the experiment model. Two reflection mirrors are allotted like the optical scanner shown in FIG. 43, and the reflection mirror near the scanned surface is leaned to compensating the inclination and deflection of the scanning line, or it stir-fries, and is made to make it curve on the optical path length from the optical deflector to the scanned surface.

In each of the examples, the compensation of the position error is performed by the method of carrying out the phase shift of the clock of the image signal. In order to compensate the position error the effective scanning region approximately it divides into region of equal die length, and is made to carry out the variation rate of the pixel of the predetermined number by the method of carrying out the variation rate by the phase shift of the clock of the image signal in each region.

Furthermore, the die length of the effective scanning region turning into predetermined die length the reference clock of the pixel clock is set up like. The write-in consistency is set to 600 dpi, and the amount of phase shifts of the clock per pixel is set to 1/16PCLK. 2.65 micrometers of positions of the optical spot are displaced by this phase shift. The amount of phase shifts is made only into the two sorts of ±1/16PCLK, and makes+ the shift by the side of the optical scanning start. Moreover, + presupposes that it is the direction (direction in which pixel spacing narrows) which delays the phase among±s given to the number of the pixels which performs the phase shift in each region.

EXAMPLE 1

Figure 59:
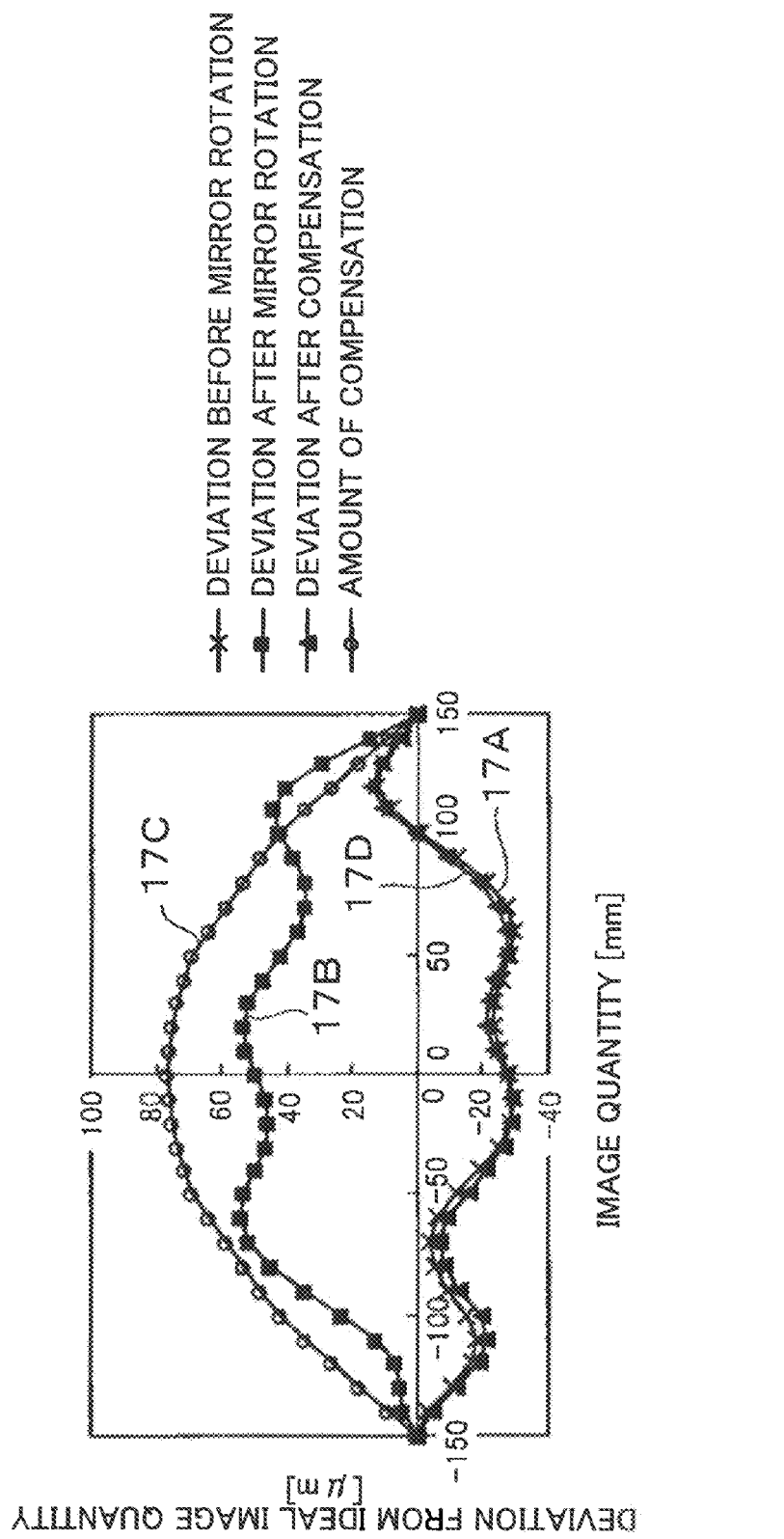
FIG. 59 is a diagram showing the compensation situation in the Example 1.

The curve 17A (before mirror rotation) shows the position error on the design by the scanning/focusing optical system in the optical scanner made as an experiment to FIG. 59.

This position error (position deviation from the ideal image quantity of the optical spot shown with the axis of ordinate) is the position error peculiar to the scanning/focusing optical system. The effective scanning region is ±150 mm, i.e., 300 mm, and the image quantity by the side of the optical scanning start is +. The inclination of the scanning line occurred in the initial state, and posture adjustment of the reflection mirror near the scanned surface is performed to compensate this.

As shown in FIG. 60A, the reflection mirror MR is counterclockwise rotated only for the 2.627 minutes around the rotation shaft AX by the side of the edge A by the side of the optical scanning start. The incident angle of the sub-scanning direction to the reflection mirror MR of the deflected light beam is the 34.5 degrees as shown in FIG. 60B.

By this mirror rotation, the variation rate of the trailer of the scanning line is carried out to 260-micrometer sub-scanning direction, and the inclination of the scanning line is compensated.

The concrete numeric values are shown in FIG. 64. There is the position error (position error peculiar to the scanning/focusing optical system) in the main scanning direction of the optical spot before carrying out posture adjustment of the reflection mirror MR with the position deviation before mirror rotation, and it is the curve 17A shown in FIG. 59.

There is the position error after performing posture adjustment of the reflection mirror MR and compensating the inclination of the scanning line with the position deviation after mirror rotation.

The curve 17B in FIG. 59 shows the situation of this position error. The position error peculiar to the scanning/focusing optical system is contained in this position error. There is the amount of compensation which compensates the position error which originated in having compensated the inclination of the scanning line and is produced with the amount of compensation, and the curve 17C in FIG. 59 shows this. That it is with the position deviation after the compensation expresses the position error of the optical spot after the compensation compensates the position error which originated in having compensated the inclination of the scanning line and is produced.

The curve 17D shows this in FIG. 59. It is turned out that the curve 17D has agreed with the curve 17A which is the position error peculiar to the scanning/focusing optical system substantially, and the position error which originated in having compensated the inclination of the scanning line and is produced is compensated by the compensation very good after this.

FIG. 65 shows the detail of the compensation. The division position is the image quantity position (mm) which divides the effective light scanning region (+150 mm or −150 mm) into two or more regions, section No. sets each divided region in order from + image quantity side, and section width is the die length (mm) of each divided region.

The number of phase shift pixels is the number of the pixels which perform the phase shift of the pixel clock in each divided region, and as mentioned above, + is the direction (direction in which pixel spacing narrows) which delays the phase.

For example, in section No. 1, the direction of −, i.e., the phase shift of the direction in which pixel spacing spreads, is performed to the eight pixels among the pixels contained in section width of 24 mm. Since the 2.65-micrometer shift arises by the one phase shift, only the 21.2 micrometers of array width of the pixel have spread to section width of 24 mm.

EXAMPLE 2

The optical scanner of the trial production is made to generate deflection of the scanning line, the mirror is incurvated by return deflection of this scanning line, and it compensated. The curve 19A (before mirror deflection) in FIG. 61 is the position error (before compensating the deflection of the scanning line) peculiar to the scanning/focusing optical system.

Figure 62A:
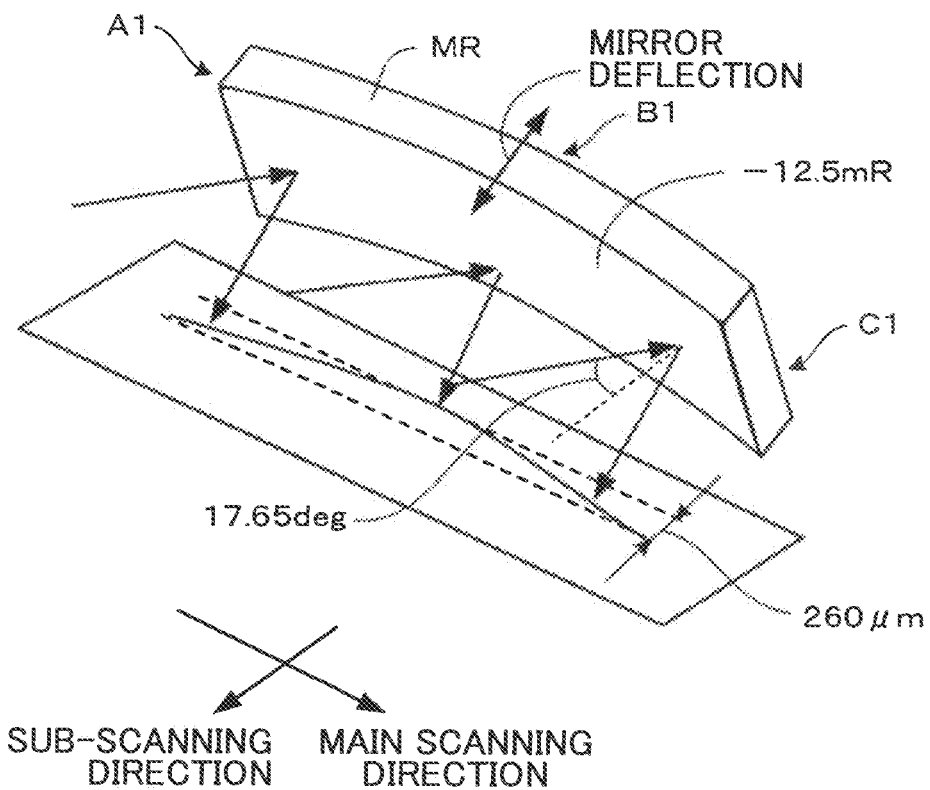
FIG. 62A and FIG. 62B are diagrams for explaining the deformation (curvature by deflection) of the reflection mirror in the Example 2.
Figure 62B:
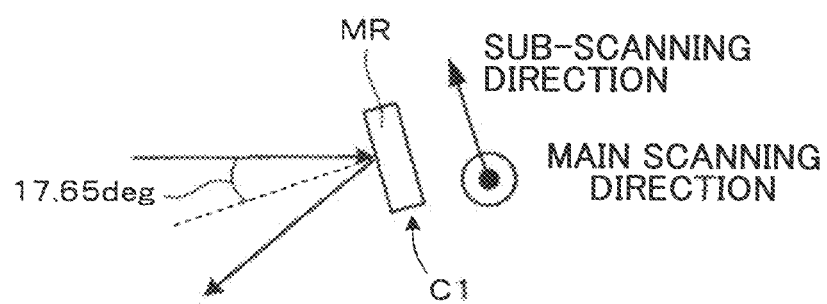

As shown in FIG. 62A and FIG. 62B, the center section B1 is pressed to the both ends A1 and C1 of Mirror MR by return, and bending is given. In the sub-scanning direction, the incident angle of the light beam to this reflection mirror MR is 17.65 degrees, as shown in FIG. 62B.

The surface of the reflection mirror MR is concave with a radius of curvature of 12 m by the curve. The amount of curves is −260 micrometers to 220 mm width of +110 mm to −110 mm of the effective scanning region. FIG. 66 shows the concrete numeric values similar to FIG. 64.

The position deviation before mirror deflection is indicated by the curve 19A shown in FIG. 61. The position deviation after mirror deflection means the position error after sagging the reflection mirror MR and compensating the deflection of the scanning line. The curve 19B in FIG. 61 shows the situation of this position error. The position error peculiar to the scanning/focusing optical system is contained in this position error. The amount of compensation indicated by the curve 19C in FIG. 61 means the amount of compensation to compensate the position error which is created by having compensated the inclination of the scanning line. That it is with the position deviation after the compensation expresses the position error of the optical spot after the compensation compensates the position error which originated in having compensated the deflection of the scanning line and is produced. The curve 19D in FIG. 61 shows this.

It is turned out that the curve 19D has agreed with the curve 19A which is the position error peculiar to the scanning/focusing optical system substantially, and the position error which originated in having compensated the inclination of the scanning line is compensated by the above compensation very well.

Similar to FIG. 65, FIG. 67 shows the detail of the compensation. For example, in section No. 1, the phase shift is performed in the negative direction in which pixel spacing spreads, to the 38 pixels among the pixels contained in section width of 18 mm.

EXAMPLE 3

In the Example 3, the scanning line which writes in, the color, for example, the black components image, of a certain reference, is made into the reference scanning line supposing the full color image formation, and the position error of the optical spot in the optical scanner is compensated by making the position error of the optical spot in this reference scanning line into the reference position error.

After an appropriate time, rotation of the mirror compensated the inclination of the scanning line by return, and the position error of the main scanning direction of the optical spot originated and generated in this compensation is compensated again.

The reflection mirror is the thing of the 34.5 incident angles like what is shown in FIG. 60 A-FIG. 60C.

This is counterclockwise rotated around the revolving shaft AX for the 3 minutes, 297-micrometer variation rate is carried out by the optical scanning termination side to the effective scanning region with 300 mm width of +150 mm to −150 mm, and the inclination of the scanning line is compensated.

Similar to FIG. 64, FIG. 68 shows the concrete numeric value. There is the deflection (deviation) of the pixel position and the pixel position of the main scanning direction in the reference scanning line which are written in at the optical spot of the optical scanner of the trial production saying it is the relative position deviation before mirror rotation, and the curve 21A shows it to FIG. 63.

The deflection after the phase shift of the pixel clock compensates this deflection is being after relative position deviation compensation before mirror rotation in FIG. 68.

The relative position deviation after mirror rotation is the deflection (deviation) with the pixel position of the main scanning direction in the reference scanning line which originated in this compensation and is generated after rotation (posture adjustment) of the reflection mirror compensated the inclination of the scanning line (the inclination of the reference scanning line is made to agree substantially), and the deflection after compensating this position error is after relative position deviation compensation after mirror rotation.

There is the amount of compensation for uniting and compensating the relative position deviation before mirror rotation and the position error resulting from having compensated the inclination of the scanning line with the total amount of compensation.

FIG. 69 shows the details of the compensation mentioned above similar to FIG. 65. In FIG. 69, the number of phase shift pixels for initial deviation compensation means the number of the phase shift pixels in each divided section in order to compensate the relative position deviation (the curve 21A in FIG. 63) before mirror rotation in FIG. 68. The state where the relative position deviation (the curve 21A in FIG. 63) before mirror rotation has been compensated is indicated by the curve 21B of FIG. 63.

Moreover, the number of phase shift pixels for mirror rotation compensation in FIG. 69 means the number of the pixels which performs the phase shift in order to compensate the position error (which is shown by the curve 21C in FIG. 63) which occurs after the inclination of the scanning line is compensated.

Figure 63:
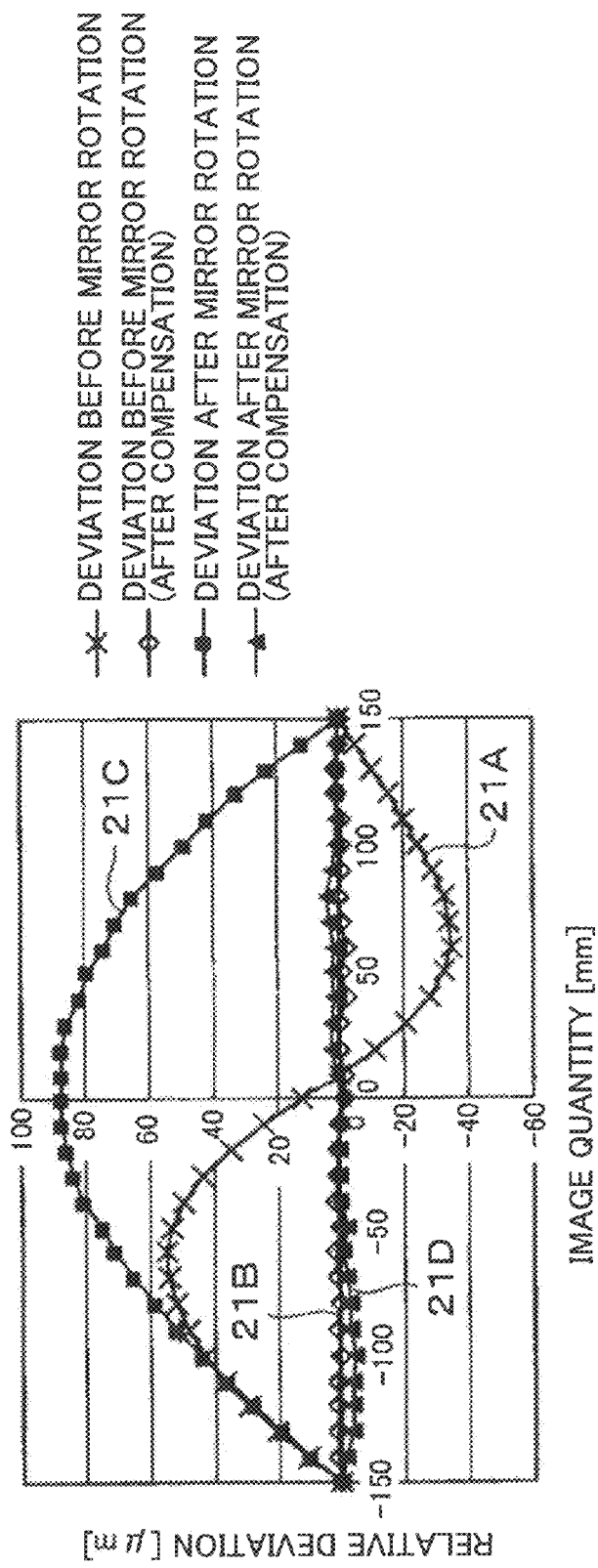
FIG. 63 is a diagram for explaining the compensation situation in the Example 3.

The number of final phase shift pixels in FIG. 69 means the number of the pixels which performs the phase shift corresponding to the results of the two kinds of compensation mentioned above. The curve 21D in FIG. 63 shows the results in which such final compensation is performed. It is turned out that the curve 21D has agreed with the curve 21B substantially, and the position error which is created by the compensation of the inclination of the scanning line is compensated very well by the final compensation, and the inclination of the scanning line and the position error of the main scanning direction of the optical spot have agreed with those of the reference scanning line well.

According to the optical scanning device of the present invention, the position error of the main scanning direction of the optical spot which arises by compensating the inclination and/or deflection of the scanning line, is effectively reduced. Therefore, in the image forming device of the present invention, the image degradation resulting from the position error of the main scanning direction of the optical spot, or the color deviation of the main and sub-scanning directions in the two-color images, the multi-color image, or the full color image can be reduced effectively, and the good-quality image can be formed.

The present invention is not limited to the above-described embodiments, and variations and modifications may be made without departing from the scope of the present invention.

Further, the present application is based on Japanese patent application No. 2004-040753, filed on Feb. 18, 2004, Japanese patent application No. 2004-050154, filed on Feb. 25, 2004, and Japanese patent application No. 2004-130114, filed on Apr. 26, 2004, the entire contents of which are hereby incorporated by reference.

The invention claimed is:

1. An optical scanning device which includes one or more optical deflectors deflecting one or more light beams from one or more light sources, and one or more scanning/focusing optical systems focusing each deflected light beam on each of one or more surfaces of photoconductive mediums as an optical spot thereon, and the optical scanning device performing optical scanning of each of the one or more surfaces of the photoconductive mediums, comprising:

a scanning line compensation unit compensating an inclination of a scanning line and/or a deflection of a scanning line on the one or more scanned surfaces; and a position-error compensation unit compensating a position error in a main scanning direction of the optical spots corresponding to adjoining pixels resulting from the compensation of the scanning line compensation unit, wherein the scanning line compensation unit is configured to mechanically vary an optical path of the deflected light beam, and a change of a spacing in the main scanning direction of optical spots corresponding to adjoining pixels being produced by the compensation of the scanning line compensation unit, and the position-error compensation unit is configured to compensate the change of the spacing in the main scanning direction of the optical spots corresponding to the adjoining pixels by adjustment of a timing of respective startings and endings of application of an image signal applied in the main scanning direction of the optical spots, and an amount of the compensation of the spacing change being varied in accordance with a position in the main scanning direction so that respective spacings in the main scanning direction of the optical spots corresponding to the adjoining pixels for two adjoining positions on each of the one or more scanned surfaces are different from each other.

2. The optical scanning device according to claim 1 wherein the scanning line compensation unit is provided to adjust a posture of one or more optical components among optical components provided on an optical path from the optical deflector to the scanned surface, in order to compensate the inclination of the scanning line.

3. The optical scanning device according to claim 2 wherein the scanning line compensation unit is provided to adjust a posture of one or more lenses among the optical components provided on the optical path from the optical deflector to the scanned surface, and vary the optical path of the light beam in order to compensate the inclination of the scanning line.

4. The optical scanning device according to claim 2 wherein the scanning line compensation unit is provided to adjust a posture of one or more reflection mirrors among the optical components provided on the optical path from the optical deflector to the scanned surface, and vary the optical path of the light beam in order to compensate the inclination of the scanning line.

5. The optical scanning device according to claim 4 wherein the scanning line compensation unit is provided to perform the adjustment of the posture of the one or more reflection mirrors so that characteristics of the position error in the main scanning direction of the optical spot to an image quantity have one local extremum.

6. The optical scanning device according to claim 1 wherein the scanning line compensation unit is provided to deflect one or more of the optical components provided on the optical path from the optical deflector to the scanned surface, and vary the optical path of the light beam in order to compensate the deflection of the scanning line.

7. The optical scanning device according to claim 6 wherein the scanning line compensation unit is provided to deflect one or more lenses among the optical components provided on the optical path from the optical deflector to the scanned surface in the main scanning direction, and vary the optical path of the light beam.

8. The optical scanning device according to claim 6 wherein the scanning line compensation unit is provided so that one or more reflection mirrors among the optical components prepared into the optical path length from the optical deflector to the scanned surface are deflected in the main scanning direction and the optical path of the light beam is varied.

9. The optical scanning device according to claim 8 wherein the scanning line compensation unit is provided to deflect one reflection mirror in the main scanning direction and vary the optical path of the light beam, so that there are the number (n+1) of local extremums of the position error of the main scanning direction of the optical spot to image quantity with respect to the number n (≥1) of local extremums in a surface configuration of the reflection mirror.

10. The optical scanning device according to claim 1 wherein an amount of compensation of the position error of the main scanning direction of the optical spot to the image quantity in the position-error compensation unit is determined corresponding to an amount of compensation of the inclination of the scanning line and/or an amount of compensation of the deflection of the scanning line by the scanning line compensation unit.

11. The optical scanning device according to claim 1 wherein the position-error compensation unit is provided to perform the adjustment of the timing of application of the image signal by phase shifting of the clock of the image signal, in order to compensate the position error of the main scanning direction of the optical spot.

12. The optical scanning device according to claim 1 wherein the position-error compensation unit is provided to perform the adjustment of the timing of application of the image signal by changing a frequency of the clock of the image signal, in order to compensate the position error of the main scanning direction of the optical spot.

13. The optical scanning device according to claim 1 wherein the position-error compensation unit is provided to perform the adjustment of the timing of application of the image signal so that a width of an effective optical scanning is equal to a predetermined width, in order to compensate the position error of the main scanning direction of the optical spot.

14. The optical scanning device according to claim 1 wherein the position-error compensation unit is provided to perform the adjustment of the timing of application of the image signal so that spacings of the optical spots in the main scanning direction are equal intervals, in order to compensate the position error of the main scanning direction of the optical spot.

15. The optical scanning device according to claim 1 wherein the position-error compensation unit is provided to perform the position-error compensation by dividing an effective light scanning region into a plurality of sections, and the adjustment of the timing of application of the image signal for compensating the position error of the main scanning direction of the optical spot is set up for each region, and the same adjustment is performed for each region.

16. The optical scanning device according to claim 1, wherein the adjustment of the timing comprises a phase shift of a predetermined number of pixels in which the predetermined number of pixels phase shifted is based on a specific color of the image signal with the predetermined number being different for different colors.

17. An image forming device which includes a plurality of image supporting mediums corresponding to a plurality of colors, an optical scanning device forming an electrostatic latent image on a uniformly charged surface of each of the image supporting mediums by irradiating a light beam emitted by one of a plurality of light source units and modulated based on a pixel clock pulse, a development unit developing a toner image from each of the electrostatic latent images on the image supporting mediums, and a transferring unit transferring each of the developed images on the image supporting mediums to a printing sheet in an integrated manner to form a color image thereon, the optical scanning device performing optical scanning of each of the one or more surfaces of image supporting mediums and comprising:

a scanning line compensation unit compensating an inclination of a scanning line and/or a deflection of a scanning line on the one or more scanned surfaces; and a position-error compensation unit compensating a change of a spacing in a main scanning direction of the optical spots corresponding to adjoining pixels resulting from the compensation of the scanning line compensation unit, wherein the scanning line compensation unit is configured to mechanically vary an optical path of the deflected light beam, and a change of a spacing in the main scanning direction of optical spots corresponding to adjoining pixels being produced by the compensation of the scanning line compensation unit, and the position-error compensation unit is configured to compensate the change of the spacing in the main scanning direction of the optical spots corresponding to the adjoining pixels by adjustment of a timing of respective startings and endings of application of an image signal applied in the main scanning direction of the optical spots, and an amount of the compensation of the spacing change being varied in accordance with a position in the main scanning direction so that respective spacings in the main scanning direction of the optical spots corresponding to the adjoining pixels for two adjoining positions on each of the one or more scanned surfaces are different from each other.

18. The image forming device according to claim 17 wherein the scanning line compensation unit is provided to adjust a posture of one or more optical components among optical components provided on an optical path from the optical deflector to the scanned surface, in order to compensate the inclination of the scanning line.

19. The image forming device according to claim 17, wherein the adjustment of the timing comprises a phase shift of a predetermined number of pixels in which the predetermined number of pixels phase shifted is based on a specific color of the image signal with the predetermined number being different for different colors.

* * * * *